US012275056B2

(12) United States Patent
Pereira-Santo

(10) Patent No.: US 12,275,056 B2
(45) Date of Patent: Apr. 15, 2025

(54) DEVICE FOR SETTING A TEMPORARY FASTENER

(71) Applicant: SETI-TEC, Collegien (FR)

(72) Inventor: Sebastien Pereira-Santo, Charneca da Caparica (PT)

(73) Assignee: SETI-TEC, Collegien (FR)

( * ) Notice: Subject to any disclaimer, the term of this patent is extended or adjusted under 35 U.S.C. 154(b) by 0 days.

(21) Appl. No.: 18/004,376

(22) PCT Filed: Jul. 7, 2020

(86) PCT No.: PCT/EP2020/069161
§ 371 (c)(1),
(2) Date: Jan. 5, 2023

(87) PCT Pub. No.: WO2022/008042
PCT Pub. Date: Jan. 13, 2022

(65) Prior Publication Data
US 2023/0356287 A1    Nov. 9, 2023

(51) Int. Cl.
*B21J 15/04*     (2006.01)
*B21J 15/32*     (2006.01)
(Continued)

(52) U.S. Cl.
CPC .............. *B21J 15/04* (2013.01); *B21J 15/32* (2013.01); *B23P 19/066* (2013.01); *F16B 19/109* (2013.01)

(58) Field of Classification Search
CPC .......... B21J 15/04; B21J 15/32; B23P 19/066; B23P 19/06; F16B 19/109; B25B 31/005
See application file for complete search history.

(56) References Cited

U.S. PATENT DOCUMENTS 3,036,727 A * 5/1962 Zankl ................. B21J 15/26
227/62
4,178,669 A * 12/1979 Hara .................. B25B 27/0014
29/525
(Continued)

FOREIGN PATENT DOCUMENTS

EP    2754531 B1    7/2014
EP    3603890 A1    2/2020
(Continued)

OTHER PUBLICATIONS

International Search Report dated May 17, 2021 for corresponding International Application No. PCT/EP2020/069161, filed Jul. 7, 2020.
(Continued)

*Primary Examiner* — Sarang Afzali
*Assistant Examiner* — Darrell C Ford
(74) *Attorney, Agent, or Firm* — David D. Brush; Westman, Champlin & Koehler, P.A.

(57) ABSTRACT

A device for setting a temporary fastener. The temporary fastener includes a body with an expandable/retractable end and a rotary element capable of being driven in rotation so as to cause the expandable/retractable end to expand/retract. The device includes a support module that is able to house a temporary fastener and has a holder for holding the temporary fastening inside the module. The holder is movable between at least: a locking position in which the holder is deployed inside the module so as to cooperate with a temporary fastener placed in the module in order to prevent it from moving in translation inside the module, and a rest position in which the holder is retracted so as to allow a temporary fastener to pass through the module.

22 Claims, 43 Drawing Sheets

(51) Int. Cl.
  *B23P 19/06*     (2006.01)
  *F16B 19/10*     (2006.01)

(56) References Cited

U.S. PATENT DOCUMENTS

| | | | | |
|---|---|---|---|---|
| 4,548,533 | A | 10/1985 | Pratt | |
| 5,815,906 | A * | 10/1998 | Johnsen | F16B 19/1054 |
| | | | | 29/243.517 |
| 6,592,015 | B1 * | 7/2003 | Gostylla | B23P 19/001 |
| | | | | 227/112 |
| 6,796,454 | B1 * | 9/2004 | Matthews | B21J 15/32 |
| | | | | 227/135 |
| 9,387,541 | B2 | 7/2016 | Pereira | |
| 9,839,956 | B2 * | 12/2017 | Sindlinger | B21J 15/16 |
| 2009/0127279 | A1 * | 5/2009 | Zieve | B21J 15/32 |
| | | | | 227/112 |
| 2012/0324690 | A1 * | 12/2012 | Faitel | B21J 15/025 |
| | | | | 29/243.53 |
| 2017/0072454 | A1 * | 3/2017 | Wilcox | B23P 19/006 |
| 2019/0039119 | A1 * | 2/2019 | Li | B21J 15/025 |
| 2020/0114480 | A1 * | 4/2020 | Lang | B21J 15/32 |
| 2020/0290180 | A1 | 9/2020 | Palette et al. | |
| 2021/0025434 | A1 | 7/2021 | Brachet | |

FOREIGN PATENT DOCUMENTS

| | | | |
|---|---|---|---|
| FR | 3071181 | A1 | 3/2019 |
| FR | 3080155 | A1 | 10/2019 |

OTHER PUBLICATIONS

Written Opinion of the International Searching Authority dated May 17, 2021 for corresponding International Application No. PCT/EP2020/069161, filed Jul. 7, 2020.

English translation of the Written Opinion of the International Searching Authority dated May 17, 2021 for corresponding International Application No. PCT/EP2020/069161, filed Jul. 7, 2020.

* cited by examiner

A-A

L - L

F-F

DEVICE FOR SETTING A TEMPORARY FASTENER

CROSS-REFERENCE TO RELATED APPLICATIONS

This Application is a Section 371 National Stage Application of International Application No. PCT/EP2020/069161, filed Jul. 7, 2020, which is incorporated herein by reference in its entirety and published as WO 2022/008042 A1 on Jan. 13, 2022, not in English.

1. FIELD OF THE INVENTION

The field of the invention is that of the design and production of devices used in industry for automatically setting temporary fasteners.

2. PRIOR ART

Automated devices are known which allow the installation of temporary fasteners. Such devices conventionally comprise a robotic arm (also called an end effector) which allows to grip temporary fasteners from a non-station storage zone and then places them in a setting zone.

These devices are rather inconvenient and of rather large overall size in that they require the robot arm to move back and forth between the temporary fastener storage zone and setting zone.

This design makes them rather inflexible and their implementation can lead to the risk of losing the temporary fastener during its movement.

It is therefore still possible to improve devices of this type, which is an objective of the invention.

3. SUMMARY

For this, the invention provides a device for setting a temporary fastener, said temporary fastener comprising a body with an expandable/retractable end and a rotary element capable of being rotatably driven to cause said expandable/retractable end to expand/retract, said device comprising a support module able to house a temporary fastener, said module comprising means for holding said temporary fastener inside said module, said holding means being movable between at least:
  a locking position in which they are deployed inside said module to cooperate with a temporary fastener placed in said module to prevent it from moving in translation inside said module, and
  a rest position in which they are retracted to allow a temporary fastener to pass through said module.

Thus the invention provides a device integrating a support module into which a temporary fastener can be inserted and in which it is held with adapted locking means.

This configuration ensures that the fastener is better held during its movement in space and its setting, and thus improves reliability and secures setting.

This configuration also makes it possible to integrate a temporary fastener supply system into the device, for example of the cartridge belt type, rather than implementing a remote, non-integrated storage zone.

Therefore, this optimises automated setting of temporary fasteners.

According to one possible characteristic, said holding means comprise a locking element provided with a locking lug movably mounted in translation along an axis essentially orthogonal to the axis of the module between said rest and locking positions.

According to one possible characteristic, said locking lug is designed to be housed in its locking position in a space provided for this purpose in a temporary fastener housed in said module.

According to one possible characteristic, a device according to the invention comprises means for actuating said locking element, said actuating means comprising a piston movably mounted in translation inside said module along the longitudinal axis thereof between:
  a locking position, and
  a release position,
  said piston comprising a portion tilted with respect to said axis, said tilted portion acting on said locking element when said piston moves into its release position to move said locking element into its rest position.

According to one possible characteristic, said module comprises a chamber housing said piston and forming a jack therewith.

According to one possible characteristic, said module comprises a pressurised gas intake conduit in said chamber.

According to one possible characteristic, a device according to the invention comprises first return means tending to return said piston to its locking position.

According to one possible characteristic, a device according to the invention comprises second elastic return means tending to return said locking member to its locking position.

According to one possible characteristic, a device according to the invention comprises comprising a rotational drive tube housed in said piston, said rotational drive tube being rotatably mounted in said piston and having a bore therethrough allowing a temporary fastener to pass therethrough, said drive tube housing a first freewheel able to co-operate with the rotary element of a temporary fastener housed in said module to rotatably connect said drive tube and said rotary element.

According to one possible characteristic, said piston houses a second freewheel able to cooperate with the body of a temporary fastener housed in said module, said first and second freewheels having antagonistic operations.

According to one possible characteristic, said first elastic return means are interposed between said piston and said drive tube.

According to one possible characteristic, a device according to the invention comprises means for rotatably driving said drive tube, said driving means comprising a rotatably movable spindle having a longitudinally grooved portion cooperating with a complementarily shaped grooved ring capable of being rotatably driven by means of a rotation motor.

According to one possible characteristic, said drive tube and said piston are movable and translationally connected in said module between at least:
  a retracted position in which they extend inside said module, and
  a deployed position in which they extend at least partially outside said module.

According to one possible characteristic, a device according to the invention comprises means for translationally driving said drive tube, said translation driving means comprising said spindle which has a threaded portion cooperating with a threaded ring capable of being rotatably driven by a translation motor.

According to one possible characteristic, a device according to the invention comprises:
- a station for loading temporary fasteners into said module;
- a work station for setting a temporary fastener on a structure to be worked on;
- means for moving said module between said loading station and said work station.

According to one possible characteristic, said loading station comprises means for introducing temporary fasteners into said module.

According to one possible characteristic, said loading station comprises a holding fork movably mounted between at least:
- a holding position in which it extends as an extension of a module placed at the loading station on the side of the module opposite to the introduction means, said fork being shaped to form in this position a stop for holding a temporary fastener located inside said module and to place said locking lug facing said space provided for this purpose in a temporary fastener housed in said module, and
- a release position in which it does not lie as an extension of said module to allow a temporary fastener located therein to be removed therefrom.

According to one possible characteristic, a device according to the invention comprises control means configured to successively:
- bring said module to the loading station;
- place said fork in its holding position and place said holding means in their rest position;
- introduce a temporary fastener into said module until it stops against said fork;
- place said holding means in their locking position;
- place said fork in its release position;
- bring said module to said work station.

According to one possible characteristic, a device according to the invention comprises control means configured to successively:
- bring said module containing a temporary fastener to the work station;
- move said temporary fastener inside said module so as to introduce it into a hole provided in a structure to be worked to which said temporary fastener is to be secured;
- place said holding means in their rest position;
- rotatably drive the rotary element of said temporary fastener and cause its expandable/retractable end to expand and then retract and be secured to said structure to be worked on;
- place said holding means in their rest position.

The invention also relates to a device for performing at least one task on a structure to be worked on, said device comprising:
- means for securing said device to motor-driven handling means able to move said device at least partially in space with respect to a structure to be worked on;
- means for securing said device to said structure to be worked on;
- said device comprising at least one temporary fastener setting device according to any of the above alternatives.

The invention also relates to a method for installing a temporary fastener comprising the following steps:
- bringing said module containing a temporary fastener to the workstation;
- moving said temporary fastener inside said module so as to introduce it into a hole provided in a structure to be worked on to which said temporary fastener is to be secured; and
- rotatably driving the rotary element of said temporary fastener and causing its expandable/retractable end to expand and retract and be secured to said structure to be worked on;
- placing said holding means in their rest position.

According to one possible characteristic, such a method comprises the following preliminary steps:
- bringing said module to the loading station;
- placing said fork in its holding position and placing said holding means in their rest position;
- introducing a temporary fastener into said module until it stops against said fork;
- placing said holding means in its rest position;
- introducing a temporary fastener into said module;
- placing said holding means in their locking position.

4. DESCRIPTION OF THE FIGURES

Further characteristics and advantages of the invention will become apparent from the following description of particular embodiments, given by way of mere illustrative and non-limiting example, and the appended drawings, among which:

FIG. 5 illustrates a first alternative of suction pad device for securing a device according to the invention to a structure to be worked on;

FIG. 19 illustrates an example of a C-clamp implemented for securing a device according to the invention to a structure to be worked on;

5. DESCRIPTION OF PARTICULAR EMBODIMENTS

Figure 1:
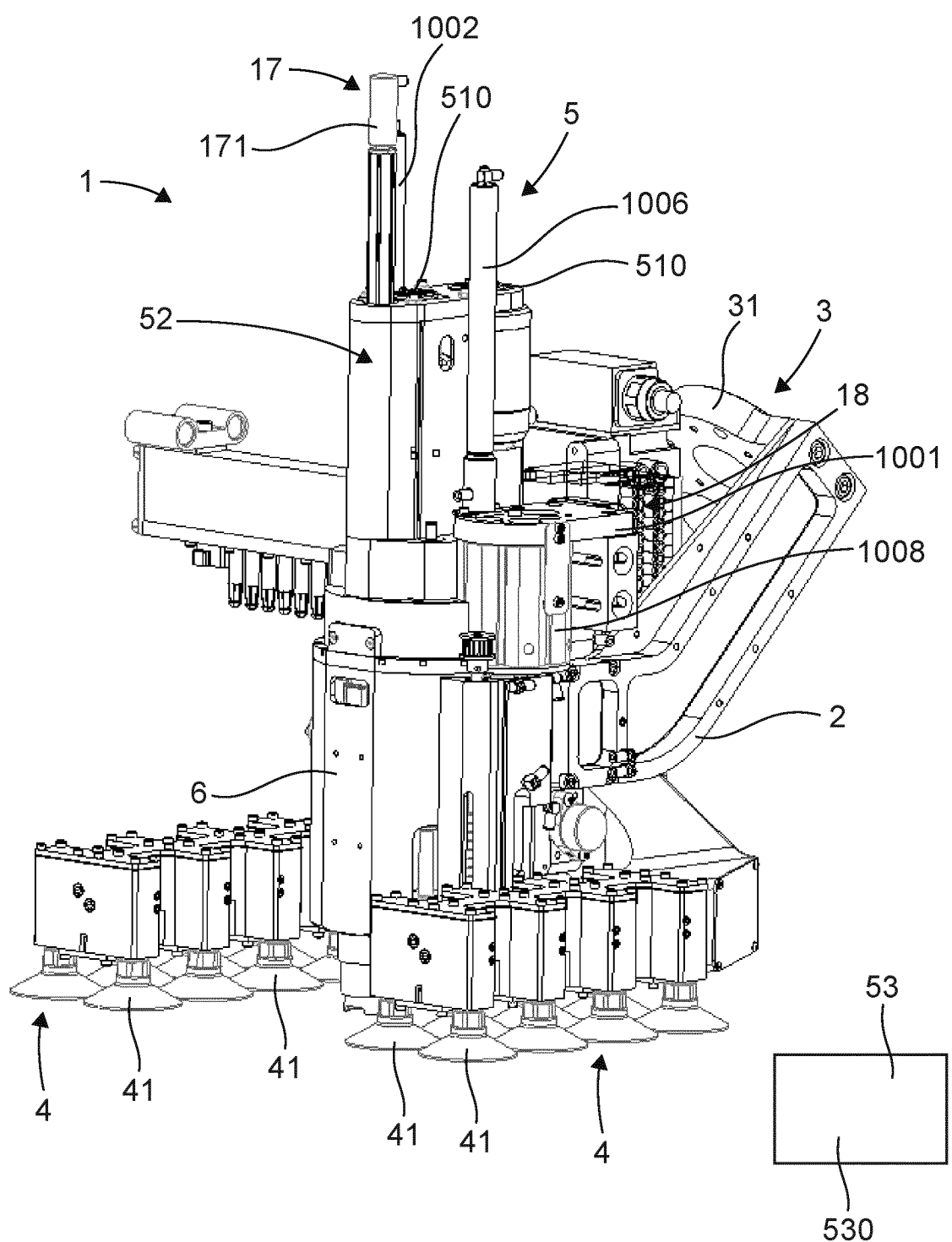
FIG. 1 illustrates a perspective view of a device according to the invention.

An example of a multi-task device according to the invention is described in connection with FIGS. 1 to 50.

As is represented in these figures, such a multi-task device 1 comprises a frame 2.

This frame 2 is equipped with means for securing 3 to a motor-driven handling device (not represented) to which it is to be secured so that it can be moved relative to a structure to be worked on (not represented).

These motor-driven handling means belong to the group comprising:
robot arms;
walking robots;
digital gates.

In the example illustrated, these are means for securing 3 to a robot arm. These securing means comprise a plate 31 with a plurality of holes 32 passing therethrough to allow securing bolts at the end of the robot arm to pass therethrough. Other securing means may be used, such as, for example, quick securing means of the collar, clamp or cam type . . . .

In the case of digital gates, the securing means will comprise, for example, bolts, clamps or other means for securing to a cradle provided with rollers able to be guided in the rails of the digital gate.

Means for Securing to a Structure to be Worked on

The device comprises means for securing 4 to a structure to be worked on.

These securing means may be of different types.

They may, for example, comprise suction cups 41 integral with the frame 2 and able to be connected to vacuum means, such as a vacuum pump, in order to improve securement to the surface of the structure to be worked on.

Figure 17:
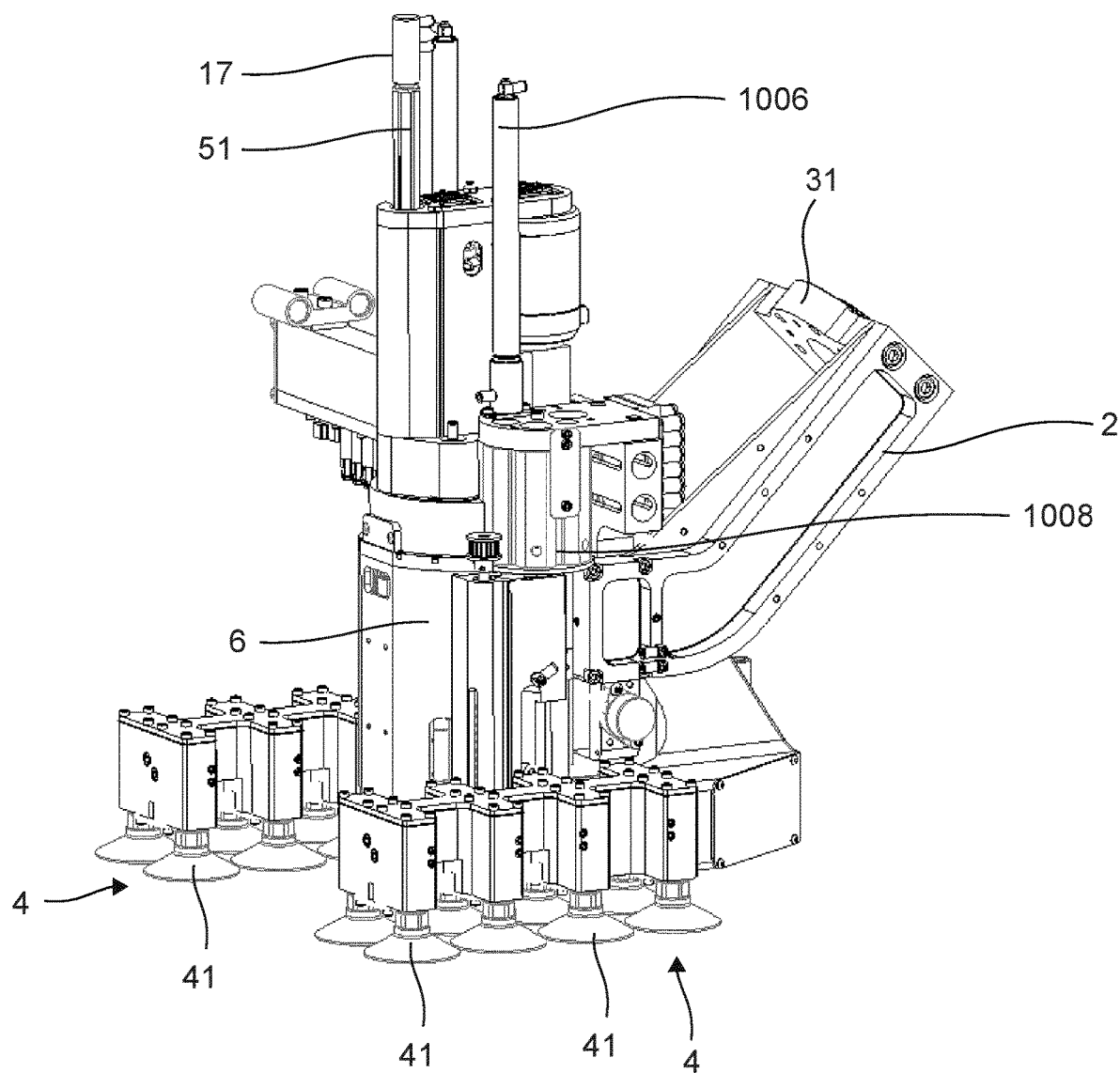
FIG. 17 illustrates the device of FIG. 1 from a different angle of view.

The suction cups can be secured in groups to supports thus forming suction pads. Two suction pads are represented in FIGS. 1, 17 and 18, but this number could be higher than two.

Figure 18:
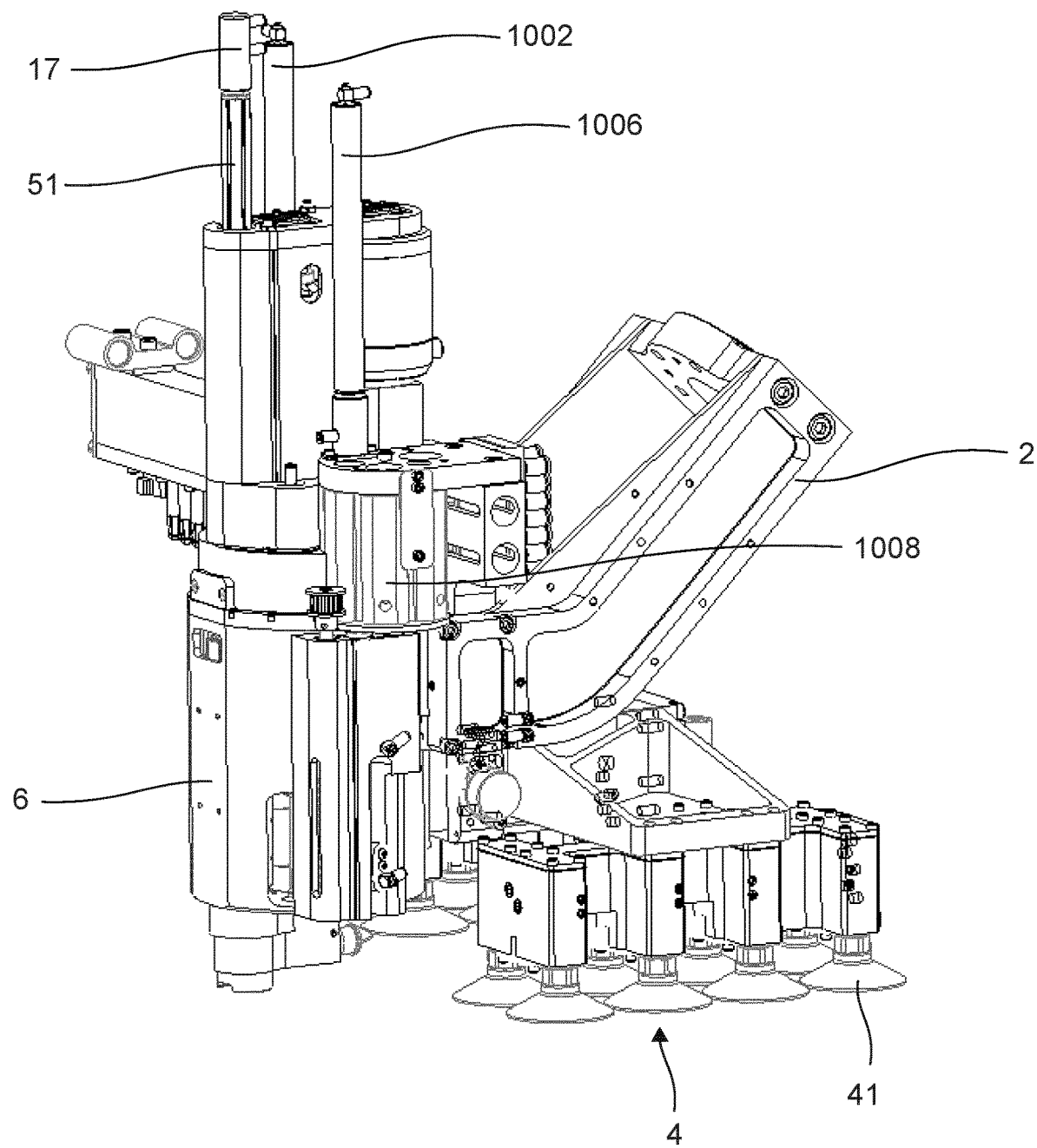
FIG. 18 illustrates the device of FIG. 17 with a different suction cup device.

The suction pads may be offset to one side of the spindle 51 (which will be described in detail later) as illustrated in FIG. 18 or dispensed around the spindle 51 (see FIG. 17).

Figure 19:
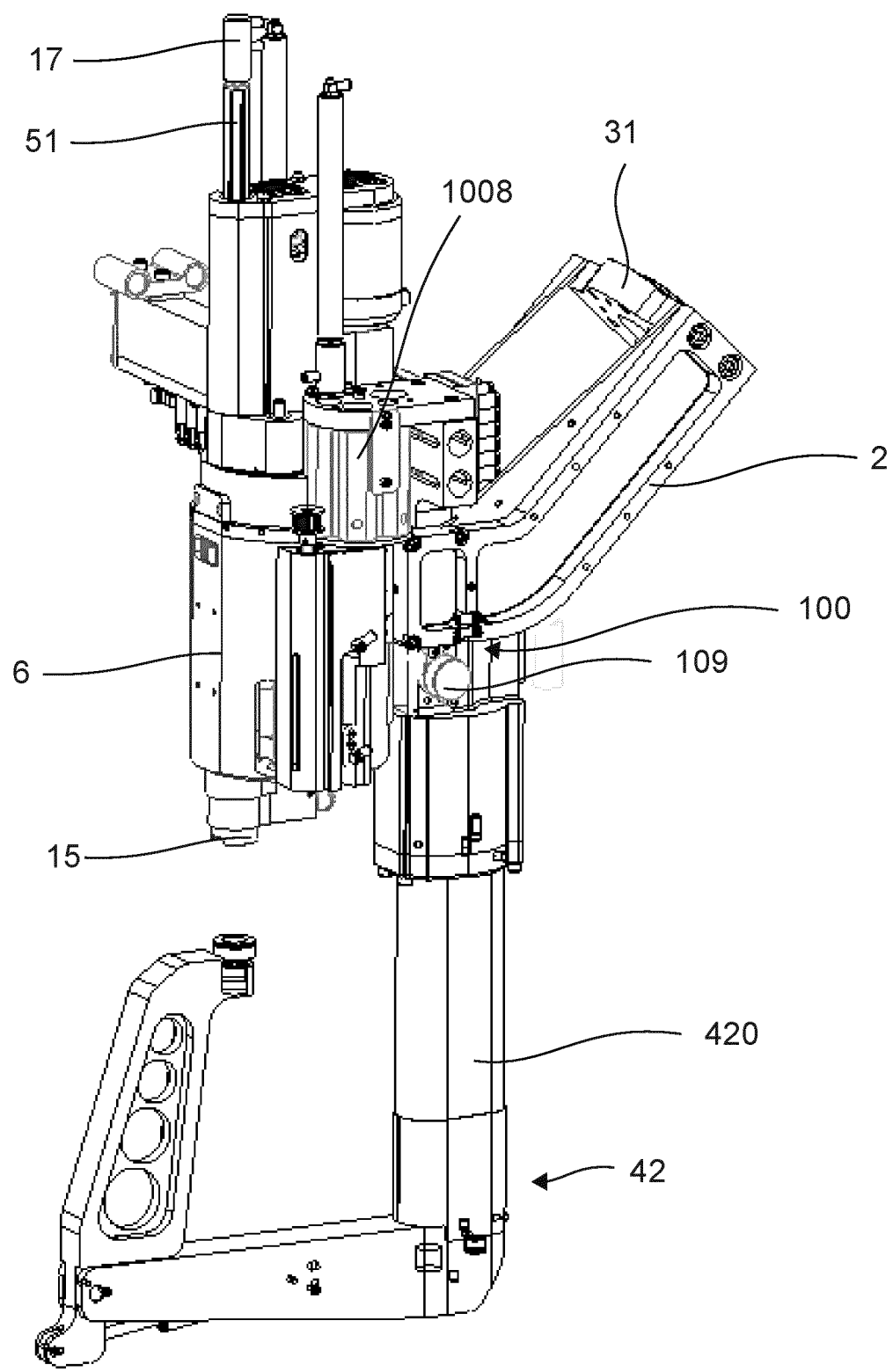
Figure 20:
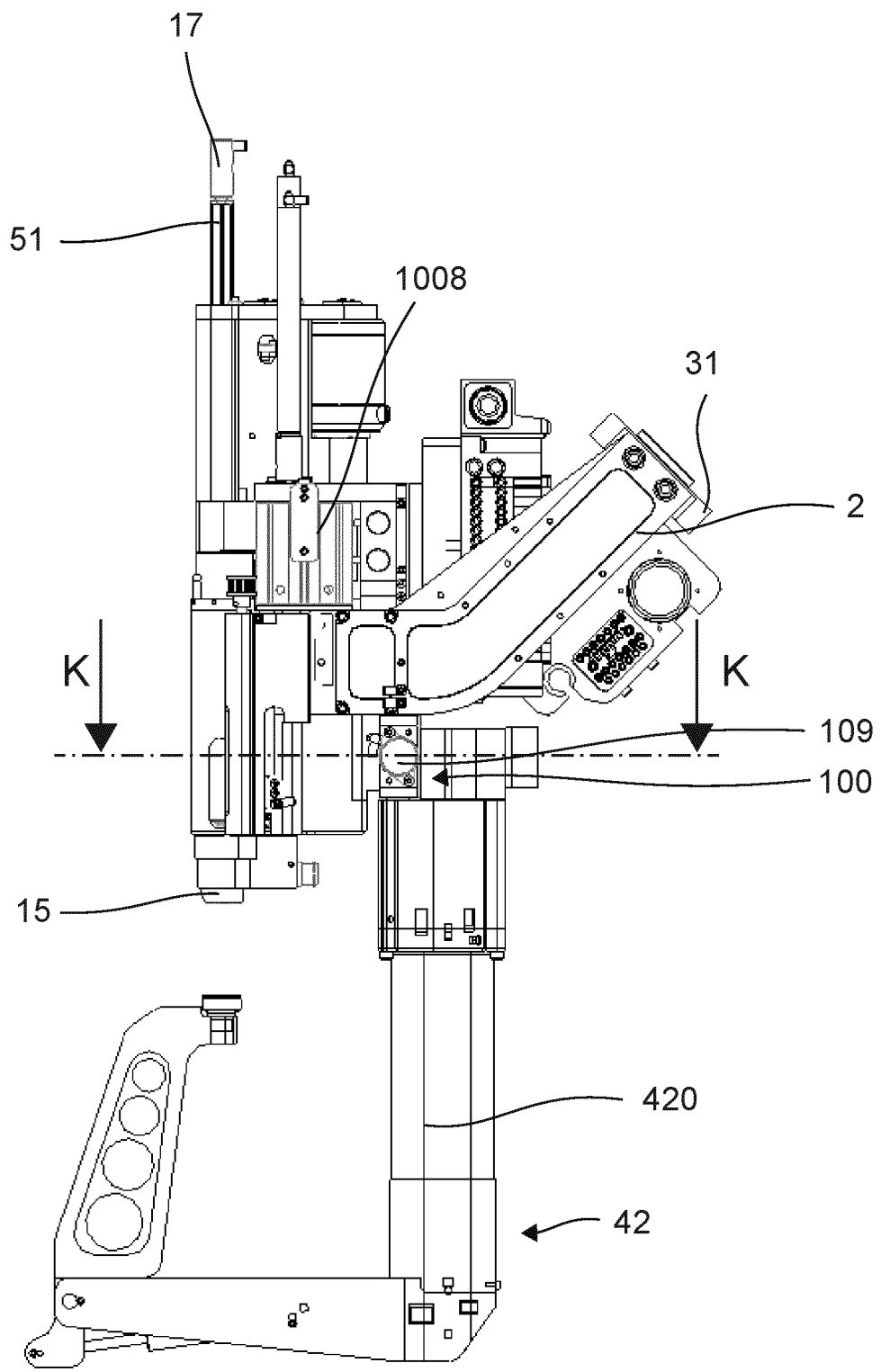
FIG. 20 illustrates the device of FIG. 19 from a different angle of view.
Figure 21:
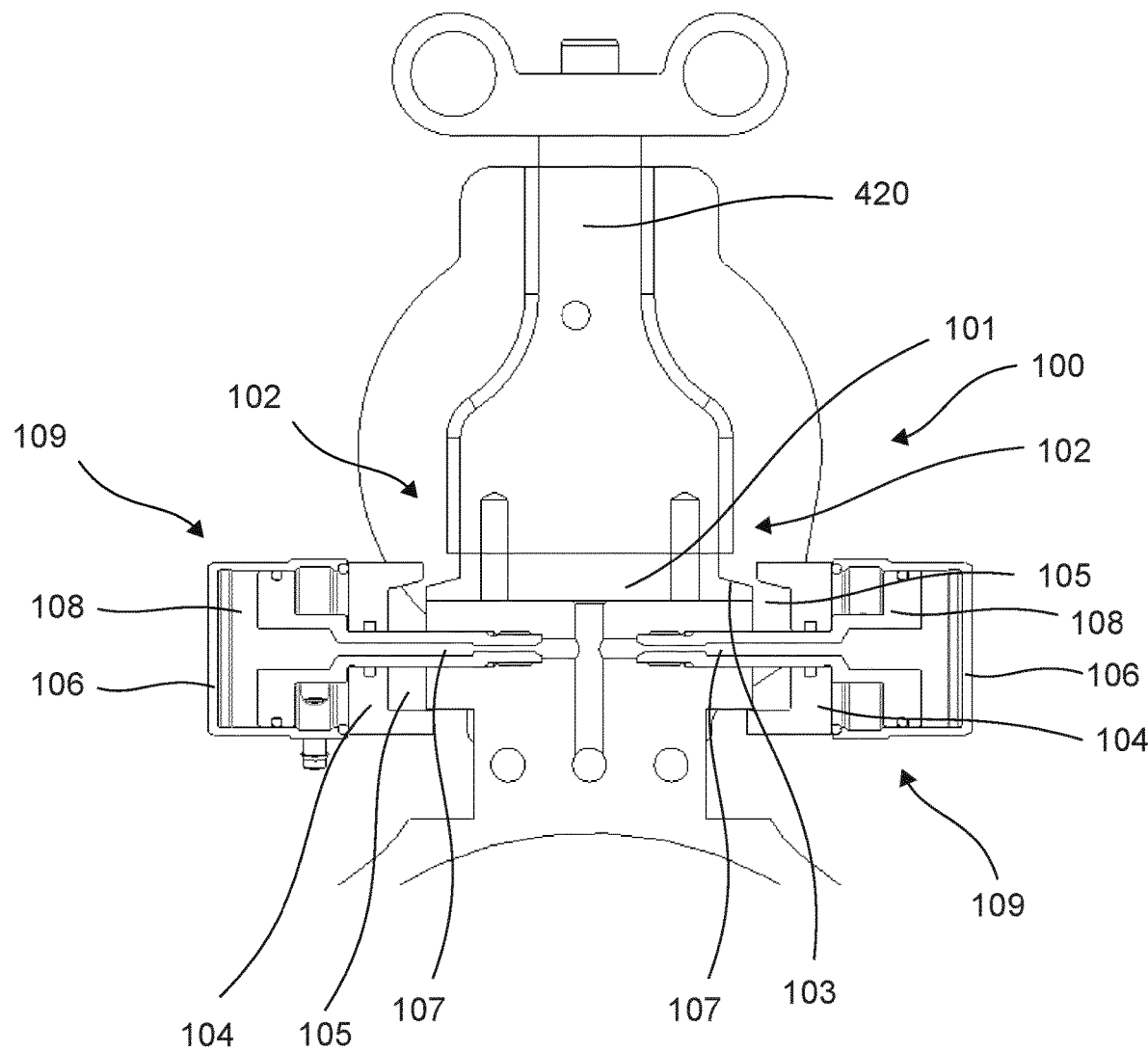
FIG. 21 illustrates a section along axis H-H of FIG. 20.
Figure 22:
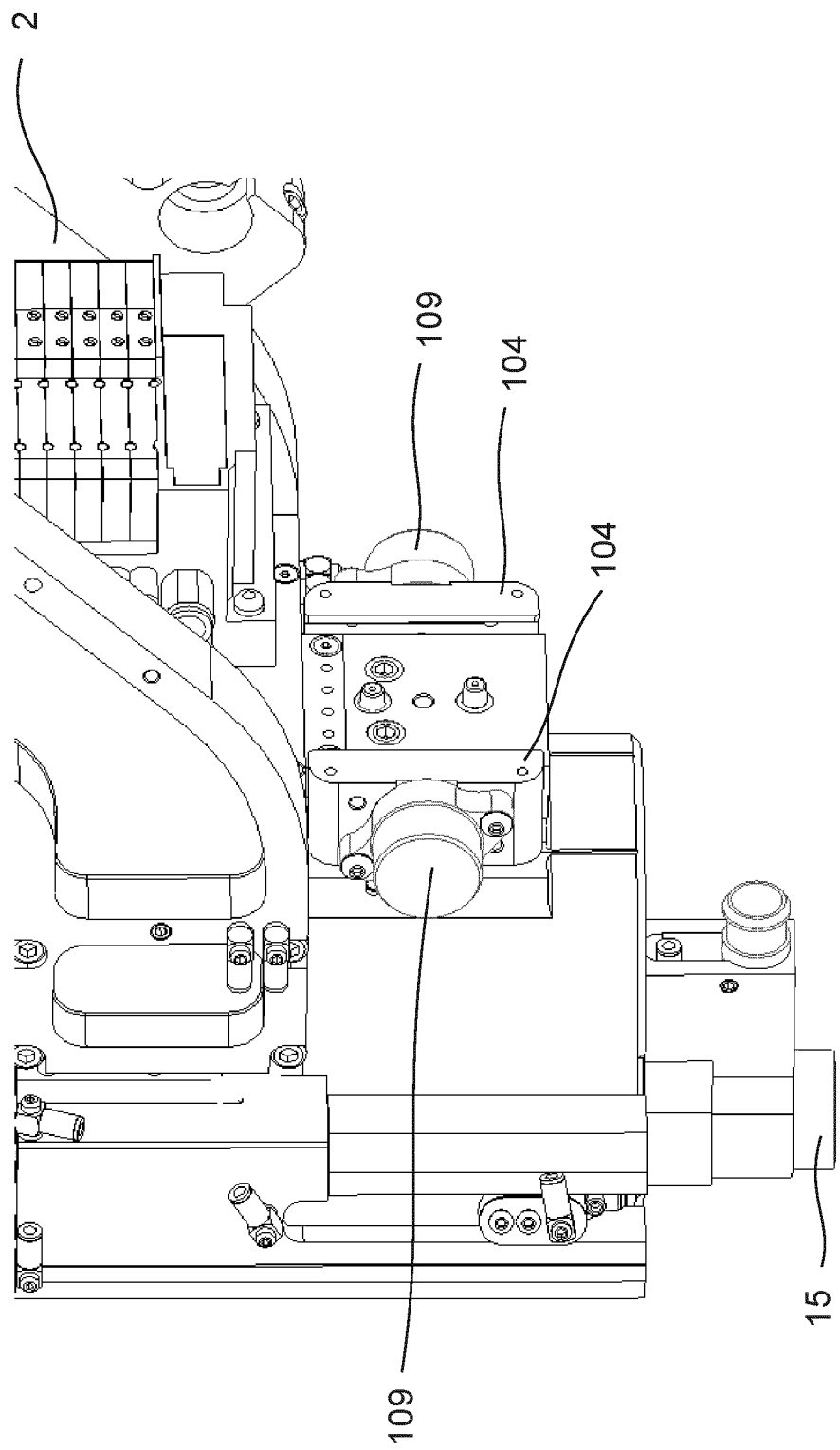
FIG. 22 illustrates a detail of FIG. 21.
Figure 23:
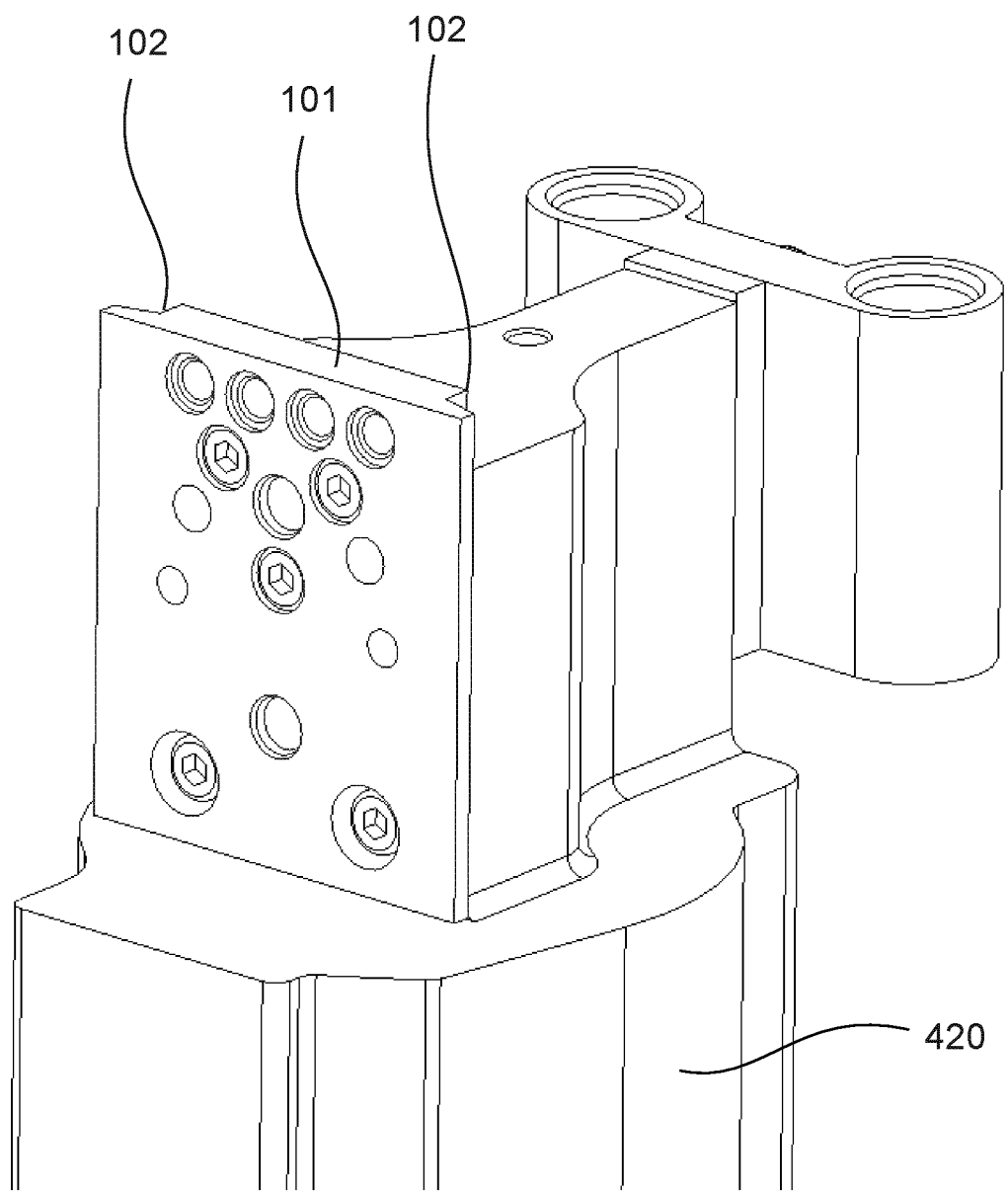
FIG. 23 illustrates a partial view of a general purpose securing device according to the invention.
Figure 24:
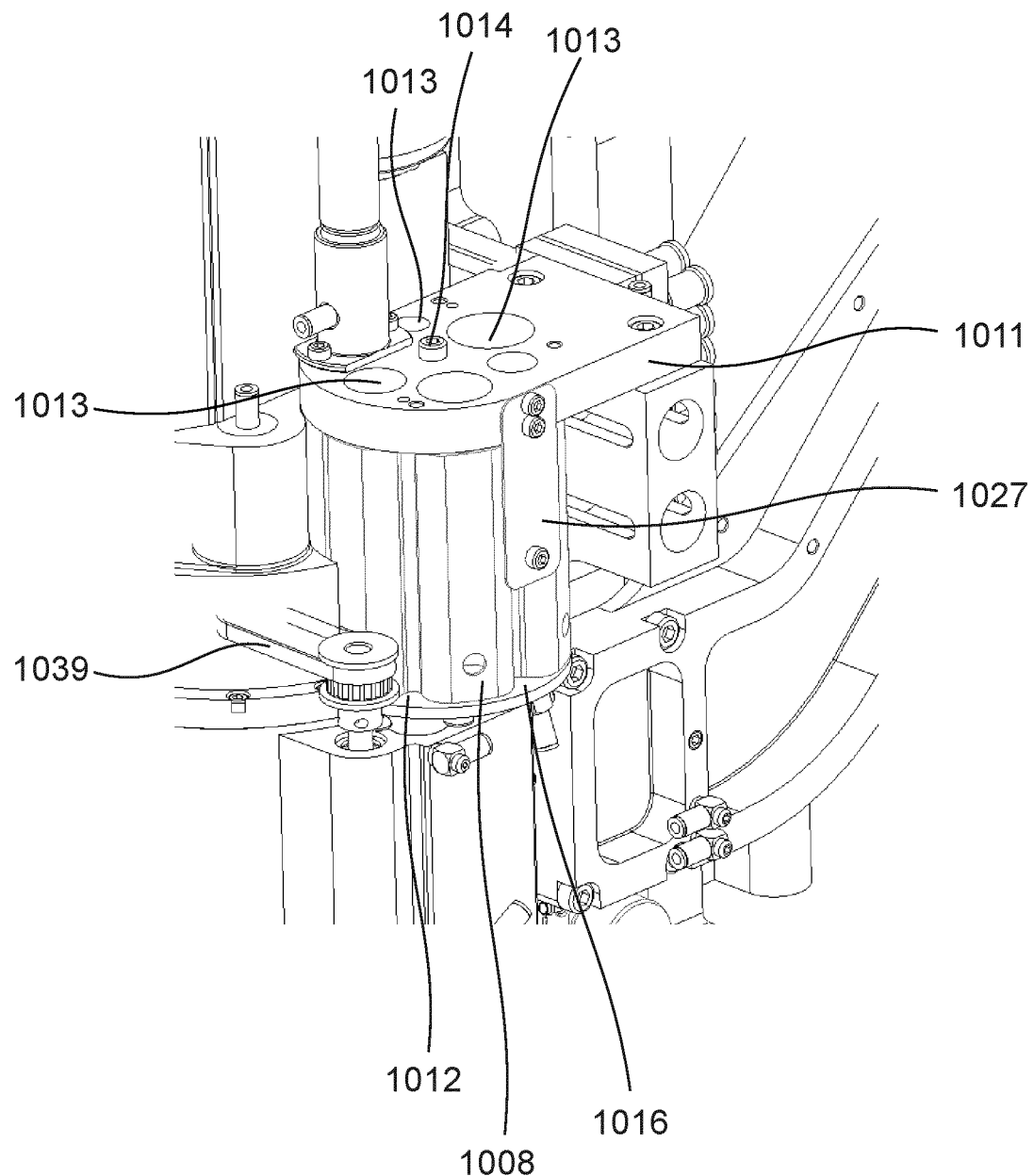
FIG. 24 illustrates a detail perspective view of the device of FIG. 1 at the secondary carousel.
Figure 25:
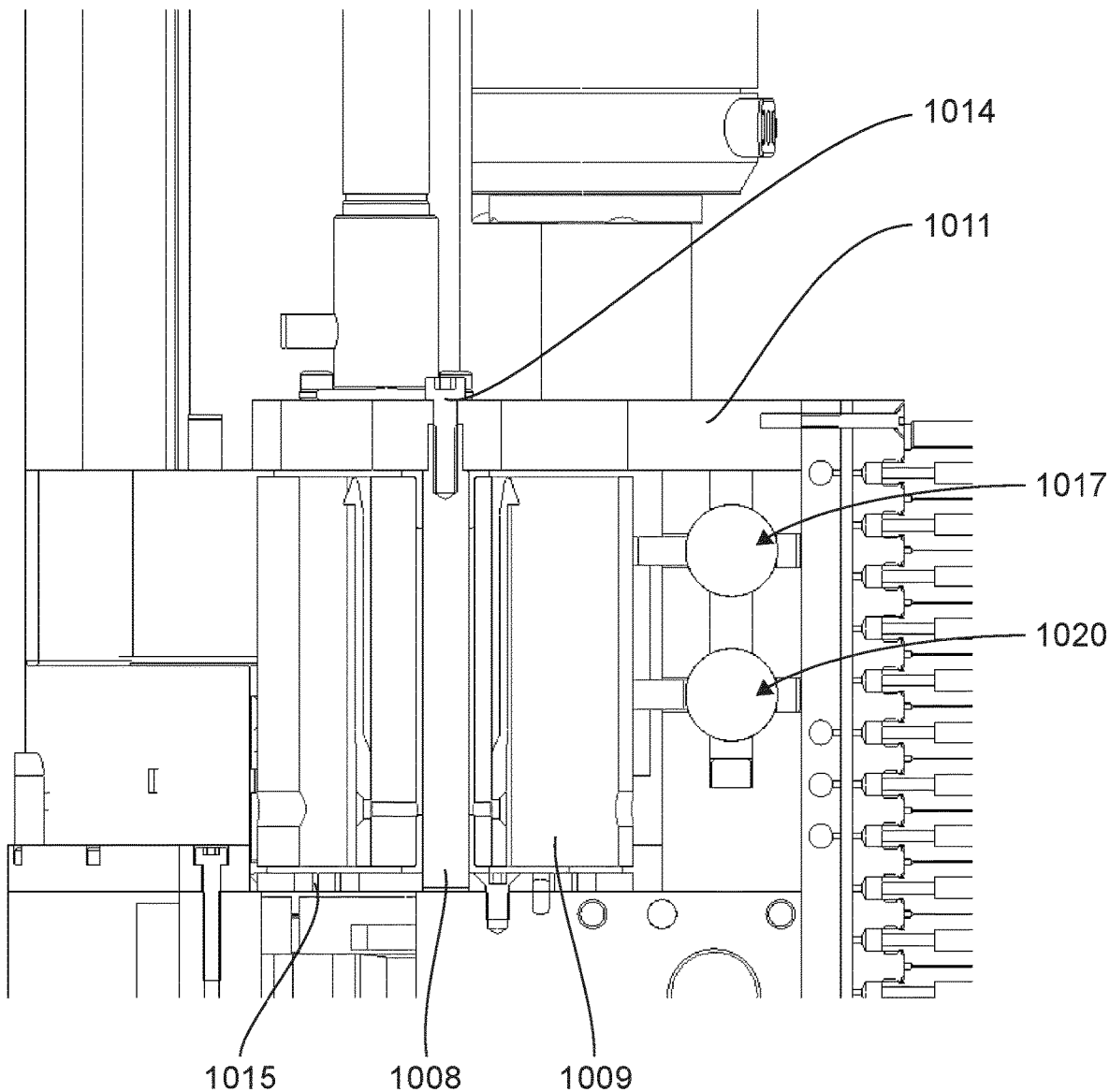
FIG. 25 illustrates a cross-section view along axis I-I of the secondary carousel.
Figure 26:
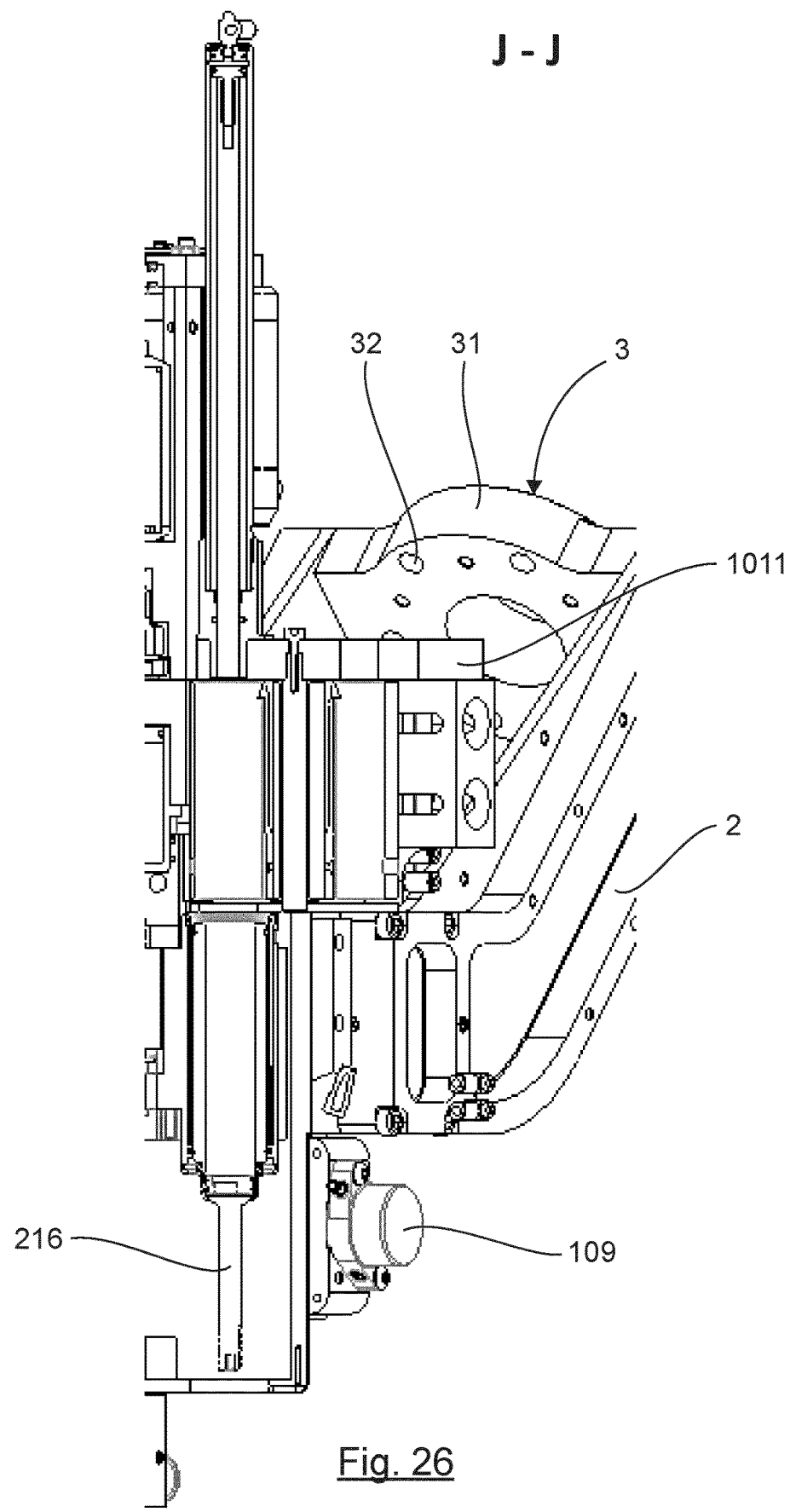
FIG. 26 illustrates a cross-sectional view along axis J-J of the secondary carousel.
Figure 28:
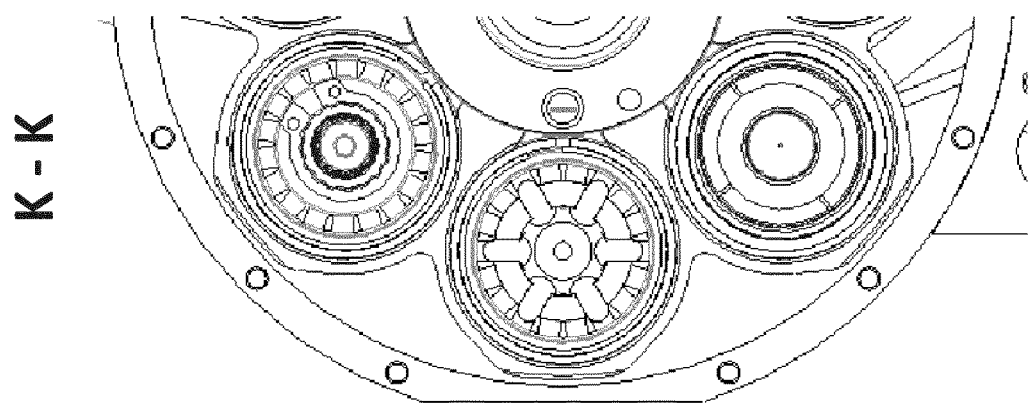
FIG. 28 illustrates a cross-sectional view along axis K-K of FIG. 27.
Figure 27:
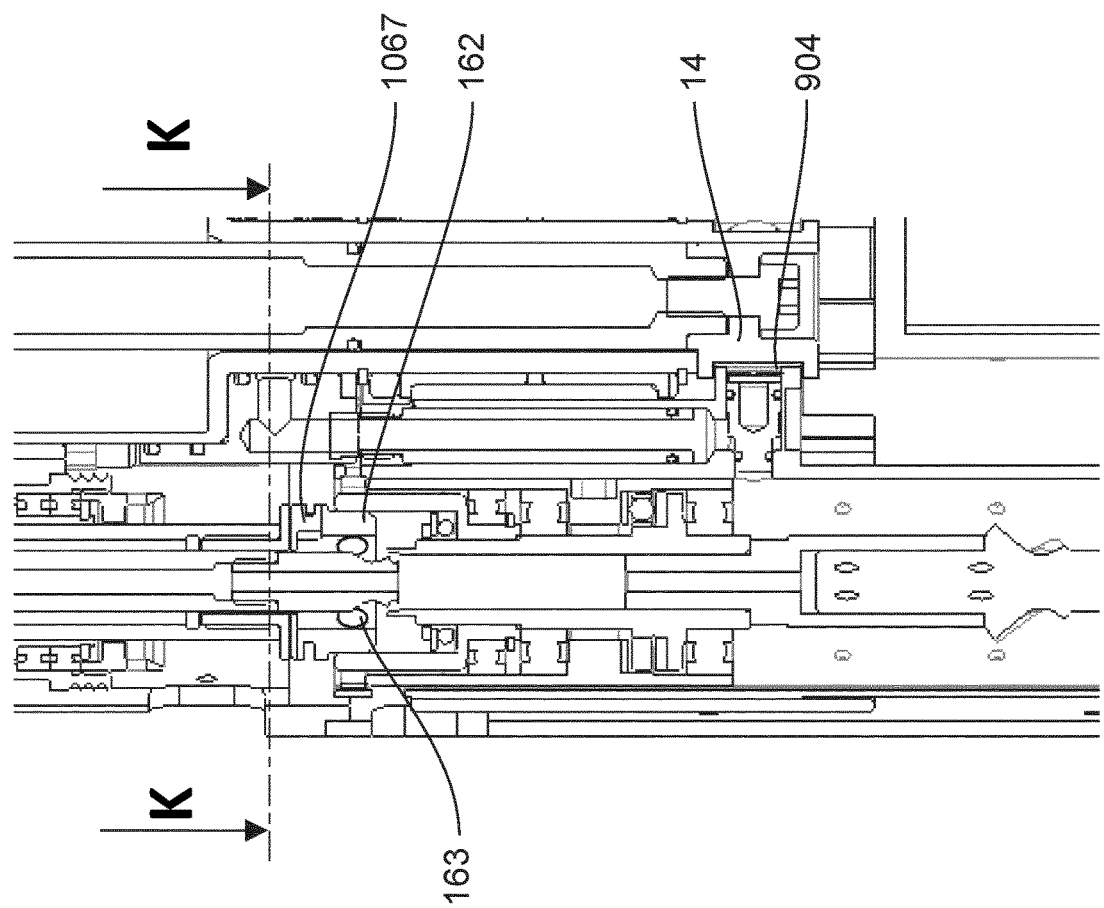
FIG. 27 illustrates a partial longitudinal cross-sectional view of the device at the quick pairing means.
Figure 29:
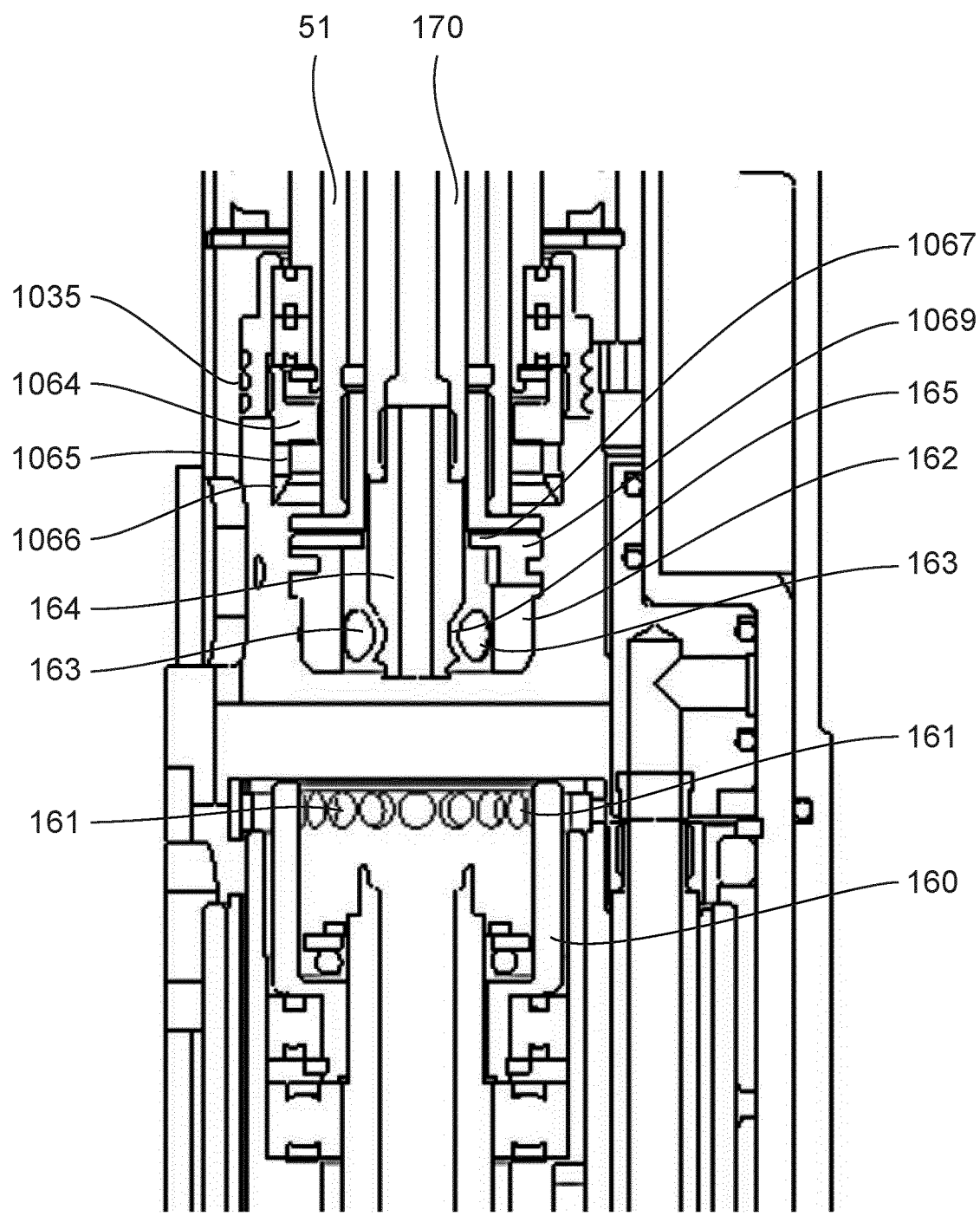
FIG. 29 illustrates a cross-sectional view along axis H-H of FIG. 4.
Figure 30:
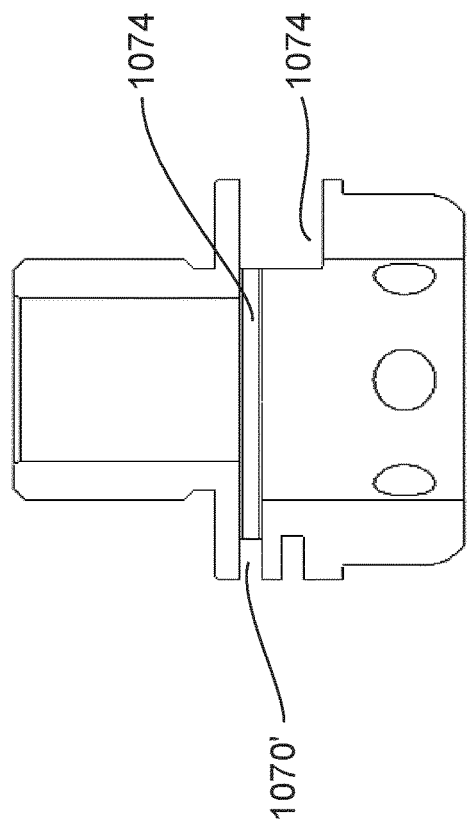
FIG. 30 illustrates a cross-sectional view of a male member of the pairing means.
Figure 31:
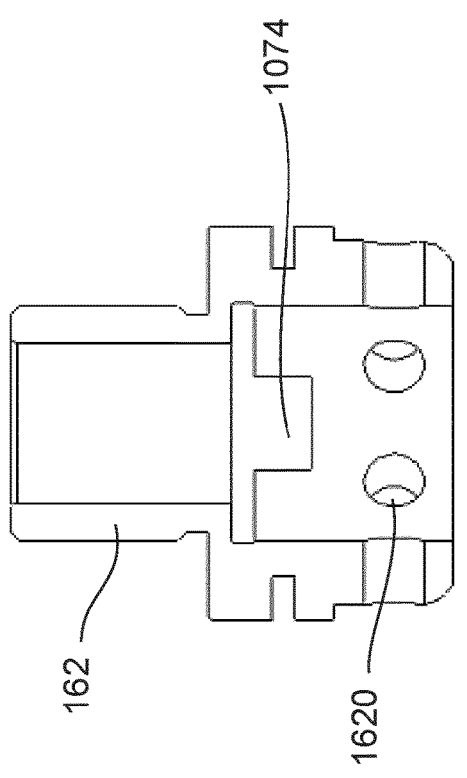
FIG. 31 illustrates a cross-sectional view along a 90° sectional plane of FIG. 30.
Figure 33:
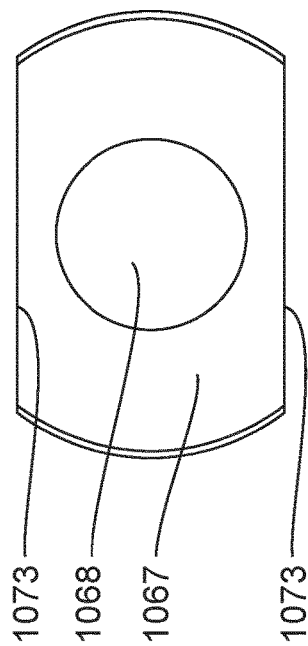
FIG. 33 illustrates a top view of a locking member.
Figure 32:
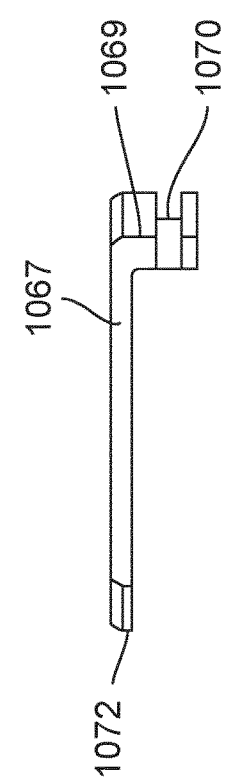
FIG. 32 illustrates a side view of a locking member.
Figure 34:
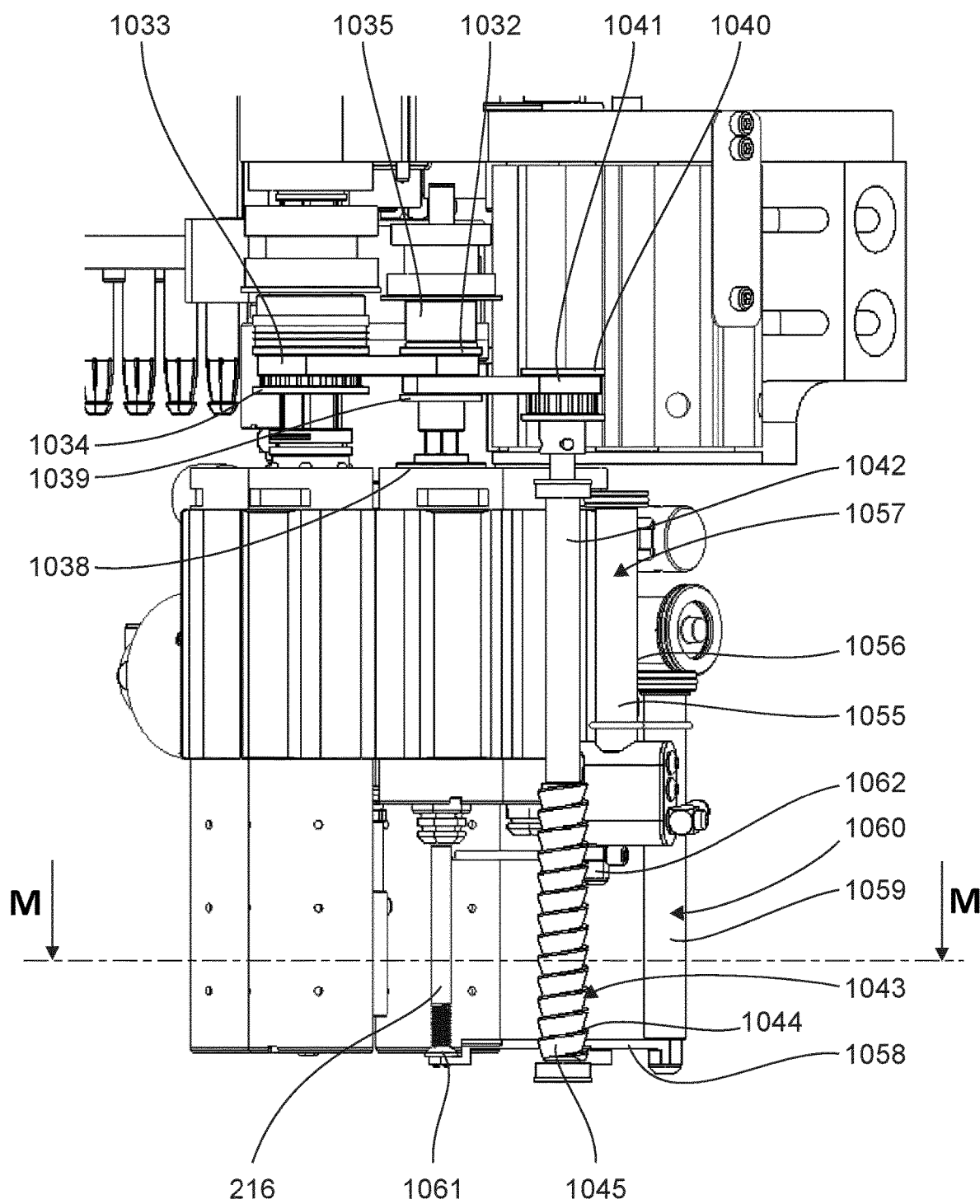
FIG. 34 illustrates a partial cross-sectional view of the coating station.
Figure 35:
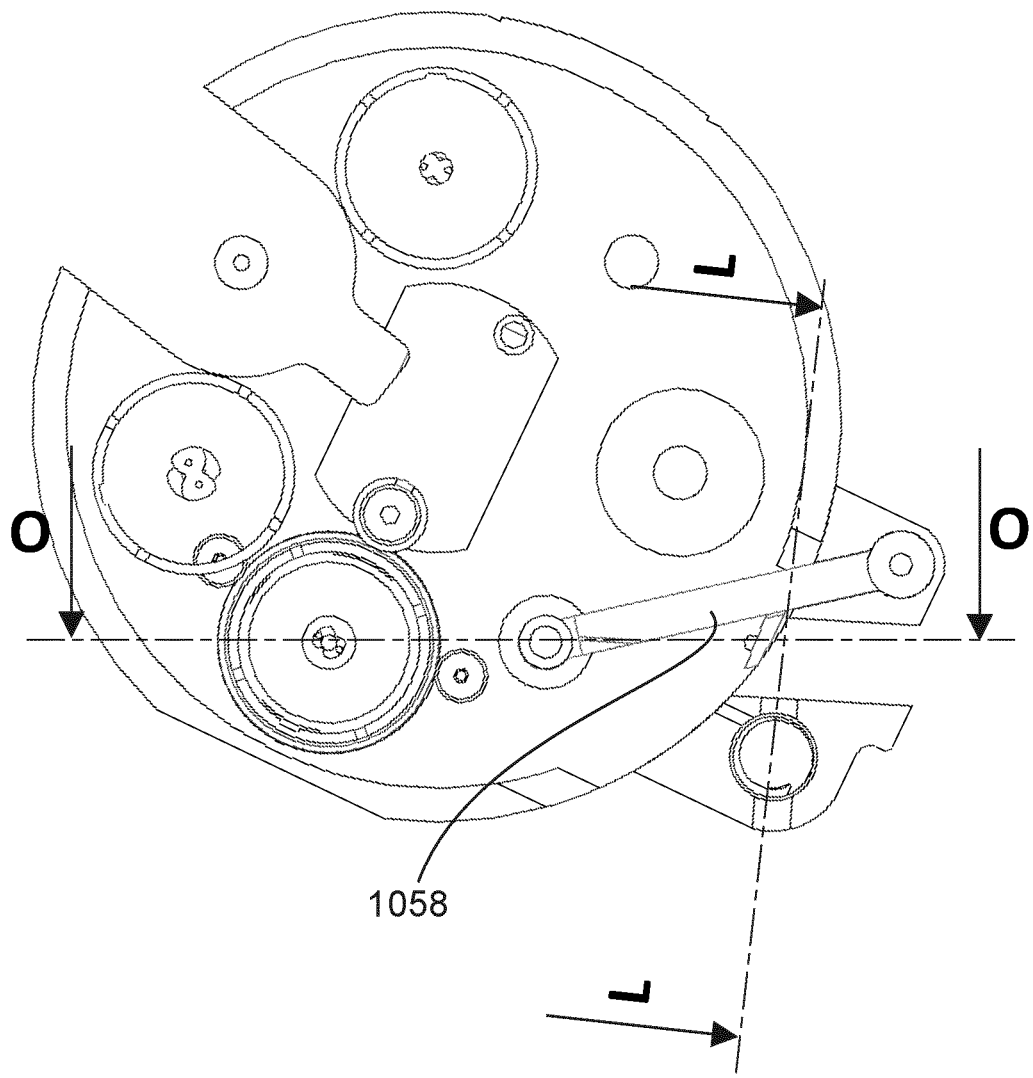
FIG. 35 illustrates a partial cross-sectional view along the axis M-M of FIG. 34.
Figure 36:
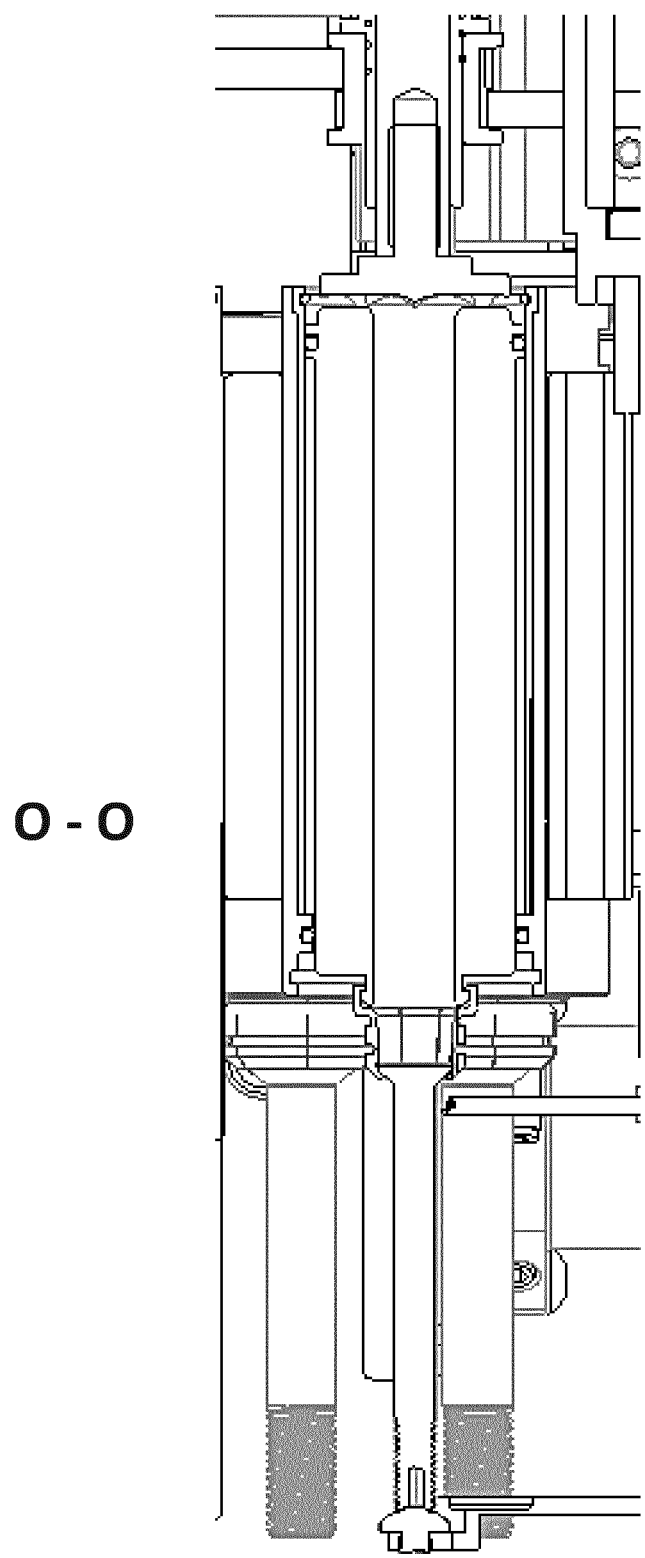
FIG. 36 illustrates a partial cross-sectional view of a rivet support module at the coating station.
Figure 37:
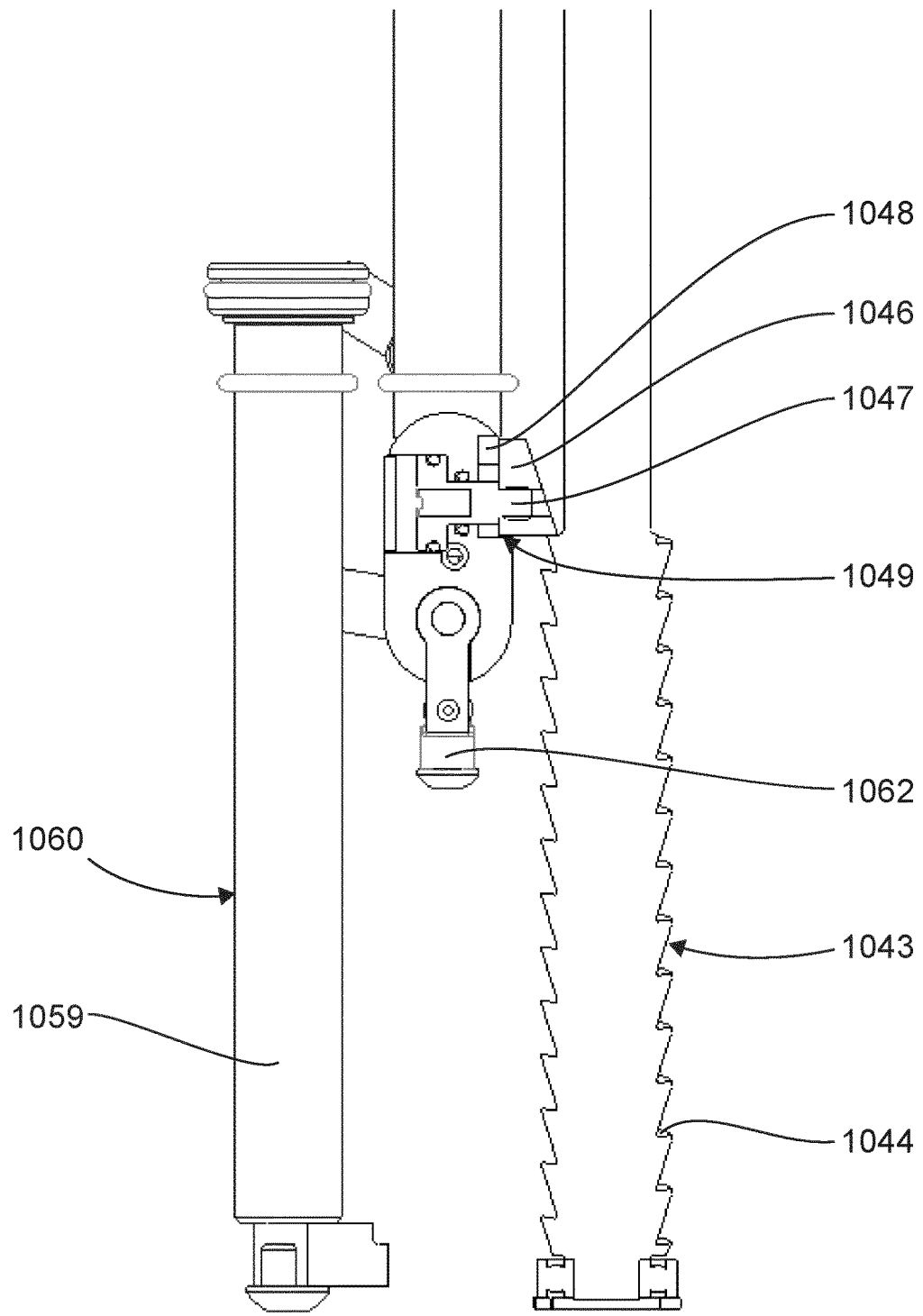
FIG. 37 illustrates the lead screw and shoe of the coating station.
Figure 38:
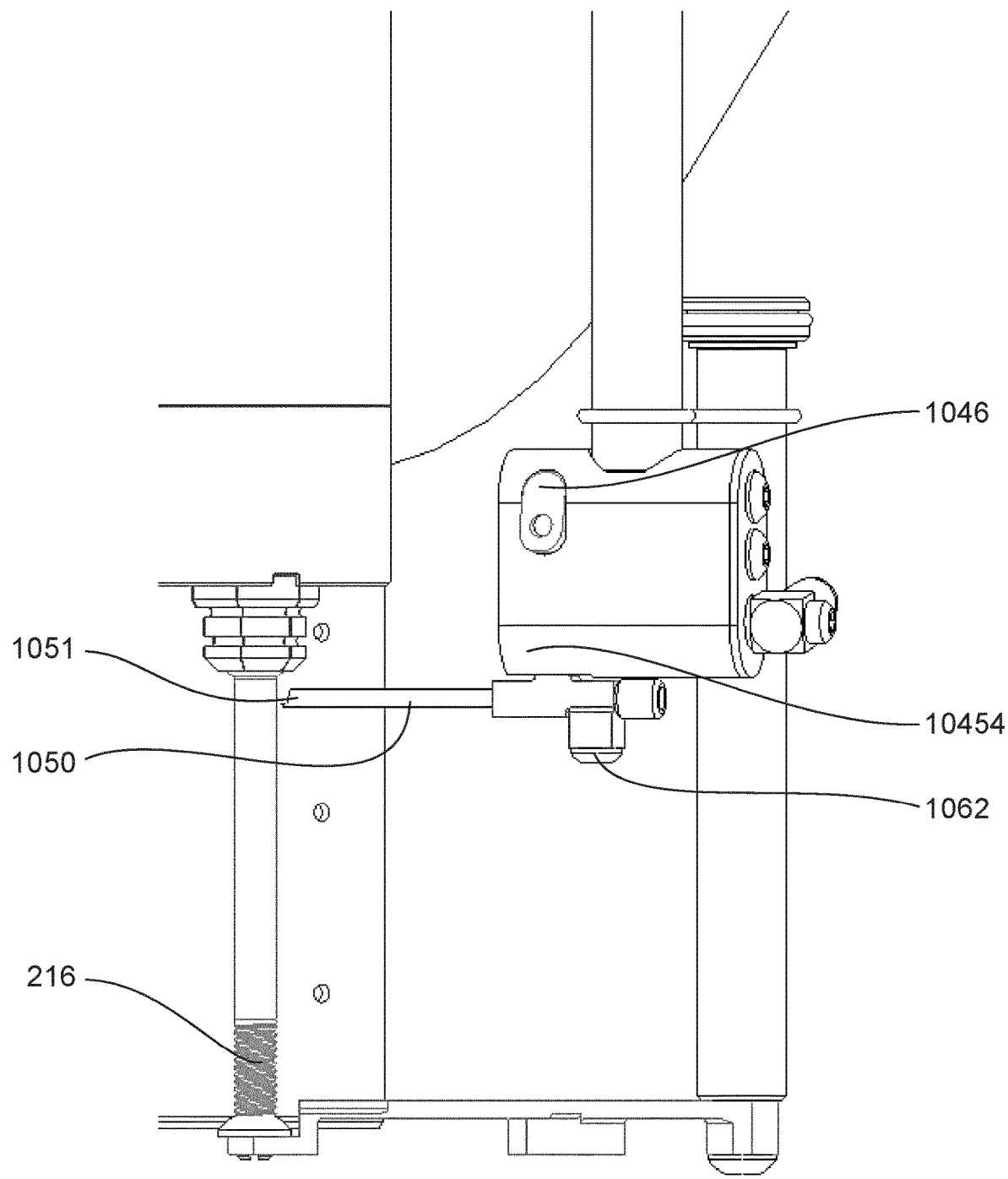
FIG. 38 illustrates a detail view of the coating station.

Alternatively, they may comprise a clamping C otherwise known in the state of the art, such as that illustrated in FIG. 19.

The means for securing to a structure to be worked on may be permanently secured to the frame. Alternatively, they can be secured to the frame by means of general purpose reversible fastening means 100.

General Purpose Reversible Fastening Means of the Means for Securing to a Structure to be Worked on The general purpose reversible fastening means 100 comprise a fastening plate 101.

In the case of the suction cups 41, the fastening plate 101 will be integral with a carrying structure carrying the suction cups.

In the case of the clamping C 42, the fastening plate 101 will be integral with the distal end of a bar 420 of the clamping C.

This fastening plate 101 has an essentially rectangular cross-section in one plane and a cross-section with two lateral grooves 102 in another plane orthogonal to the first one.

These lateral grooves 102 extend along the length of the fastening plate 101 and comprise a tilted face 103 so that the thickness of the grooved portions of the fastening plate 101 tends to thicken from the ends towards the inside of the plate.

The general purpose reversible fastening means comprises a pair of jaws 104 complementary in shape to the grooved ends of the fastening plate 101.

These jaws 104 thus each define a housing 105 able to receive the corresponding grooved end of the fastening plate 101. These housings 105 thus each have two opposite surfaces, one of which is tilted with respect to the other by an angle substantially identical to the tilt angle of the corresponding groove of the fastening plate.

Each jaw is integral with the cylinder 106 of a jack 109, the rod 107 of the piston 108 of which passes through the jaw 104 and is secured to the frame.

The jaws 104 are movably mounted between at least:
an unsecuring position in which they are moved away from each other to allow introduction of the grooved ends of the fastening plate 101 in order to secure the means for fastening to a structure to be worked on to the frame, and
a securing position in which they are moved closer to clamp (catch in a vice) the grooved ends of the fastening plate 101 in order to secure the means for securing to a structure to be worked to the frame.

As they move from their unsecuring position to their securing position, the tilted surfaces of the grooved ends of the fastening plate 101 gradually slide against the tilted surfaces of the corresponding jaws 104 to ensure a wedge effect securing.

In order to secure the desired fastening means to the frame, the jacks 109 are actuated to bring the jaws 104 into their release position.

The fastening plate 101 of the securing means is then inserted between the jaws 104.

The jacks 109 are then actuated to place the jaws 105 in their securing position in which they clamp the grooved ends of the fastening plate 101.

Unsecuring the securing means is achieved by performing conversely.

Functional Modules

The device is capable of incorporating a plurality of functional modules which will be described in more detail below.

Each of these functional modules enables a particular task to be carried out, such as, for example, a drilling and/or countersinking operation, a rivet setting operation, a temporary fastener (e.g. a staple) setting operation, or an operation for applying (or coating) a bead of sealing compound to a fastener element (a rivet or a screw). Other functions, such as screwing, could be contemplated.

Drilling and/or Countersinking Module

Figure 2:
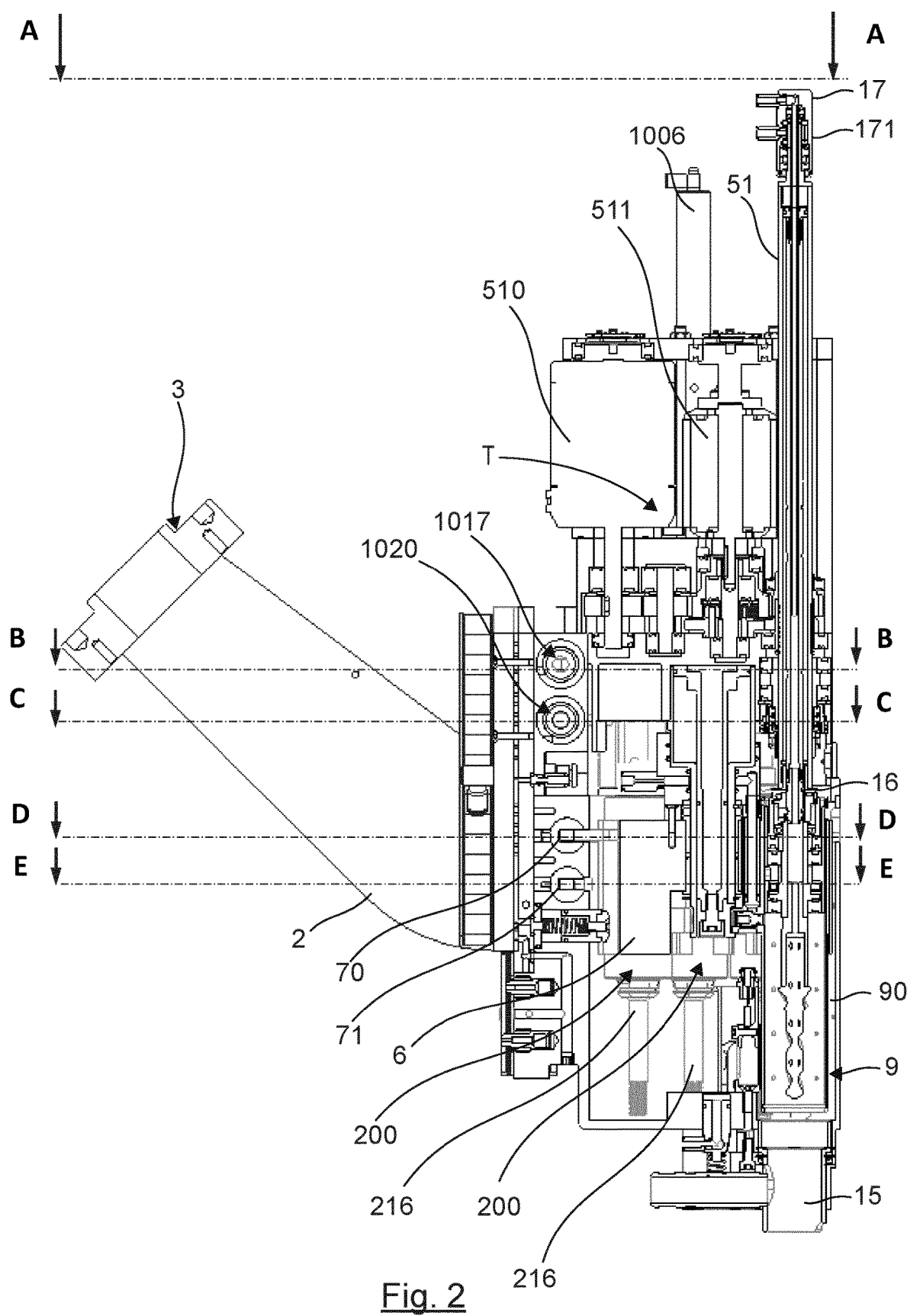
FIG. 2 illustrates a cross-sectional view of the device of FIG. 1 in a plane passing through the axis of the spindle.
Figure 3:
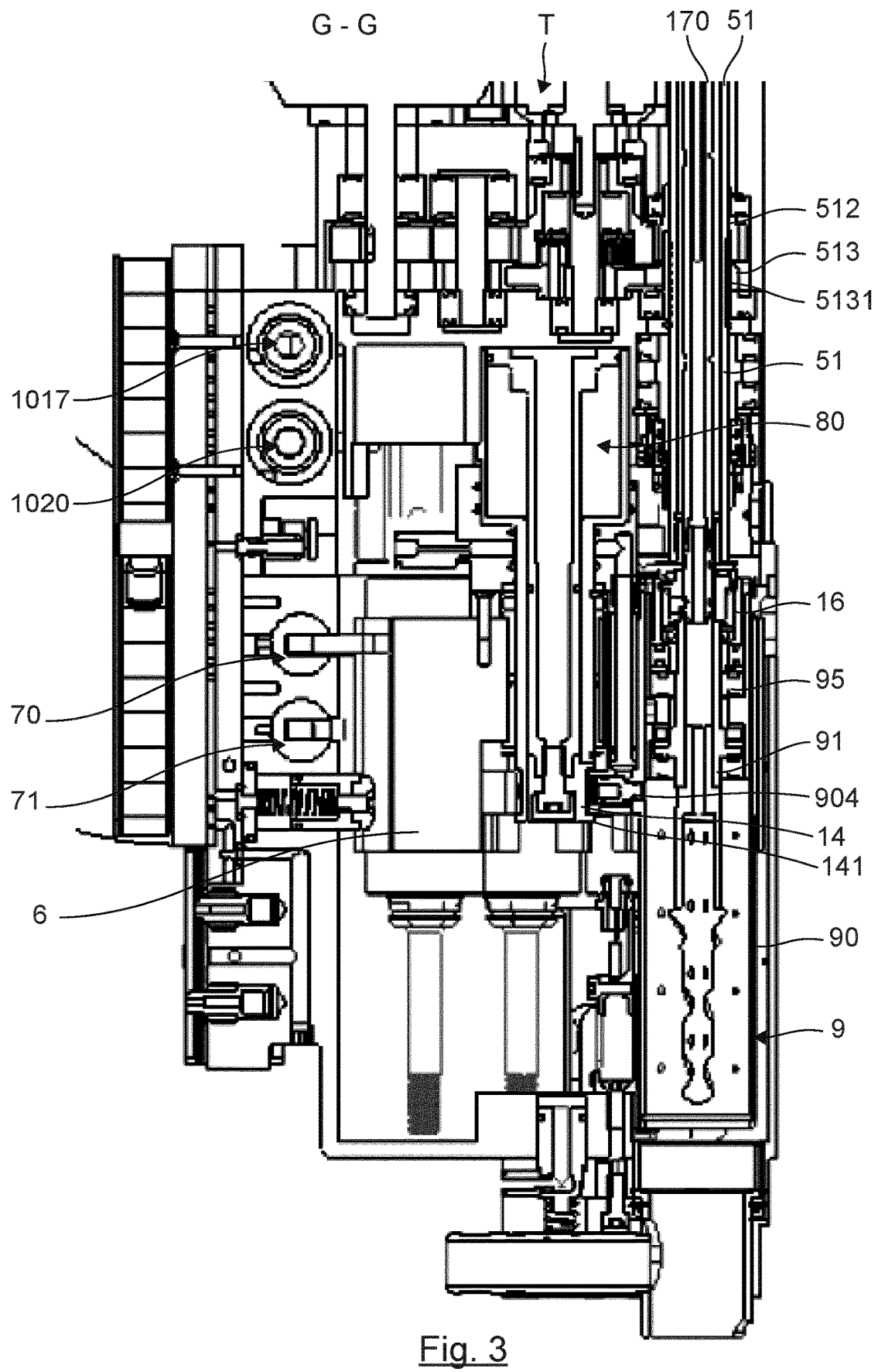
FIG. 3 illustrates an enlarged partial view of FIG. 1.
Figure 4:
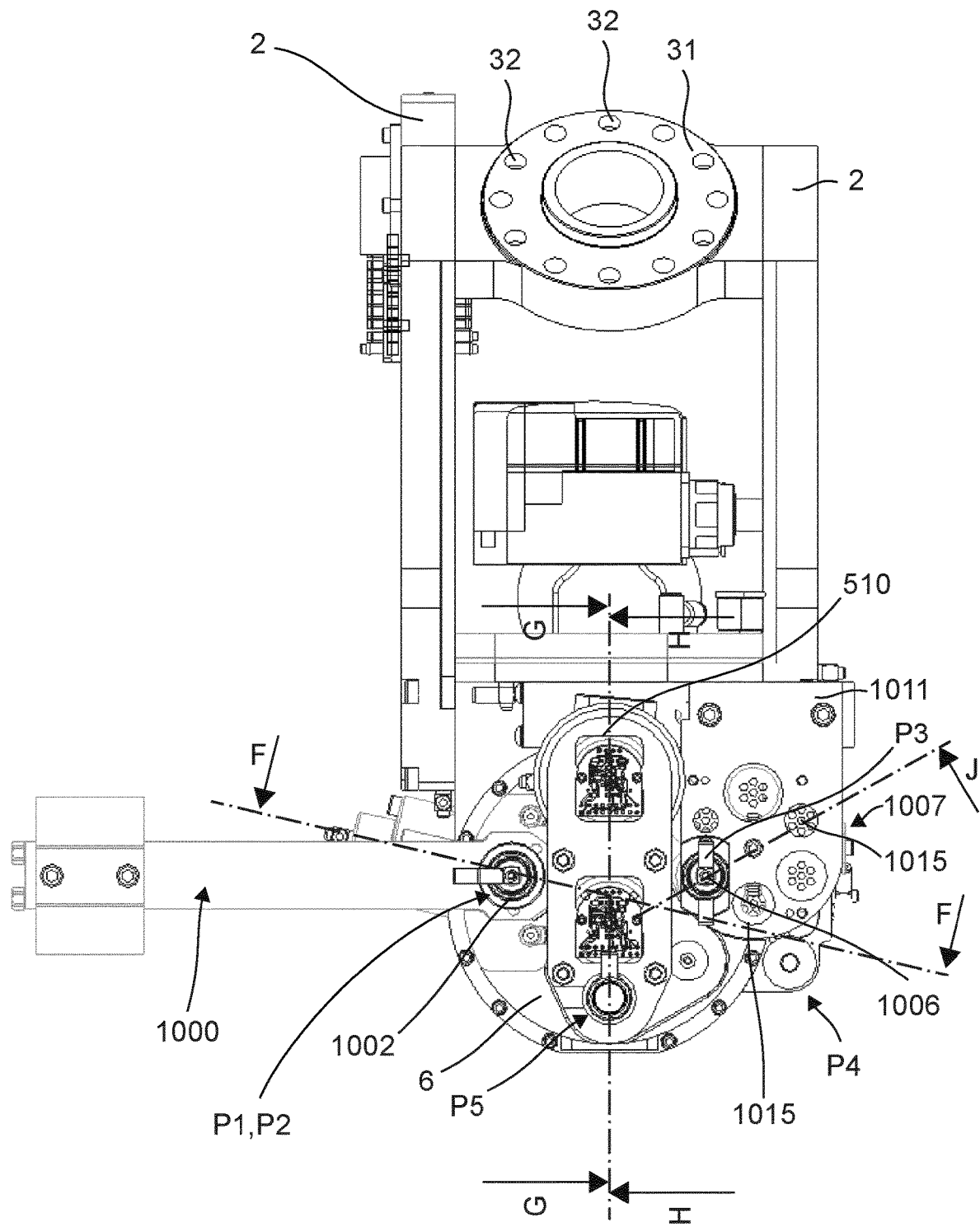
FIG. 4 illustrates a view of the device of FIG. 1 along the plane A-A of the device of FIG. 3.

The functional module 9 illustrated in line with the spindle 51 in FIG. 2 is a drilling module.

The drilling module comprises a sleeve 90.

This sleeve 90 is tubular in shape and overall annular in cross-section.

The sleeve 90 comprises a side finger 900 projecting from its side wall.

The sleeve 90 includes a lateral groove 901 that is diametrically opposed and offset along the longitudinal axis of the sleeve from the finger 900.

This drilling module comprises an output shaft 91 (i.e. movable member) at the end of which a cutting tool such as a drill 92 (possibly stepped to allow a countersinking cut to be made) may be secured by fastening means 93 known per se. The cutting tool may, for example, be a simple drill for making simple drillings, a stepped drill, a countersinking drill for making milled drillings, or a countersinking tool for countersinking previously made drillings.

The output shaft 91 is rotatably mounted in a bearing 94, which in turn is slidably mounted along the sleeve 90 by means of a bushing 95.

The finger 900 of the sleeve 90 of the drilling module houses a chamber 902 in which a piston 903 of a jack 904 is slidably mounted. The end 905 of the piston 903 is capable of being housed in a complementary-shaped housing 950 provided for this purpose in the bushing 95.

The finger 900 extends to a supply conduit 906 of the jack 904 capable of being communicated with a pressurised air intake conduit 907 provided in the device, with which it is in communication when it is at the work station of the device.

Elastic return means (not represented) tend to return the piston 903 to a position in which its end 905 is housed in the corresponding housing 950 of the bushing 95 so as to prevent it from moving in translation inside the sleeve 90 and consequently to prevent the bushing 95, the bearing 94, the output shaft 91 and the tool 92 which it carries from coming out of the sleeve 90 as long as the functional module is not paired to the spindle 51.

The end 905 and the corresponding jack 904 constitute means for preventing translation of a functional assembly of a functional module inside its sleeve. A functional assembly comprises all the components of a functional module translationally freely mounted in its sleeve.

Figure 5:
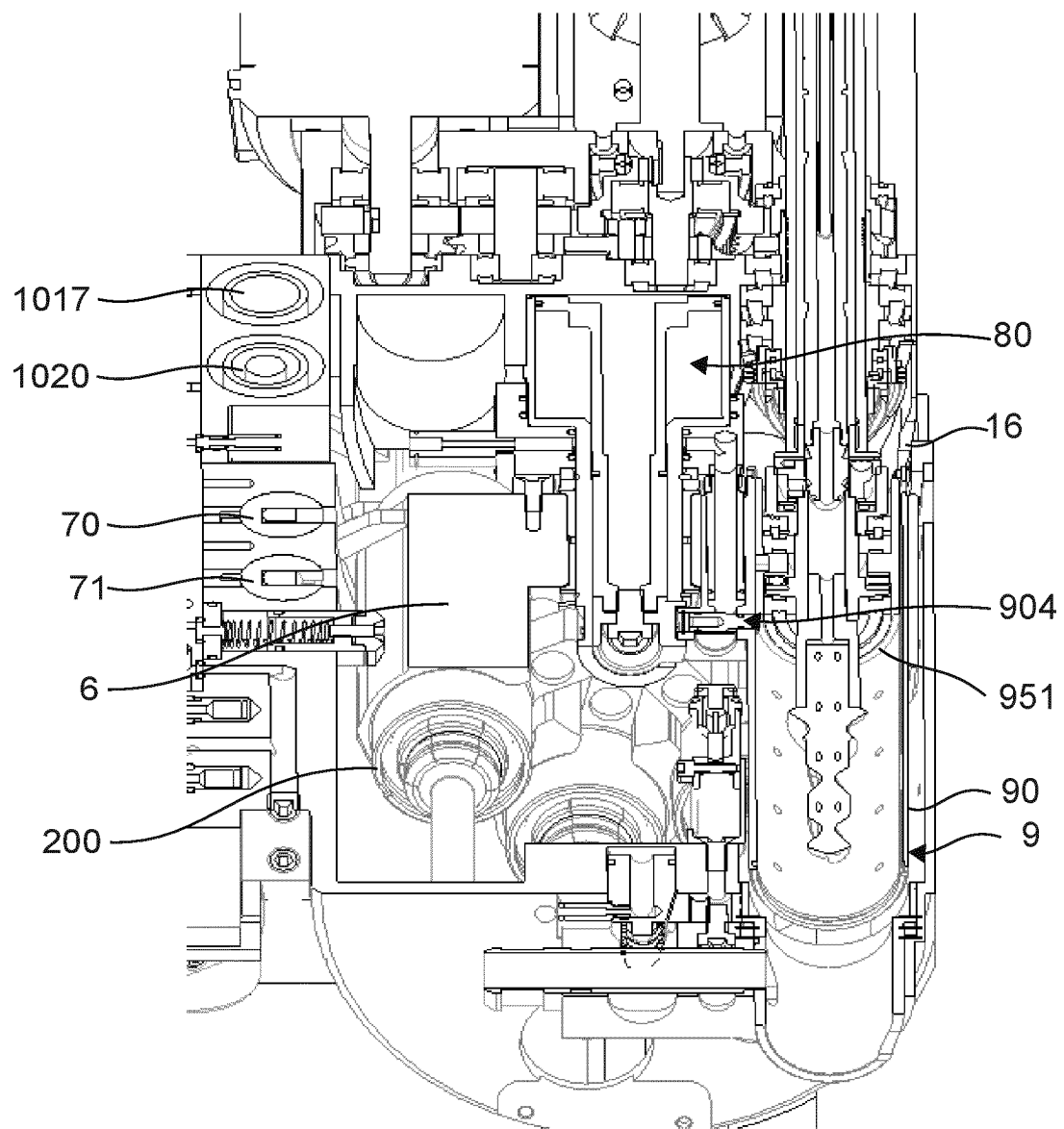
Figure 7:
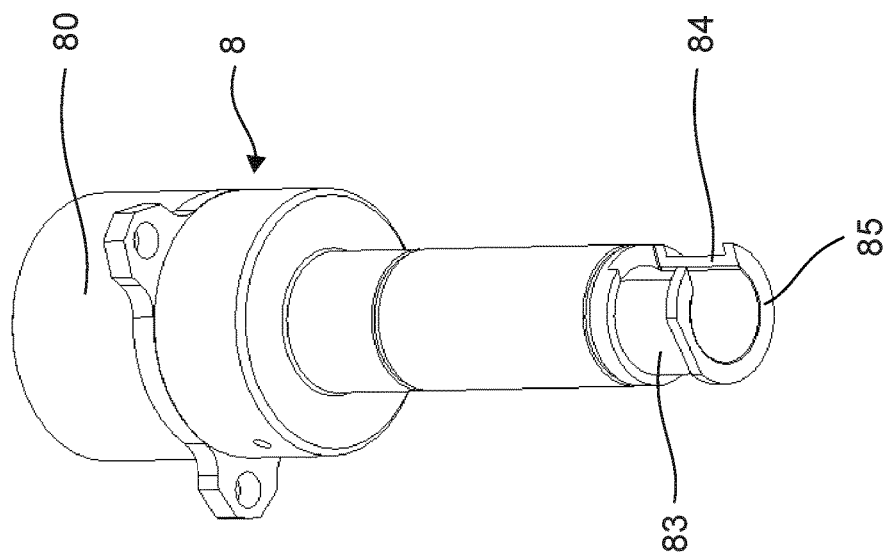
FIG. 7 illustrates a perspective view of a carousel rotation guide shaft of a device according to the invention.
Figure 6:
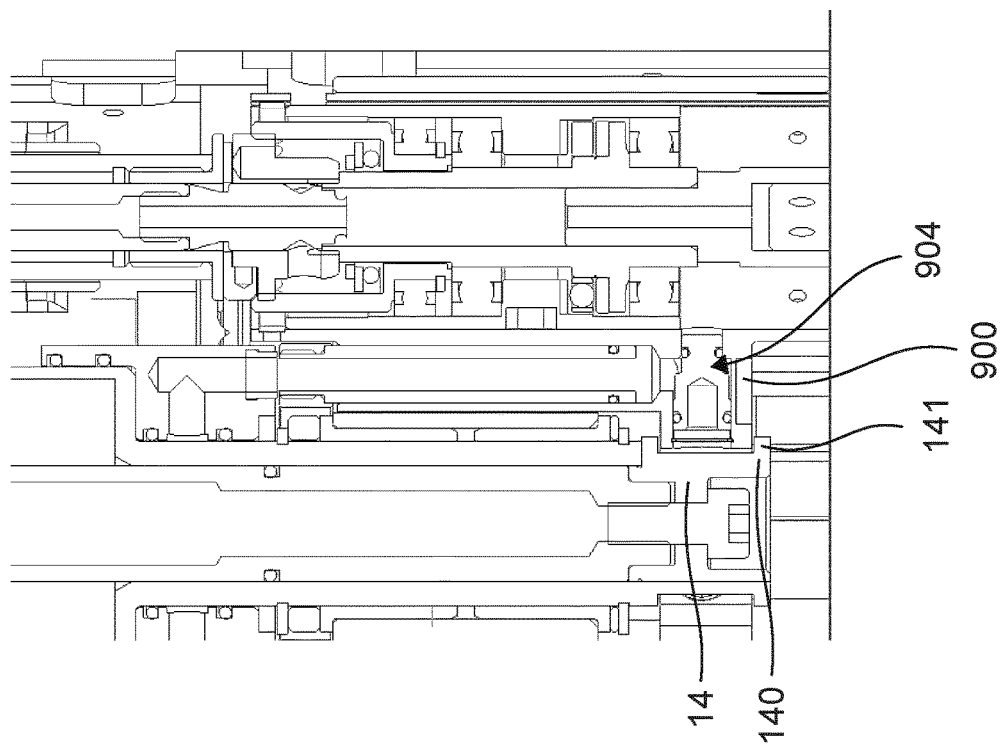
FIG. 6 illustrates a partial cross-sectional view along a plane passing through the spindle and the carousel rotation guide shaft of a device according to the invention.
Figure 8:
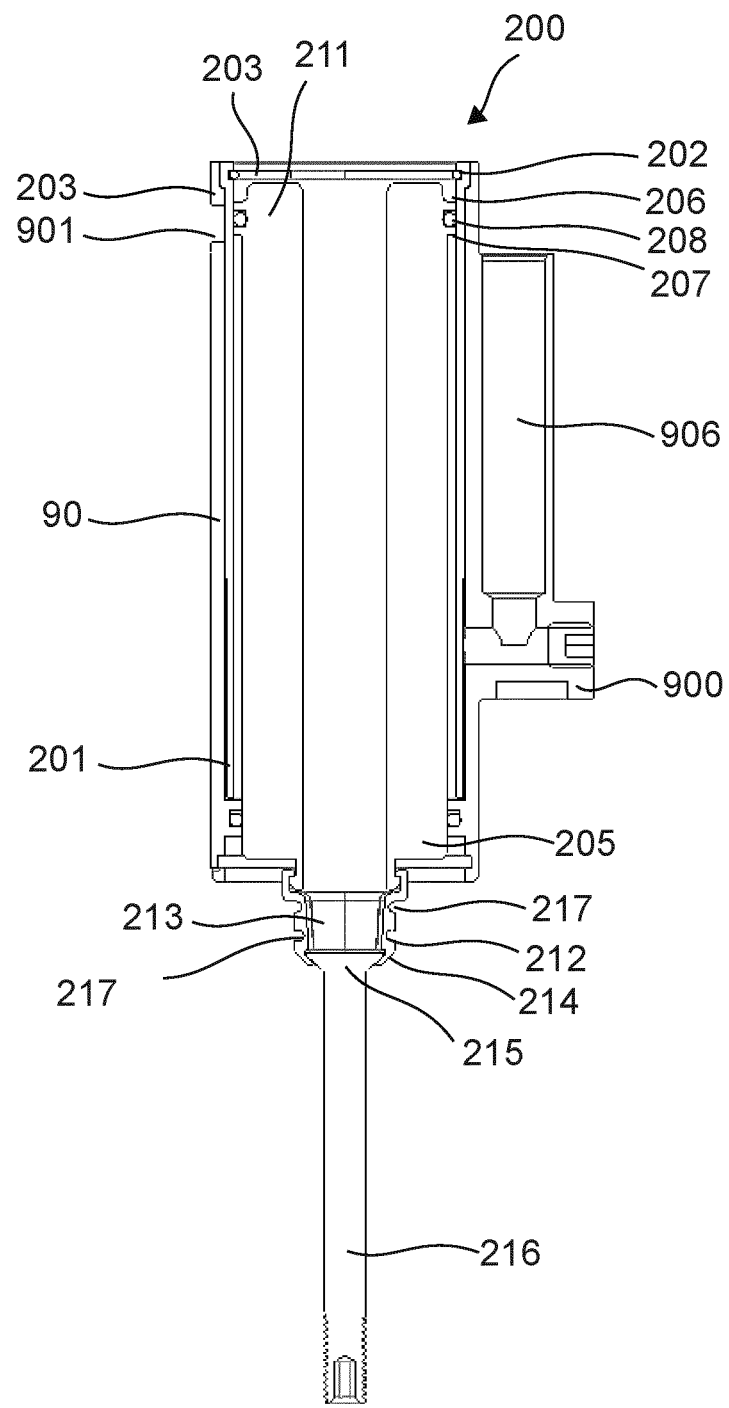
FIG. 8 illustrates a cross-section view of a rivet support module.
Figure 9:
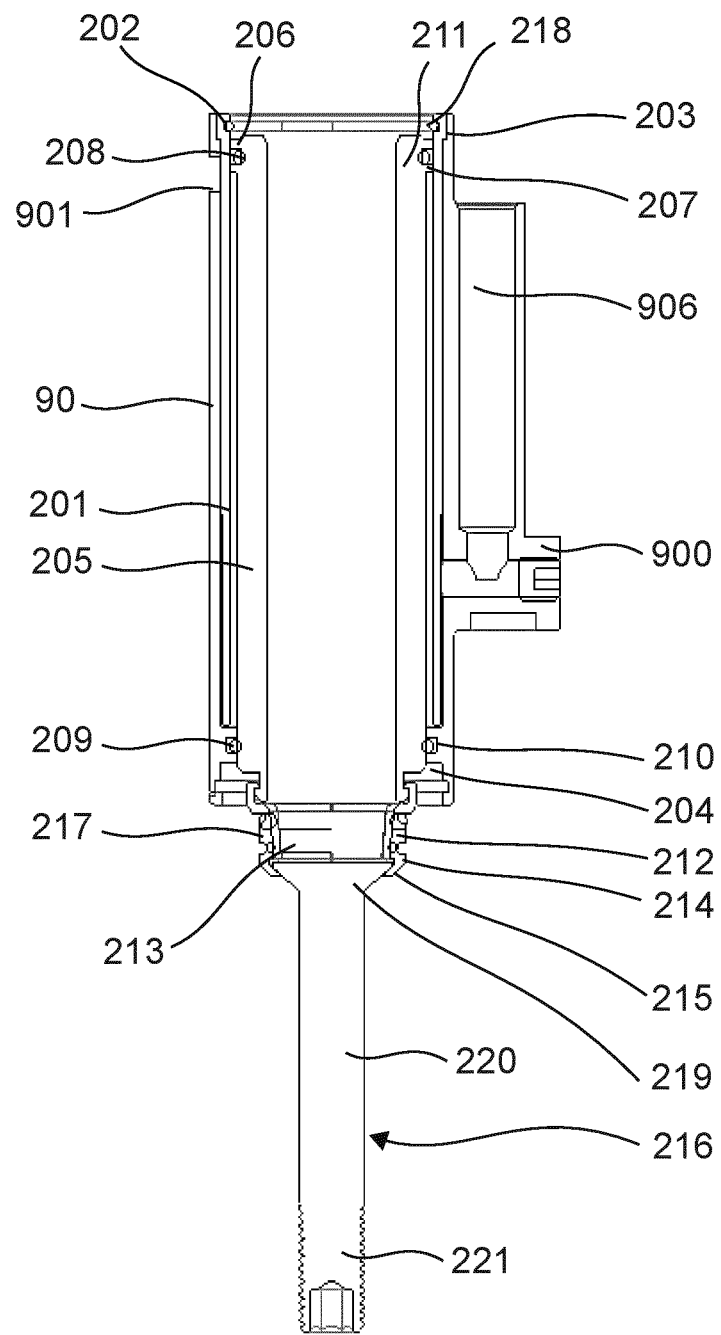
FIG. 9 illustrates a cross-sectional view of another rivet support module.
Figure 10:
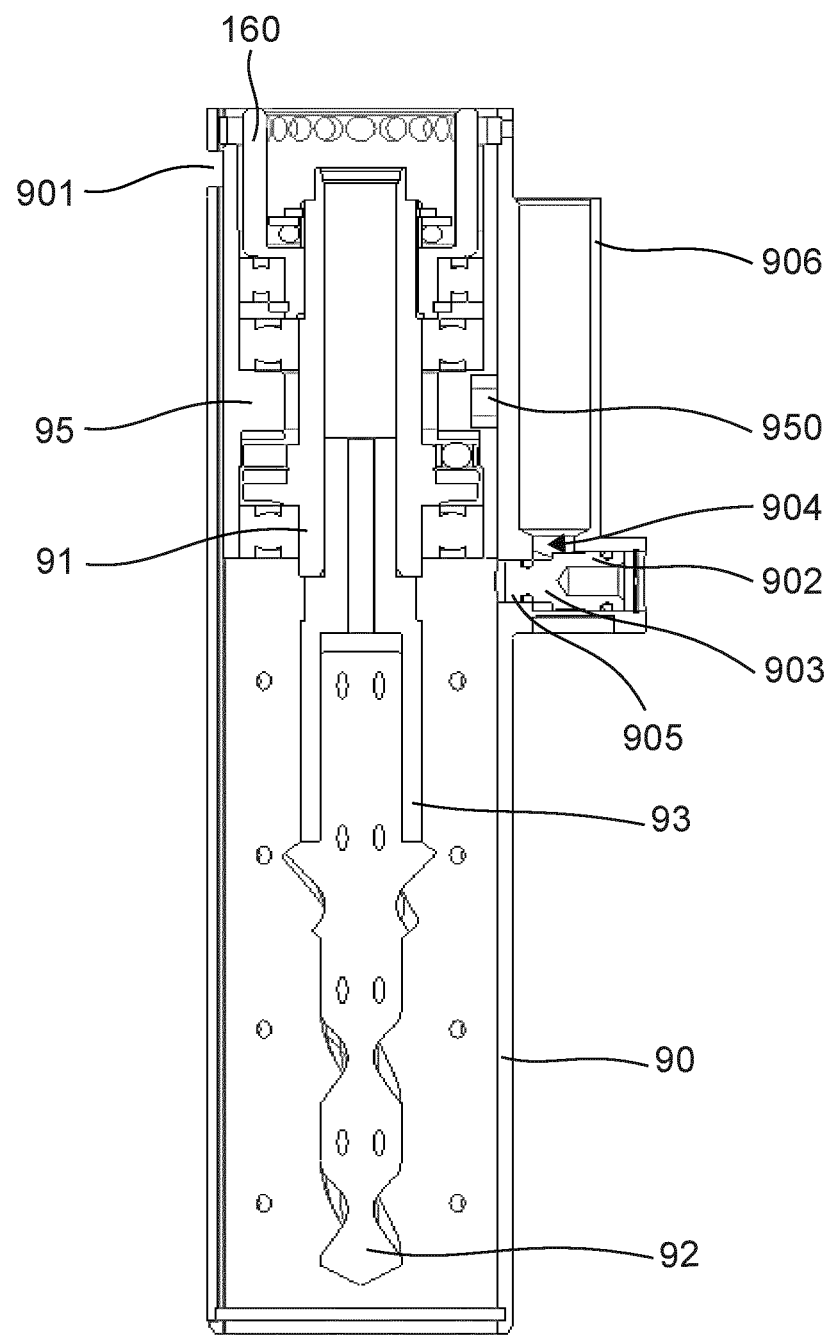
FIG. 10 illustrates a cross-section view of a drilling module.
Figure 11:
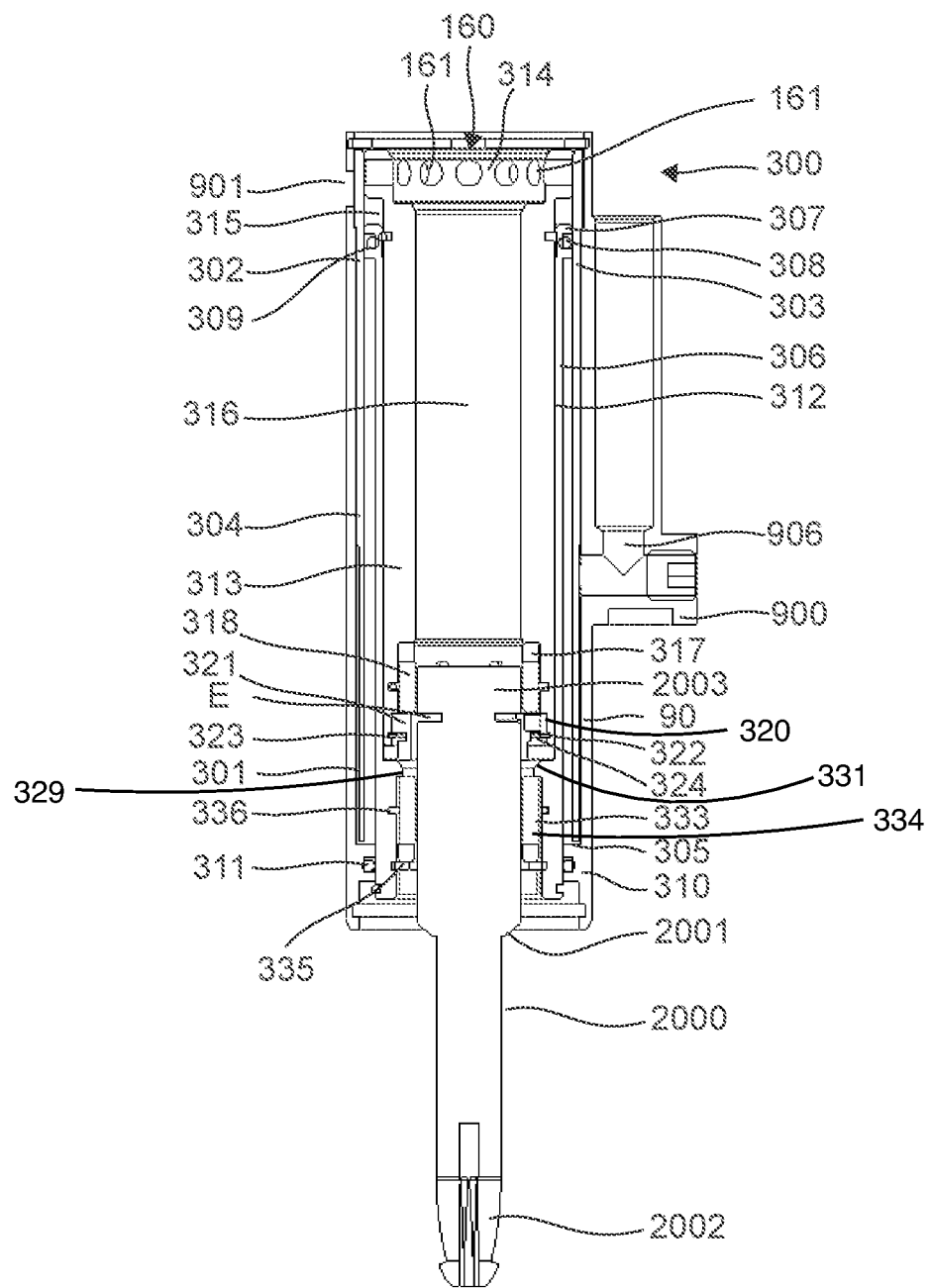
FIG. 11 illustrates a cross-sectional view of a temporary fastener support module.

Alternatively, the elastic return means could be implemented so that the end 905 projects inside the sleeve 90 to form a stop for the bearing 95 preventing the functional assembly from sliding inside the sleeve beyond its position illustrated in FIG. 5 or 6.

Further (in both operational alternatives for the jack 904 and the end 905), the sleeve houses at each end a stop segment (not represented) each forming a stop for the functional assembly. Thus, a drilling module functional assembly can slide inside the sleeve between these stop segments as long as the end 905 does not project in the housing 950 or directly in the sleeve.

The drilling module comprises a bell 160 integral with the output shaft 91 and movably connected thereto. This bell comprises radial holes 161.

A screwing module could be made with a structure substantially identical to that of the drilling module. In this case, the means for fastening 93 a cutting tool would be replaced with means for securing a sleeve or a driving recess to the output shaft. This could involve controlling the advance of the spindle 51 so that the feed per revolution of the spindle is substantially equal to the pitch of the screw so that the socket or driving recess advances synchronously with the screw. Further telescoping could be required to enable screw insertion.

Rivet Support Module

The rivet support module 200 holds the rivet and, like the drilling module, comprises a sleeve 90.

This sleeve 90 is tubular in shape and overall annular in cross-section.

The sleeve 90 comprises a side finger 900 projecting from its side wall.

The sleeve 90 includes a lateral groove 901 which is provided diametrically opposite and offset along the longitudinal axis of the sleeve from the finger 900.

The sleeve houses a tubular element 201 which has at one of its ends a shoulder 202 designed to bear against a shoulder 203 of complementary shape provided at one end of the sleeve 90.

Its opposite end being in proximity to, but not in contact with, a shoulder 204 in the lower part of the sleeve 90 to allow pressurised air to pass between the outer surface of the tubular element 201 and the inner surface of the sleeve 90, as will become clearer later on.

The tubular element 201, which forms a chamber, houses a piston 205 which is translationally mounted therein.

The piston 205 comprises at one end a flange 206 provided with a circumferential groove 207 housing an O-ring 208. This O-ring 208 provides sealing between the piston 205 and the tubular element 201.

The shoulder 204 of the sleeve 90 also comprises an internal circumferential groove 209 housing an O-ring 210 providing sealing between the piston 205 and the sleeve 90.

The side finger 900 of the sleeve 90 houses an air conduit which extends along the sleeve and which is capable of being communicated with a pressurised air intake conduit 907 provided in the device, with which it is in communication when at the workstation of the device.

The end of the piston 205 located on the internal side of the shoulder 204 of the sleeve 90 comprises a half-dog 211 whose function will be explained subsequently.

The other end of the piston 205 carries a split ring 212 which constitutes a means for holding the rivet at the end of the piston.

This split ring 212 has a conical internal bore 213 which narrows in diameter from the inside of the piston 205 towards the outside thereof. This conical portion 213 opens into an internal groove 214 which is complementary in shape to the end of the head 219 of a rivet 216. This groove 214 also opens into an internal conical portion 215 whose diameter narrows towards the outside of the split ring 212.

This ring 212 has a plurality of longitudinal grooves (not represented) to allow it to deform during the insertion and extraction of a rivet, as will be described in more detail below.

The split ring 212 comprises at least one outer peripheral groove 217 housing an elastic return element such as an O-ring or spring (not represented) acting as a return means function tending, as will be explained in more detail later, to return the ring from a release state in which its internal diameter is enlarged, to a holding state in which its internal diameter is constricted.

The tubular element forms a support element for the fastener with the split ring.

The piston has an internal bore passing therethrough allowing a rivet to pass therethrough.

Several rivet support modules may be provided with pistons of different internal bore diameters and different split ring sizes to allow holding of different sized rivets.

The piston 205 is designed to be rotatably and/or translationally driven. It thus constitutes a movable member.

The piston 205 is translationally movable in the tubular element 201 between a first end position in which its shoulder 207 comes into abutment against a circlip 218 provided for this purpose at the end of the tubular element 201 located opposite to that located close to the shoulder 204 of the sleeve, and a second end position in which its shoulder 207 comes into abutment against the shoulder 204 of the sleeve.

A rivet support type module could be implemented to support another type of fastener such as a screw. In this case, the split ring would of course have a shape adapted to that of a screw head rather than a rivet head.

Temporary Fastener Support Module

The temporary fastener support module 300 comprises a sleeve 90.

The sleeve 90 has a tubular shape and an overall annular cross-section.

The sleeve 90 comprises a side finger 900 projecting from its side wall.

The sleeve 90 comprises a lateral groove 901 which is provided diametrically opposite and offset along the longitudinal axis of the sleeve from the finger 900.

The finger 900 houses an air conduit 906 which extends along the length of the sleeve and which is capable of being communicated with a pressurised gas intake conduit 907 provided in the device, with which it is in communication when at the workstation of the device.

The sleeve 90 houses a tubular element 301. The tubular element 301 has a shoulder 302 at one end thereof bearing against a shoulder 303 provided inside the sleeve 90 at one end thereof.

The tubular element 301 has a second shoulder 304 located in proximity of the air conduit provided in the finger. This shoulder delimits a smaller diameter portion of the tubular element.

The tubular element 301 has another end which extends in proximity to a second shoulder 305 provided inside the sleeve at the other end of the sleeve. However, a gap is provided therebetween to allow air to pass through.

The tubular element 301 delimits a chamber housing a piston 306. This piston 306 comprises at one of its ends a shoulder 307 having a circumferential groove 308 housing an O-ring 309 providing sealing between the piston 306 and the tubular element 301.

The shoulder 305 of the sleeve 90 comprises an internal circumferential groove 310 housing an O-ring 311 ensuring sealing between the sleeve 90 and the piston 306.

The piston 306 is movably translationally mounted inside the tubular element 301 and the sleeve 90.

The piston 306 comprises a first bore 312 housing a drive tube 313 (movable member) movably mounted in translation and rotation thereinside.

This drive tube 313 comprises at one of its ends a flange 314 defining a bell 160 through which radial holes 161 pass.

Elastic return means 315, such as elastic washers or a spring, are interposed between the flange 314 of the drive tube 313 and the shoulder 307 of the piston 306. These return means tend to move the flange and the shoulder away from each other.

The drive tube and the piston are movable and translationally connected in the module between at least:
   a retracted position in which they extend inside said module, and
   a deployed position in which at least one of these elements extends at least partially outside the module, i.e. the sleeve.

The bell 160 of the drive tube 313 communicates with a first cylindrical bore 316, which communicates with a second bore 317.

This second bore houses a first freewheel 318.

The second bore 317 communicates with a third bore 320. The third bore 320 houses a locking element 321 which is held therein by means of a circlip 322 housed on the one hand in a groove 323 provided for this purpose in the drive tube 313 and on the other hand in a groove 324 provided for this purpose in the locking element 321.

The module comprises means for holding a temporary fastener in the module. These holding means hold the locking element.

The locking element 321 is in the form of a ring having a bore 325 passing therethrough with an off-centre portion 326 defining a projecting locking lug 327. The locking member 321 comprises a peripheral recess 328 housing a return means (not shown), such as a compression spring, interposed between the locking member 321 and the drive tube 313. The locking element 321 is movable within the third bore 320 laterally in a direction perpendicular to the longitudinal axis of the drive tube 313 between at least:

a rest position in which the end of the locking lug 327 is remote from the longitudinal axis of the drive tube 313 (it is retracted), and a locking position in which the end of the locking lug 327 is moved closer to the longitudinal axis of the drive tube 313 (it is deployed inside the module).

The compression spring tends to return the locking element 321 to its locking position.

The first bore 312 of the piston 306 communicates with a second bore 329 comprising a conical portion 331 tapering to a cylindrical portion 332.

The second bore 329 of the piston 306 communicates with a third through bore 333.

This third bore 333 houses a second freewheel 334 held in place by a circlip 335. An O-ring 336 provides rotational drive between the third bore 333 and the second shaft wheel 334.

As will become clearer later, the first and second sprockets have opposing drive capabilities.

Single Drive and Control Assembly

The device comprises a single assembly 5 for driving and controlling functional modules.

This drive and control assembly 5 comprises a single drive spindle 51 called the main spindle. This spindle is movably mounted in rotation and in translation along the same axis, i.e. along its longitudinal axis. The spindle is thus movably mounted in translation between a retracted position and a deployed position in the direction of the workstation.

This assembly 5 also comprises motor means 52 capable of movably driving the drive spindle 51.

In this embodiment, these motor means comprise a feed motor 510 and a rotation motor 511. They also comprise a transmission T enabling the spindle 51 to be movably driven via the feed and/or rotation motors in translational and/or rotational movements along its axis.

This transmission is of the type comprising a translational drive spider 512 and a rotary drive ring 513.

The rotation drive ring 513 has an internal bore, the internal periphery of which comprises keys 5131 of complementary shape to grooves 510 provided along the spindle 51 along its longitudinal axis. In this way, the spindle 51 and the rotary drive ring 513 are rotatably connected along the axis of the spindle but translationally free along this axis.

The translational drive spider 512 has an internal threaded bore 5121 complementary in shape to a threaded portion 511 provided along the spindle so that they are connected by a helical connection.

This type of transmission is known per se and is not described in further detail herein.

An example of such a transmission is especially described in patent EP-B1-2 754 531, which has the advantage of making the spindle feed speed only dependent on the rotation frequency of the feed motor.

Other transmission architectures producing the same effect could be contemplated.

This type of transmission allows the motor(s) to be laterally offset from the spindle. The motor(s) are then located next to the spindle rather than as an extension thereof. This improves compactness of the device, allows the distance to the centre to be reduced and thus allows work to be carried out close to a wall, and also reduces the overhang. In the example illustrated, the motor axes are essentially parallel to the spindle axis. In alternatives, one or both of the motors may have an axis tilted, especially orthogonal, to that of the spindle.

As will be described in more detail below, the device comprises pairing means for alternately making the drive spindle and at least one movable member of a functional module paired to the spindle movably integral with each other.

The single drive and control assembly 5 typically comprises a controller 53 comprising all the components required to control the operation of the motors and all the actuators and other sensors of the device. Such a controller includes especially all the memories, program(s) and processor(s) necessary to control the device and to carry out the various tasks. It also includes communication means (transceiver) capable of enabling it to receive and transmit data by wire or wirelessly. It can also integrate components necessary for powering the motors (inverter type). It may also include instruction input means (keyboard, microphone, touch screen, mouse or other), a display screen, means for emitting sound signals, etc. Such a controller may be fully or partially secured to the frame or placed remotely.

The single drive and control assembly 5 comprises means for measuring at least one physical parameter representative of at least one operating characteristic of the functional modules. These parameters may in particular be representative of at least one of the following quantities:

a torque on at least one movable member of the module paired to the spindle;

an axial force on at least one movable member of the module paired to the spindle;

an angular position of at least one movable member of the module paired to the spindle;

an axial position of at least one movable member of the module paired to the spindle.

In alternatives, the control means comprise means for measuring 530 the electrical intensity consumed by the motor(s) (current sensor) and for determining, as a function of the electrical intensity measured, a torque and/or an axial force on the spindle and thus on one or more output members of a functional module paired to the spindle. This type of means for measuring and determining forces or torques as a function of the current consumed by a motor are known per se and are not described in detail.

In alternatives, the control means comprise one or more angle sensors 531 integrated in one or more of the motor(s). An angle sensor is a sensor for measuring the angular position of the rotor of a motor. The control means then comprising means for determining, as a function of the angular position of said rotor, the angular position and/or the axial position of said at measured least one movable member of a functional module paired to the spindle. Such means for measuring and determining position as a function of the angular position of the rotor of a motor are known per se and not described in detail.

In alternatives, the measuring means comprise at least one torque and/or force and/or position sensor 532 integrated into the transmission T and capable of allowing the determination of a torque and/or an axial force on the spindle and/or an angular and/or axial position of the spindle, and thus by deduction of a torque and/or an axial force and/or an angular position and/or an axial position of the at least one movable member of a module paired to the spindle. Such means for measuring and determining forces or torques are known per se and are not described in detail.

Several of the different measuring means mentioned above can of course be used in combination.

Means for Carrying Modules: Carousel

A device according to the invention comprises means for carrying a plurality of functional modules. These carrying means allow several functional modules to be loaded and moved. In the embodiment illustrated, the number of modules that can be loaded is equal to 7 but could alternatively be different (lower or higher). This number could be even or odd.

In this embodiment, these carrying means comprise a so-called main carousel 6. The main carousel 6 comprises, in the manner of a revolver cylinder, a plurality of cells 61 each of which can house a functional module.

Each cell 61 constitutes a bore opening on either side and extending parallel to the axis of rotation of the carousel. Preferably, the cells 61 are essentially uniformly dispensed about the axis of the carousel.

Functional Stations

The device comprises several functional stations.

The carousel not only allows several functional modules to be loaded, it also allows them to be moved from one station to another. To do this, it is movably mounted about its axis, which extends essentially parallel to that of the main spindle, as will be described in more detail below.

In this embodiment, the functional stations are as follows:
a functional module loading/unloading station P1;
a temporary fastener loading station P2 (in this embodiment, stations P1 and P2 are one and the same to form a multi-function station but could be two separate stations);
a rivet loading station P3;
a rivet coating station P4; and
a work station P5 as an extension of the single spindle 51 and at which, depending on the module located at this station, operations of:
drilling and/or countersinking;
setting of rivets;
setting of temporary fasteners.

Functional Module Loading/Unloading Station

The functional module loading/unloading station P1 allows functional modules to be introduced one by one into and extracted from the carousel cells.

At this station, the device comprises a jack 13 whose piston 11, which carries a lug 10, is translationally movable in a chamber 12 along an axis orthogonal to the axis of a carousel cell brought to the loading/unloading station.

The function of this jack will be described later.

Temporary Fastener Loading Station

The device comprises a temporary fastener loading station P2 for inserting a temporary fastener into a temporary fastener support module brought to this station by the carousel.

In this embodiment, the temporary fastener loading station is located at the functional module loading/unloading station. These two stations thus constitute a single dual function station.

However, the temporary fastener loading station could be located at another location.

This station P2 includes a temporary fastener feeding device 1000. This device comprises a cartridge belt-type actuator for translating temporary fasteners 1001 until they are placed in the axis of the temporary fastener support module brought to the temporary fastener loading station P2.

This station P2 also includes a loading jack 1002. This jack 1002 is placed in the axis of a temporary fastener support module 300 brought by the carousel 6 to the temporary fastener loading station.

This jack 1002 is disposed upstream of a temporary fastener 1001 placed by the cartridge belt 1000 in the axis of the temporary fastener loading station P2 to allow it to be acted upon to introduce it into the support module 300, as will be explained in more detail later.

The temporary fastener loading station P2 also includes a device for holding the temporary fastener in the temporary fastener support module 300 when introduced into this module. This holding device comprises an essentially L-shaped fork 1003, the end of which comprises two spaced-apart fingers to form a space for receiving a temporary fastener.

This fork 1003 is placed at the outlet of a temporary fastener support module 300 placed at the temporary fastener loading station P2 and is rotatably mounted about an axis 1004 between:
a holding position in which its end provided with fingers extends essentially perpendicularly to the temporary fastener support module and forms a stop against which a temporary fastener can bear when introduced into a temporary fastener support module, and
a release position in which the fork is pivoted about its axis along the arrow C so that its end provided with fingers is released from the module to allow it to be rotatably driven by the carousel.

The movement of the fork 1003 is ensured by means of a jack 1005.

Rivet Loading Station

The device comprises a rivet loading station P3.

This rivet loading station P3 comprises a loading jack 1006. This jack 1006 is placed in the axis of a rivet support module brought by the carousel to the rivet loading station.

This station P3 comprises a device for receiving and transferring rivets from a rivet supply (or feed) zone 1007 (or other fastener element such as screws or the like) to a rivet dispense or rivet reception zone such as, for example, here a rivet support module 200 located at the rivet loading station P3.

The receiving and transfer device comprises a so-called secondary carousel 1008. The carousel constitutes a support element. This carousel 1008 comprises, in the manner of a revolver cylinder, a plurality of cells 1009, each for housing a rivet.

Each cell 1009 constitutes a bore opening on either side and extending parallel to the axis of rotation of the carousel 1008. Preferably, the cells 1009 are essentially uniformly dispensed about the axis of the carousel 1008.

In this embodiment, the number of cells is six. It may of course be greater or less than 6.

Especially the carousel and its cells form means for receiving a fastener element. The carousel and its drive means enable fasteners to be moved from a supply zone to a dispense zone.

Each cell 1009 has a different diameter so that each socket can receive rivets 216 of different sizes.

Each cell 1009 comprises a receiving port 1090 and a fastener dispense port 1091. The receiving port 1090 allows a fastener element to be inserted into a cell. The dispense port allows a fastener element to be discharged from the cell.

The device includes means for holding a fastener element introduced into a cell. These holding means prevent the extraction, through the receiving port, of a fastener element located in a cell.

In this embodiment, the holding means comprises a deformable member 1092 provided with a spear-forming point 1093 located in each cell. The tip of each spear is shaped to allow introduction of a fastener element into the cell through its receiving port and to prevent extraction of the fastener element through the cell receiving port. Thus, the point of each spear is oriented towards the corresponding cell receiving port.

The carousel 1008 is rotatably mounted along an axis essentially parallel to the axis of the main spindle 51, between a support plate 1011 and a rivet holding plate 1012. The holding plate constitutes a means for holding fasteners in the cells.

The support plate 1011 is integral with the frame and fixed with respect to it. As many holes 1013 pass therethrough as the carousel 1008 comprises cells 1009. Each hole has a different diameter corresponding to that of a cell. The support plate 1011 carries a shaft 1014 about which the carousel 1008 is movably mounted.

One of the holes 1013 in the support plate 1011 is in the axis of the loading jack 1006.

The holding plate 1012 comprises, in the axis of each hole 1013 of the support plate 1011, air exhaust holes 1015. However, it has a dispense opening 1080, rather than air exhaust holes 1015, passing therethrough, in the axis of the jack 1006. The diameter of the dispense opening 1080 allows largest rivet that can be loaded into the secondary carousel to pass therethrough.

The carousel 1008 includes along its external peripheral contour longitudinal notches 1016 which extend essentially parallel to the axis of the carousel 1008. These notches form drive teeth as will become clearer later.

The device comprises means for rotatably driving the carousel about the shaft.

These rotatable drive means comprise:
a first jack 1017 comprising a piston 1018 translationally movable in a chamber 1019;
a second jack 1020 comprising a piston 1021 translationally movable within a chamber 1022.

The piston 1018 of the first jack 1017 carries a pawl 1023 which is rotatably mounted relative to the piston about an axis 1024 essentially parallel to the axis of rotation of the carousel 1008.

The pawl 1023 comprises a bearing surface 1025 provided to come to bear against a stop 1026 of the piston 1018 defining the end drive position.

The pawl 1023 is movable between two end positions, namely:
a deployed position in which its bearing surface 1025 bears against the stop 1026 of the piston 1018 so that its end is spaced apart from the piston and at least partially housed in a notch 1016 of the carousel (cf. FIG. 14), and
a retracted position in which its bearing surface 1025 does not bear against the stop 1026 of the piston 1018 so that its end is close to the piston 1018 and disengaged from any notch 1016 of the carousel.

Return means (not represented), such as for example a spring or the like, may possibly be implemented to act on the pawl 1023 to tend to return it to its extended position.

Figure 14:
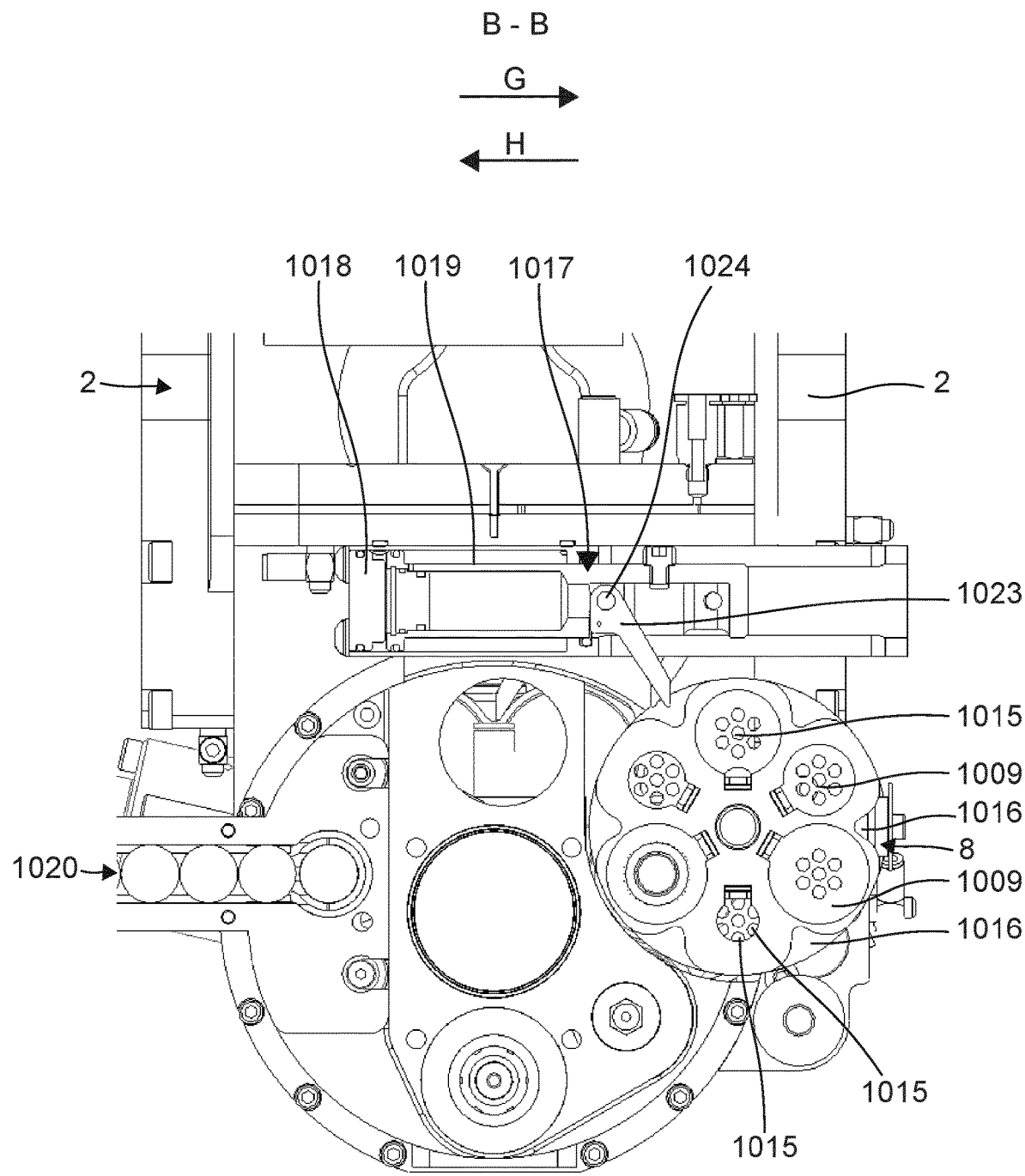
FIG. 14 illustrates a cross-sectional view along plane B-B of the device of FIG. 2.

The piston 1018 is movable between two end positions, namely:
a start position in which it is on the stop on the left side in FIG. 14 (insofar as the device can take any orientation in space, the indication of the left side is purely illustrative with reference to FIG. 14 for understanding reasons), and
an end position in which it is on the stop on the right hand side in FIG. 14 and the pawl 1023 is in an deployed position between two notches 1016.

In the configuration illustrated in FIG. 14, the piston 1018 is in its start position and the pawl 1023 is in its deployed position.

The device comprises a blocking pin 8 movably mounted between a blocking position in which it is brought to stop against the carousel 1008 between two consecutive notches 1016 to prevent rotation of the carousel about its axis, and a release position in which it is disengaged from the carousel to allow its rotation. This blocking pin 8 is integral with the support plate 1011 by means of a spring leaf 1027 which tends to hold it in its blocking position. It constitutes a means of locking and indexing the carousel 1008 in positions in which a cell 1009 of the carousel 1008 is in alignment with the loading jack 1006, i.e. at the dispense zone. Preferably, at least one other cell is then at a supply zone.

In order to rotatably drive the carousel 1008 in a clockwise direction, pressurised air is injected into the chamber 1019 so as to move the piston 1018 along the arrow G into its end position. During this movement, the bearing surface 1025 of the pawl 1023 is on the stop with the stop 1026 of the piston 1018 so that the pawl 1023 is blocked against clockwise rotation. The carousel 1008 is thus rotatably driven in a clockwise direction until the piston 1018 is on the stop in its end position. A new cell 1009 of the carousel 1008 is then in alignment with the loading jack 1006. During the movement of the carousel 1008, the blocking pin 8 slides against the peripheral surface of the carousel 1008 and is progressively moved from its blocking position to its deblocking position against the action of the spring leaf 1027 and then back to its blocking position under the action of the spring leaf 1027 so that the carousel 1008 is held stationary.

The jack 1017 is actuated along the arrow H to return to its start position. During this movement, the pawl 1023 slides against the peripheral surface of the carousel 1008 and progressively moves from its deployed position to its retracted position and then to its deployed position by rotating about its axis.

The carousel 1008 can be rotatably driven clockwise again by reiterating this process.

The piston 1021 of the second jack 1020 carries a pawl 1028 which is rotatably mounted relative to the piston 1021 about an axis 1029 essentially parallel to the axis of rotation of the carousel 1008.

The pawl 1028 comprises a bearing surface 1030 provided to bear against a stop 1031 of the piston 1021 defining the end drive position.

The pawl 1028 is movable between two end positions, namely:
a deployed position in which its bearing surface 1030 bears against the stop 1031 of the piston 1021 so that its end is spaced apart from the piston 1021 and at least partially housed in a notch 1016 of the carousel 1008 (cf. FIG. 15), and
a retracted position in which its bearing surface 1030 does not bear against the stop 1031 of the piston 1021 so that its end is closer to the piston 1021 and disengaged from any notch 1016 of the carousel 1008.

Return means (not represented), such as a spring or the like, may possibly be implemented to act on the pawl 1028 to return it to its deployed position.

Figure 15:
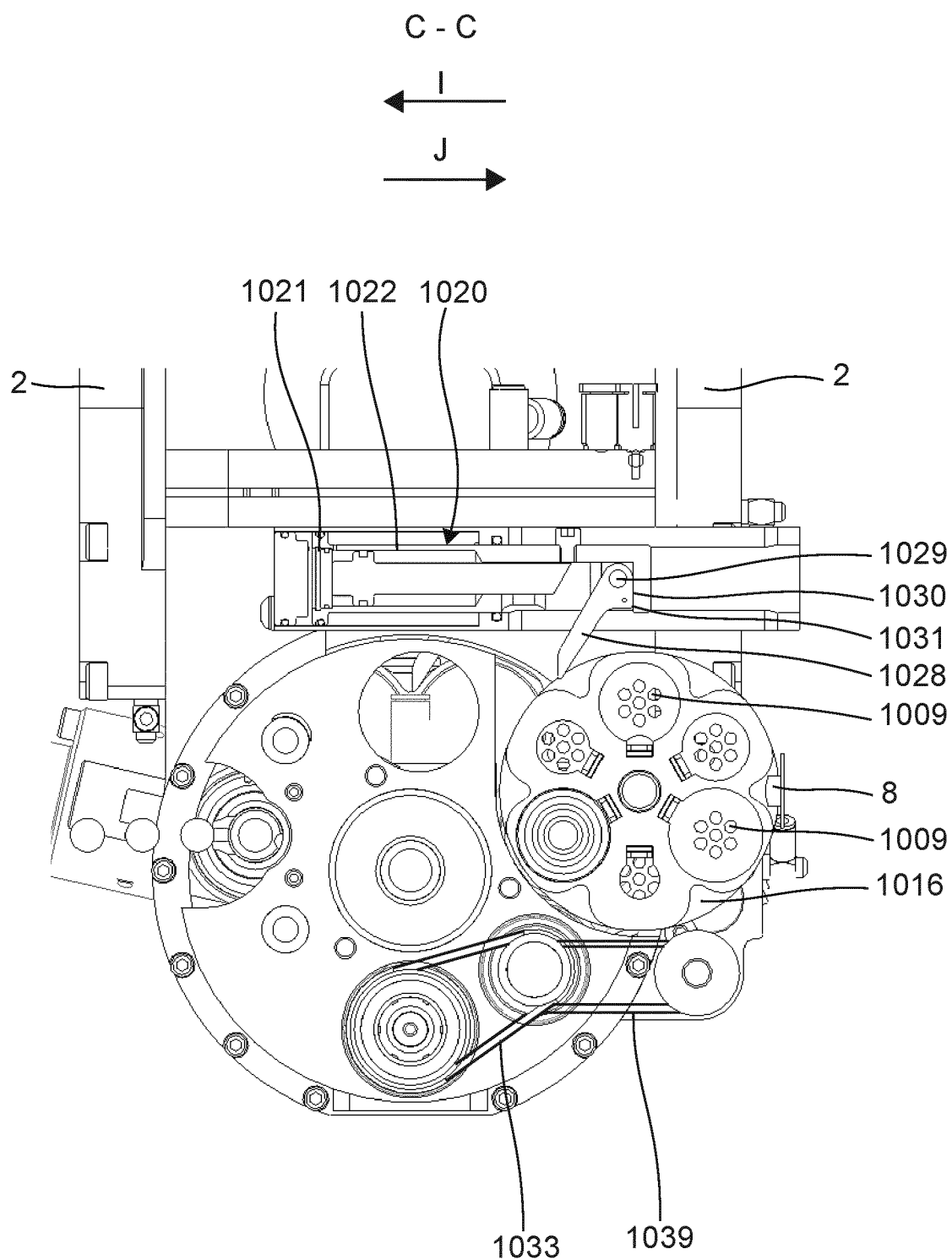
FIG. 15 illustrates a cross-sectional view along plane C-C of the device of FIG. 2.
Figure 16:
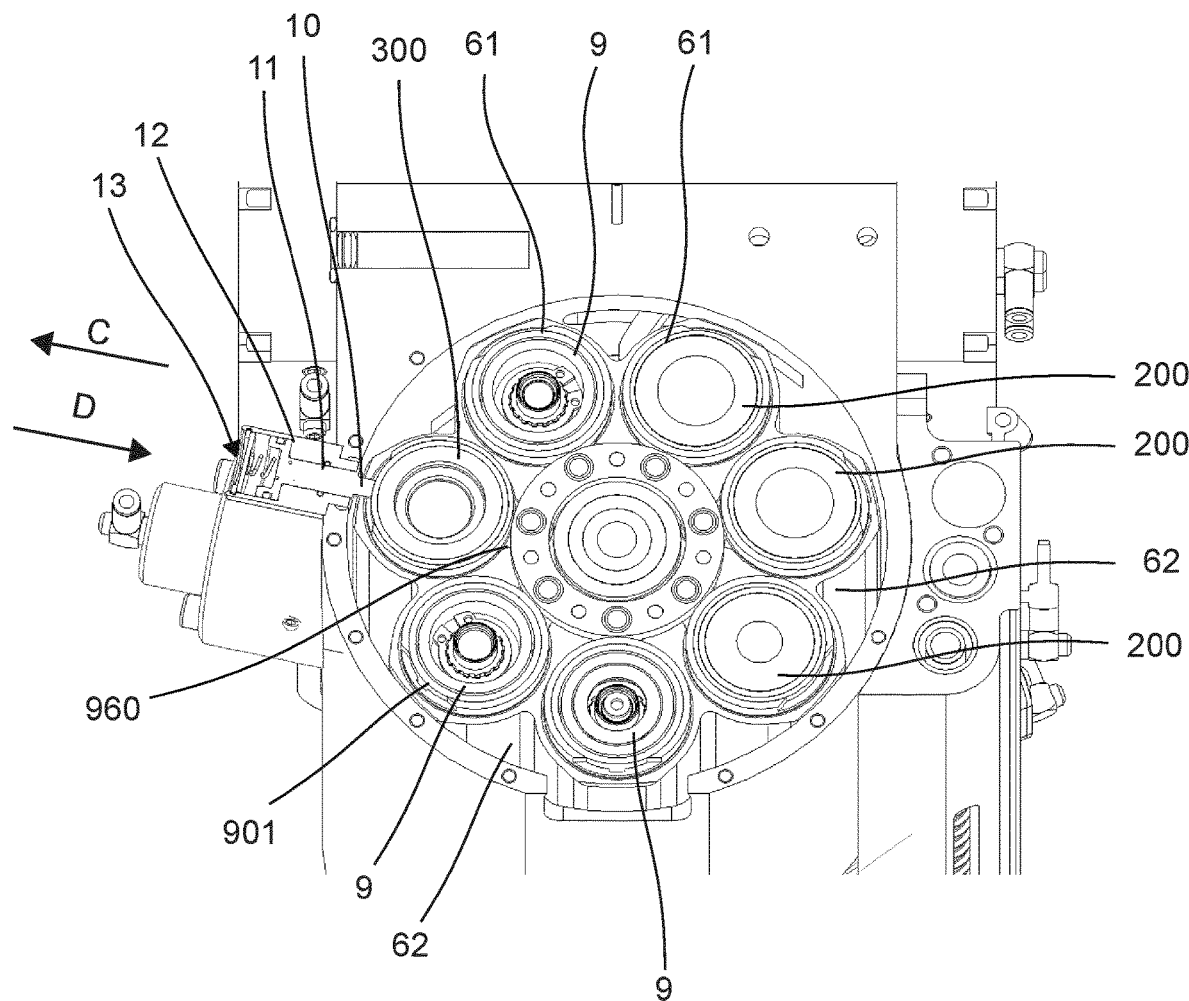
FIG. 16 illustrates a partial perspective and cross-sectional view in a plane passing through the axis of rotation of the carousel of a device according to the invention.

The piston 1021 is movable between two end positions, namely:
a start position in which it is on the stop on the right-hand side in FIG. 15 (insofar as the device can take any orientation in space, the indication of the right-hand side is purely illustrative with reference to FIG. 15 for understanding reasons), and
an end position in which it is on the stop on the left side in FIG. 15 and the pawl 1028 is in a deployed position between two notches 1016.

In the configuration illustrated in FIG. 15, the piston 1021 is in its end position and the pawl 1028 is in its deployed position.

To rotatably drive the carousel 1008 in a counter-clockwise direction, pressurised air is injected into the chamber 1022 so as to move the piston 1021 along the arrow I to its end position. During this movement, the bearing surface 1030 of the pawl 1028 is on the stop with the stop 1031 of the piston 1021 so that the pawl 1028 is blocked against counterclockwise rotation. The carousel 1008 is thus rotatably driven counterclockwise until the piston 1021 is on the stop in its end position. A new cell 1009 of the carousel 1008 is then in alignment with the loading jack 1006. During the movement of the carousel 1008, the blocking pin 8 slides against the peripheral surface of the carousel 1008 and is progressively moved from its blocking position to its deblocking position against the action of the spring leaf 1027 and then back to its blocking position under the action of the spring leaf 1027 so that the carousel 1008 is held stationary.

The jack 1020 is actuated along the arrow J to return to its start position. During this movement, the pawl 2018 slides against the peripheral surface of the carousel 1008 and progressively moves from its deployed position to its retracted position and then to its deployed position by rotating about its axis.

The carousel 1008 can be rotatably driven counterclockwise again by reiterating this process.

The carousel 1008 and the pawls 1023, 1028 form ratchet wheel systems.

The first 1017 and second 1020 jacks and the corresponding pawls 1023, 1028 have antagonistic movements in that they allow the carousel 1008 to be rotatably driven in opposite directions.

The implementation of the first 1017 and second 1020 jacks allows the desired cell 1009 to be brought into line with the main spindle 51 more quickly by choosing the direction of rotation of the carousel 1008 that will allow to be brought into line the fastest way. However, only one jack can be implemented. This will simplify the device but will lead to longer alignment times.

The means for rotatably driving the secondary carousel 1008 may be of the type of those of the main carousel 6, which are described later. In this case, rather than implementing single jacks to drive the pawls, double jacks may be implemented, i.e. outer jacks containing an inner pawl blocking jack.

Indexing the secondary carousel can also be achieved by means of a blocking pin controlled by a jack as for the main carousel.

This device includes means for supplying the carousel with rivets. The rivets are fed through a flexible tube and pushed into the tube by a pressurised gas.

Rivet Coating Station

The device comprises a coating device located at a rivet coating station P4. This station allows a sealing compound to be applied to a rivet.

This coating station P4 is located in proximity to the work station P5.

It comprises a first pulley 1032 rotatably movable about an axis essentially parallel to that of the main spindle 51 and rotatably connected by means of a belt 1033 with a driving pulley 1034 fastened to the main spindle 51 in such a way that it is rotatably connected thereto along its axis of rotation but not in translation, for example by means of grooves.

This first pulley 1032 is rotatably connected to the casing of a jack 1036 along an axis essentially parallel to that of the main spindle 51. This casing is rotatably mounted relative to the frame along the same axis. The rod of the piston 1035 of the jack 1036 is rotatably connected to the casing.

This piston 1035 is movably mounted in translation and in rotation along an axis parallel to the axis of the main spindle 51 inside a chamber 1037. It carries at its end a half-dog 1038 of complementary shape to the half-dog 211 of the rivet support module 200.

A second pulley 1039 is rotatably connected to the casing of the jack 1036 along an axis essentially parallel to that of the main spindle 51. This second pulley 1039 is rotatably connected by means of a belt 1040 to a third pulley 1041.

The third pulley 1041 is mounted to a shaft 1042 to which it is rotatably connected.

The shaft 1042 carries a lead screw 1043 at its end opposite to that to which the pulley 1041 is fastened.

This lead screw 1043 comprises a thread whose profile comprises a first flank 1044 for meshing with a shoe 1046 and a second flank 1045 tilted with respect to the axis of the lead screw.

The first flank is tilted by a few degrees with respect to the perpendicular line to the axis of the lead screw in a direction such that the shoe, being applied to this flank, has a tendency to slide towards the bottom of the thread.

This shoe 1046 is mounted at the end of the piston 1047 movably mounted in translation along an axis essentially orthogonal to the axis of the main spindle 51 in the chamber 1048 of a jack 1049.

The shoe 1046 is thus movable between at least:
a meshing position in which it meshes with the lead screw 1043, and
an un-meshing position in which it does not mesh with the lead screw 1043.

This station comprises sealant dispense means comprising a nozzle 1050 connected to sealant supply means (not represented) comprising a pump connected on the one hand to a sealant reserve and on the other hand to the nozzle 1050 via pipes provided for this purpose.

The nozzle 1050 comprises a dispense end 1051 intended to come in proximity to a rivet 216 carried for a rivet support module 200 brought to the coating station P4. This end may be straight (extending in a plane perpendicular to an axis perpendicular to the axis of the rivet support module 200). However, this end is preferably bevelled or curved so that the nozzle 1050 can stop against the rivet 216 while providing a port for dispensing sealant onto the rivet 216. This solution is preferred insofar as it is a simple and effective way of ensuring calibration of the bead(s) of sealant deposited on the rivet.

The nozzle 1050 is integral with the end of a piston 1051 movably mounted in translation along an axis perpendicular to the axis of the rivet support module in the chamber 1052 of a jack 1053.

The shoe 1046, the nozzle 1050 and their respective jacks 1049, 1053 are mounted in a block 1054 integral with the piston 1055 movably mounted in translation along an axis parallel to the axis of the lead screw 1043 in the chamber 1056 of a jack 1057.

This station comprises means for determining (evaluating) the length of the rivet 216 brought to the coating station. These means include a feeler 1058. One end of the feeler is integral with the piston 1059 movably mounted in translation along an axis parallel to the axis of the lead screw 1043 in the chamber (not represented) of a jack 1060. The other end of the feeler 1058 comprises a conical centring tip 1061 oriented towards a rivet 216 brought to the coating station. The jack 1060 allows the conical tip 1061 to be moved towards and away from the rivet 216 to feel its end and thus determine its length. The feeler 1058 then defines a stop against which the support 1062 of the nozzle 1050 can come to bear to determine a coating limit at the rivet end. By end of the rivet, it is meant a zone at the end of the rivet body opposite to the rivet head.

Figure 39:
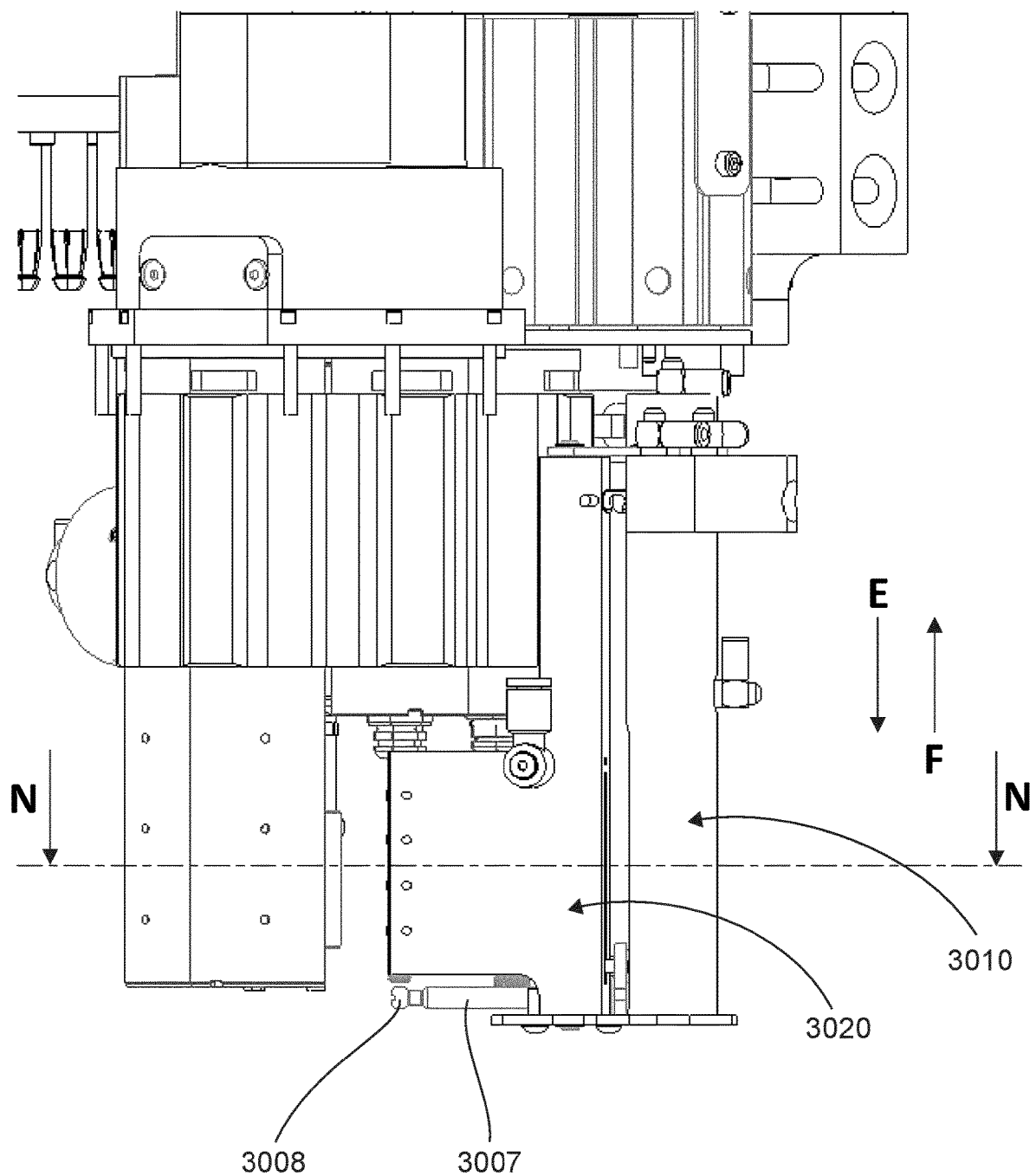
FIG. 39 illustrates an alternative coating station.
Figure 40:
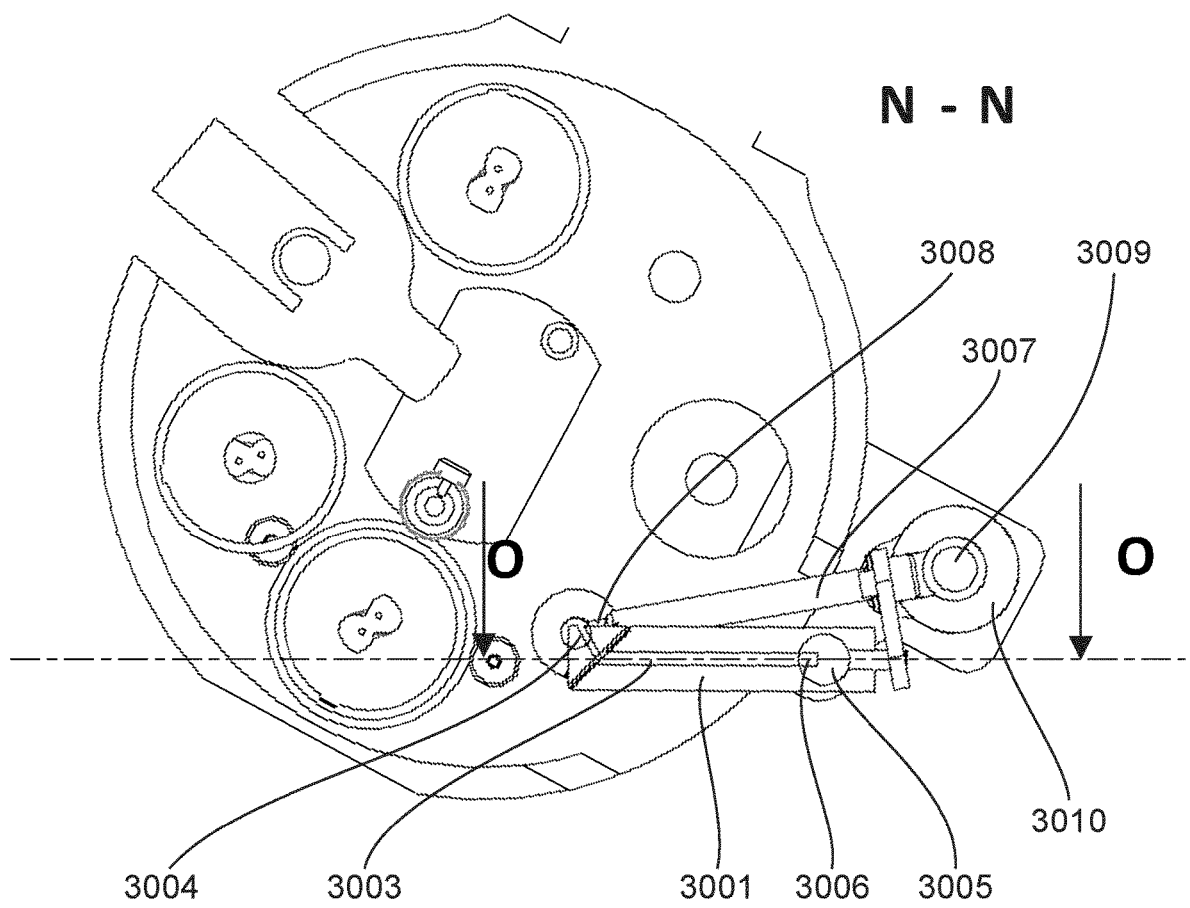
FIG. 40 illustrates a detail of FIG. 39.
Figure 41:
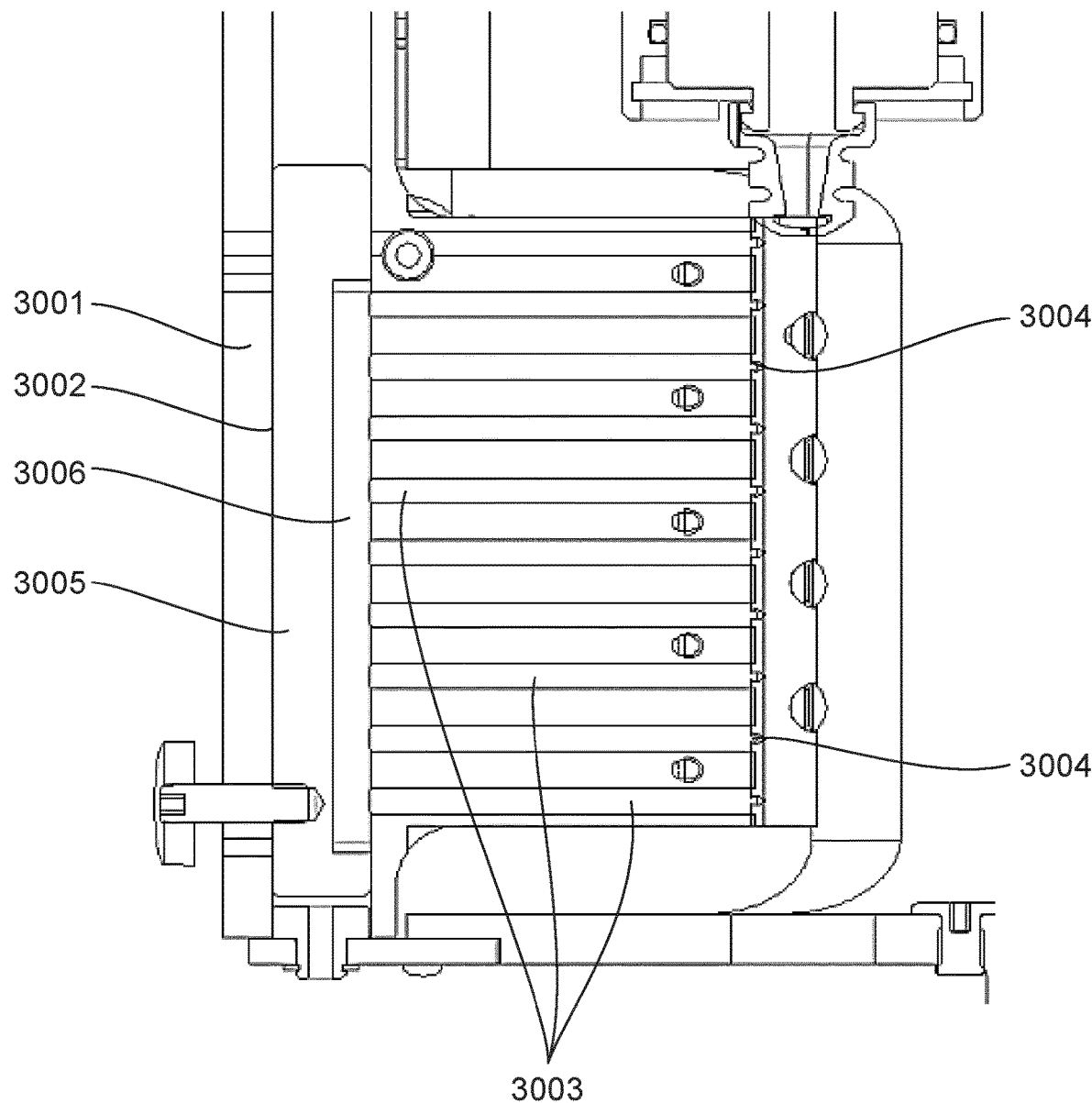
FIG. 41 illustrates a further detail of FIG. 39.
Figure 42:
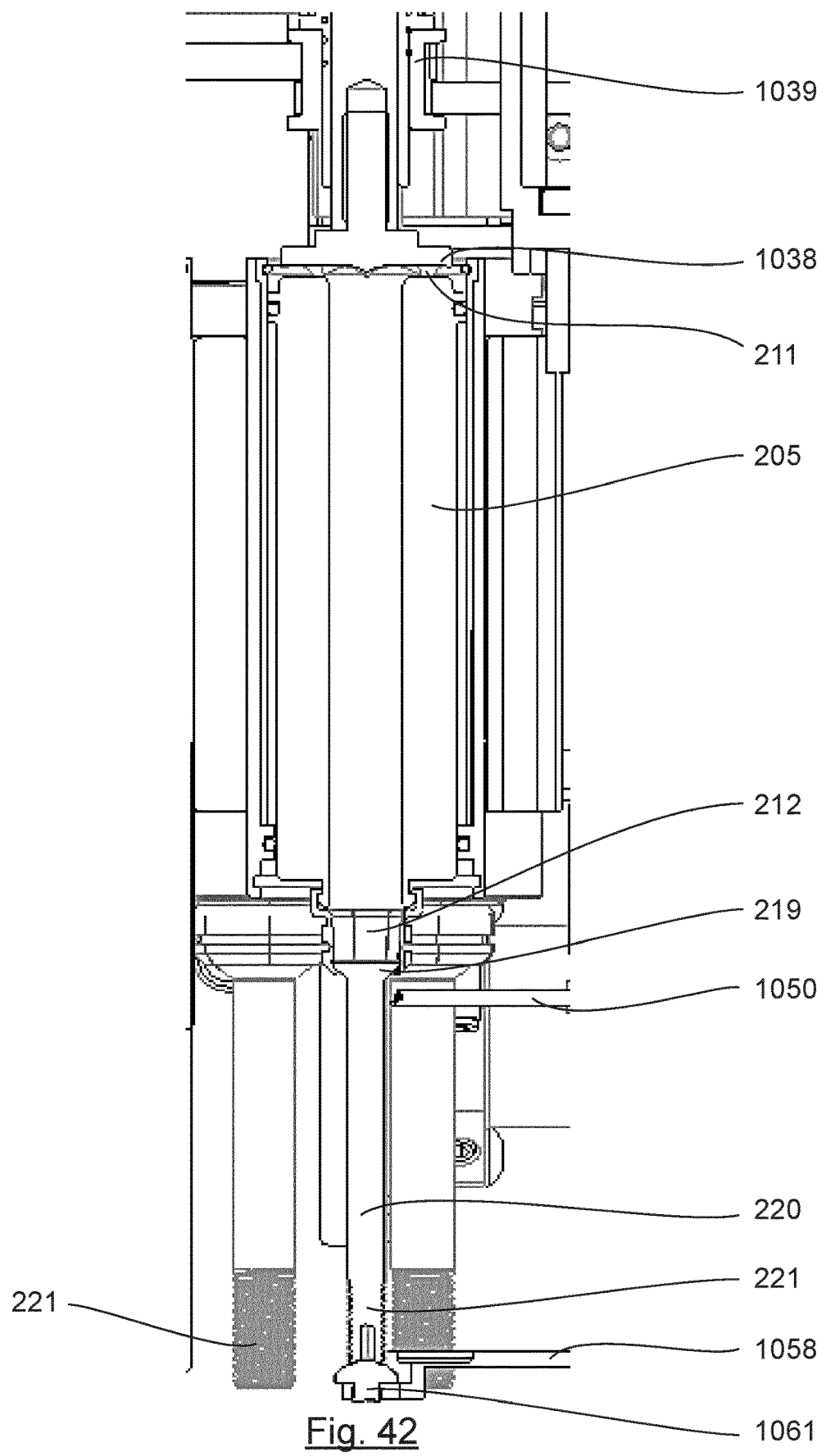
FIG. 42 illustrates a longitudinal cross-section view of a rivet support module of a given size being coated.
Figure 43:
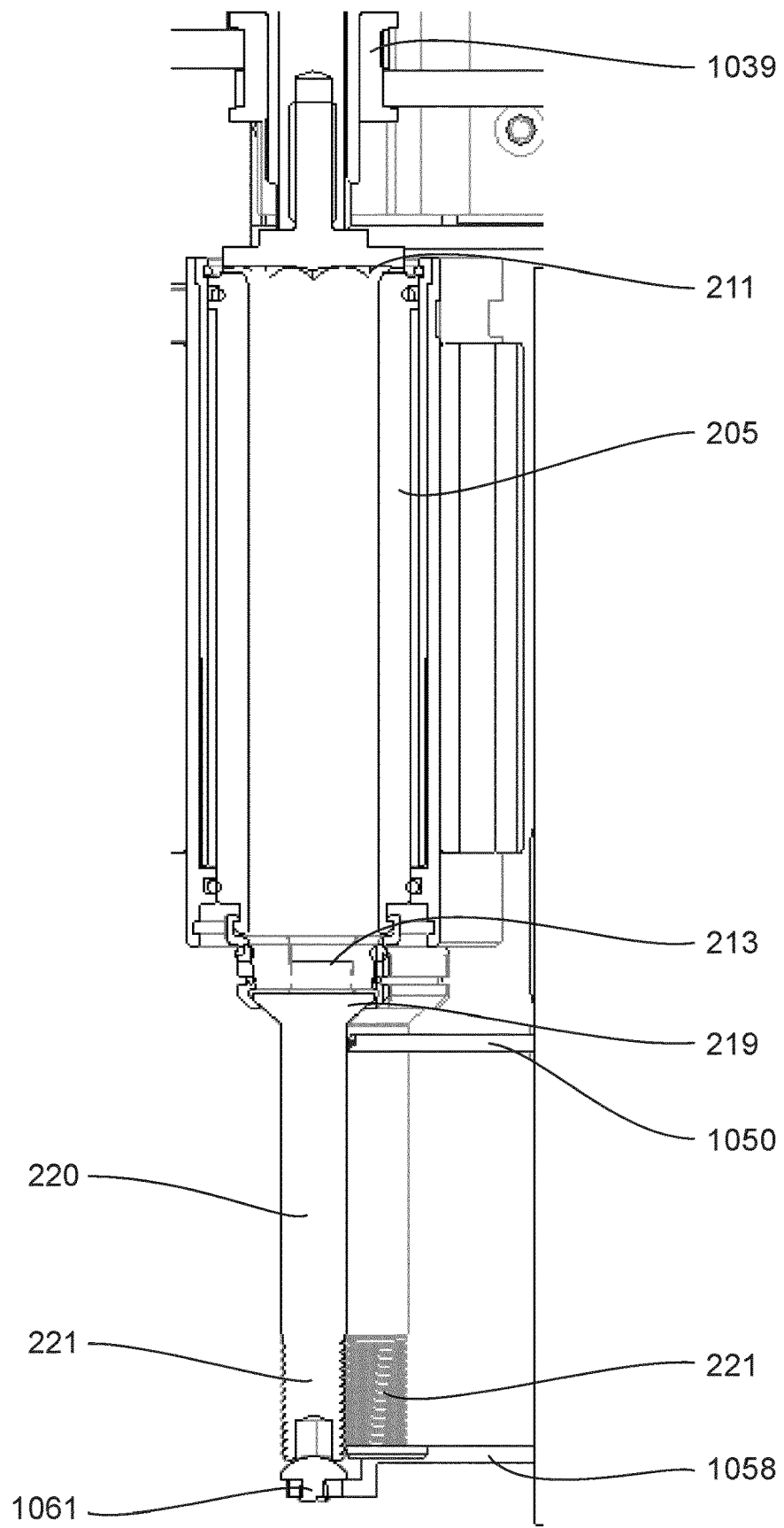
FIG. 43 illustrates a longitudinal cross-sectional view of a rivet support module of a different size to that of FIG. 42 being coated, the head and body connection zone of which is at the same relative position to the nozzle as with the module of FIG. 42.
Figure 44:
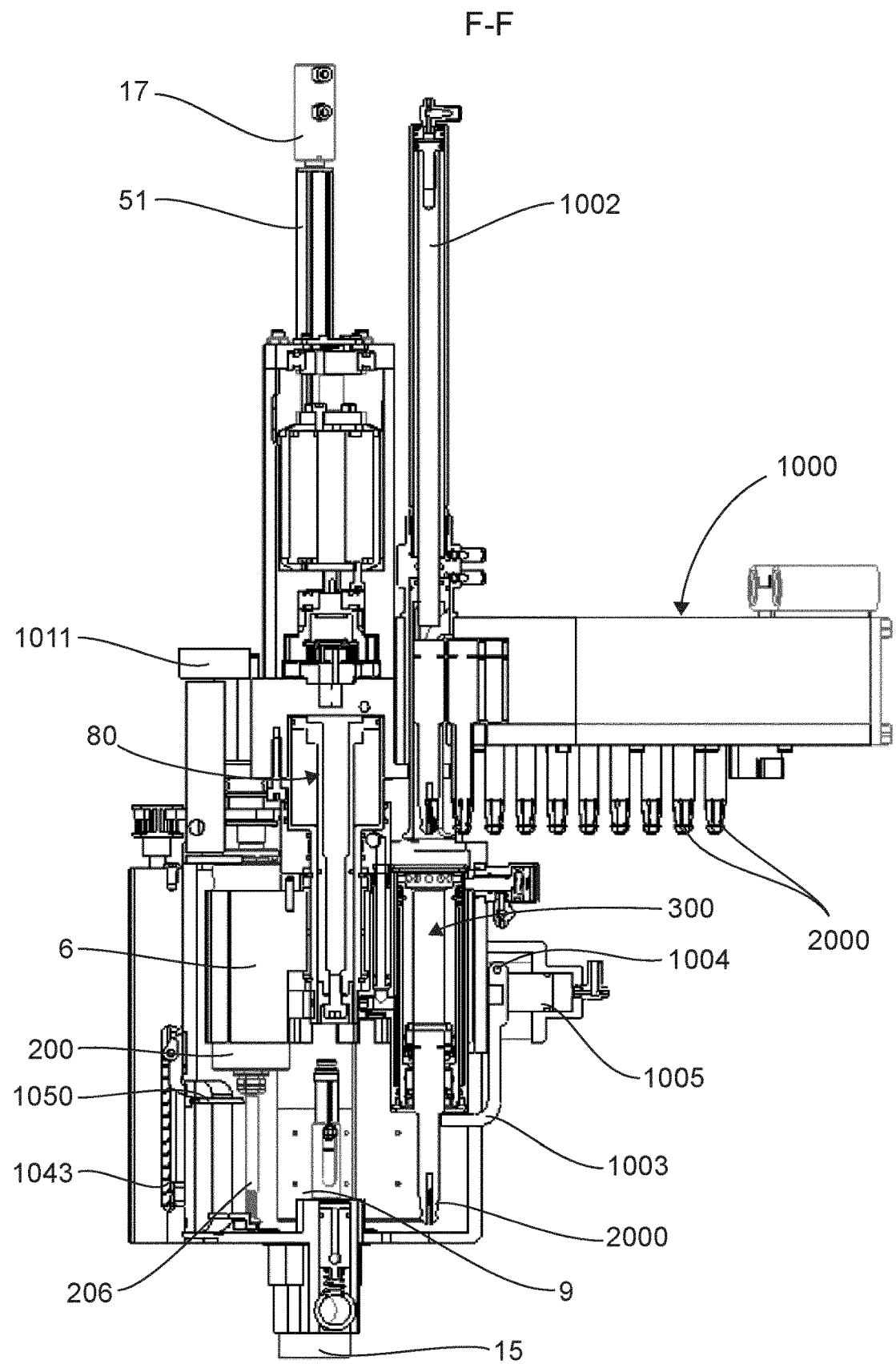
FIG. 44 illustrates a longitudinal cross-section view at the temporary fastener loading station.
Figure 45:
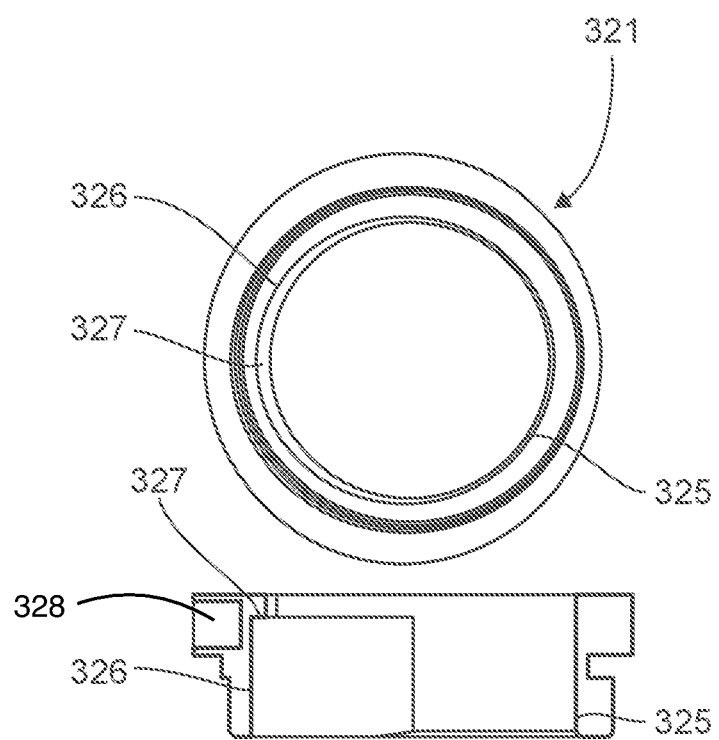
FIG. 45 illustrates views of a locking element.
Figure 47:
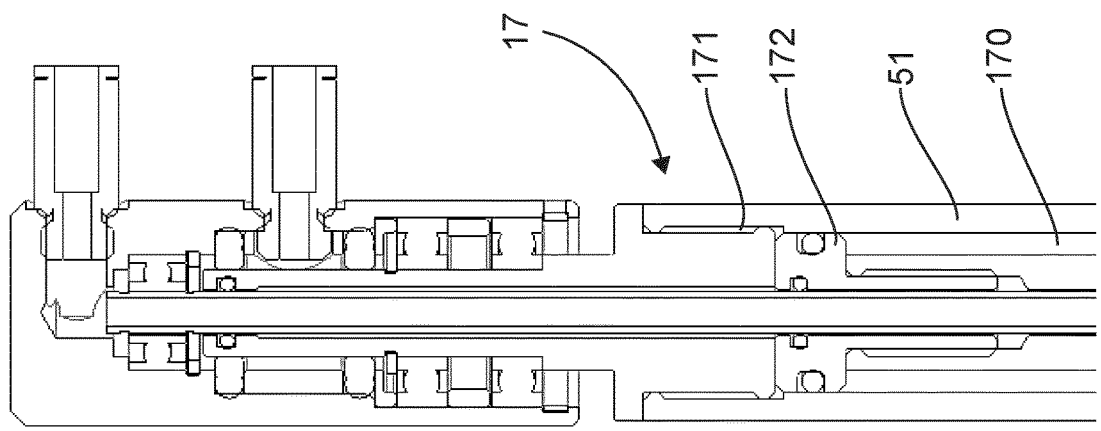
FIG. 47 illustrates a partial longitudinal cross-sectional view of the perspective workstation.
Figure 46:
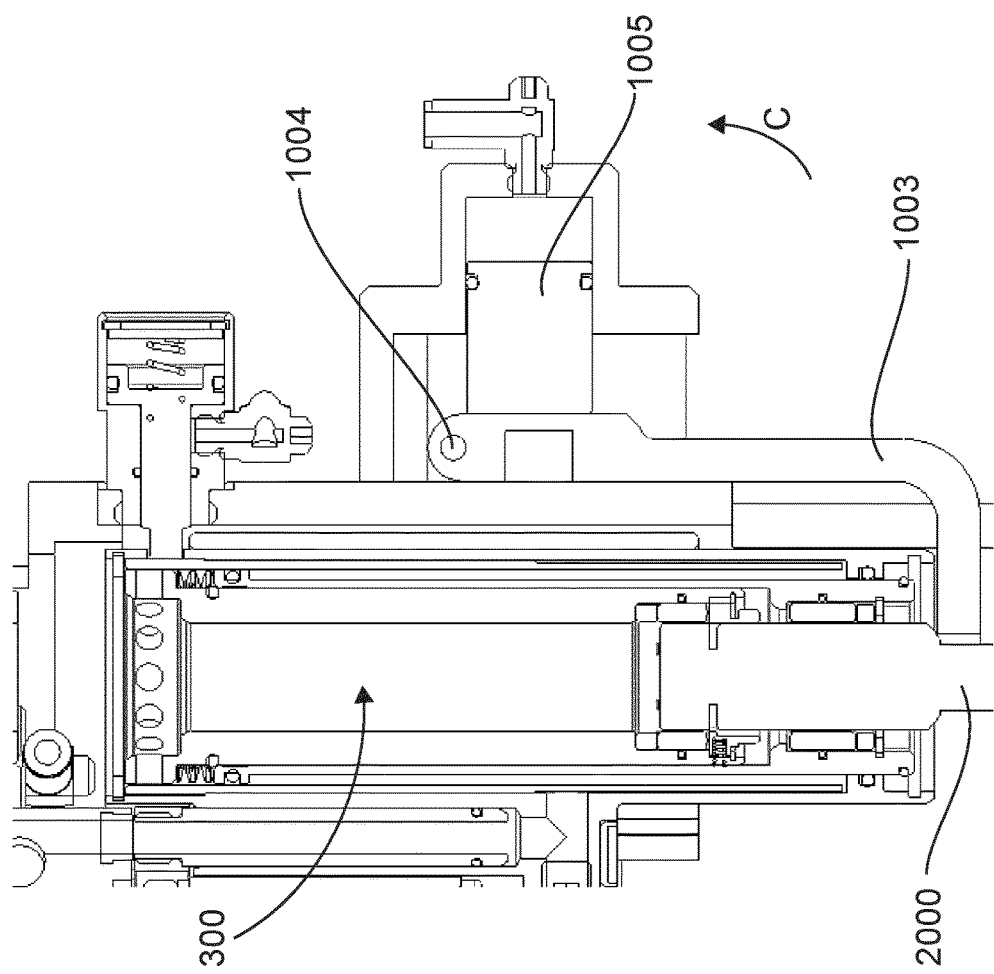
FIG. 46 illustrates a detail of FIG. 44.
Figure 48:
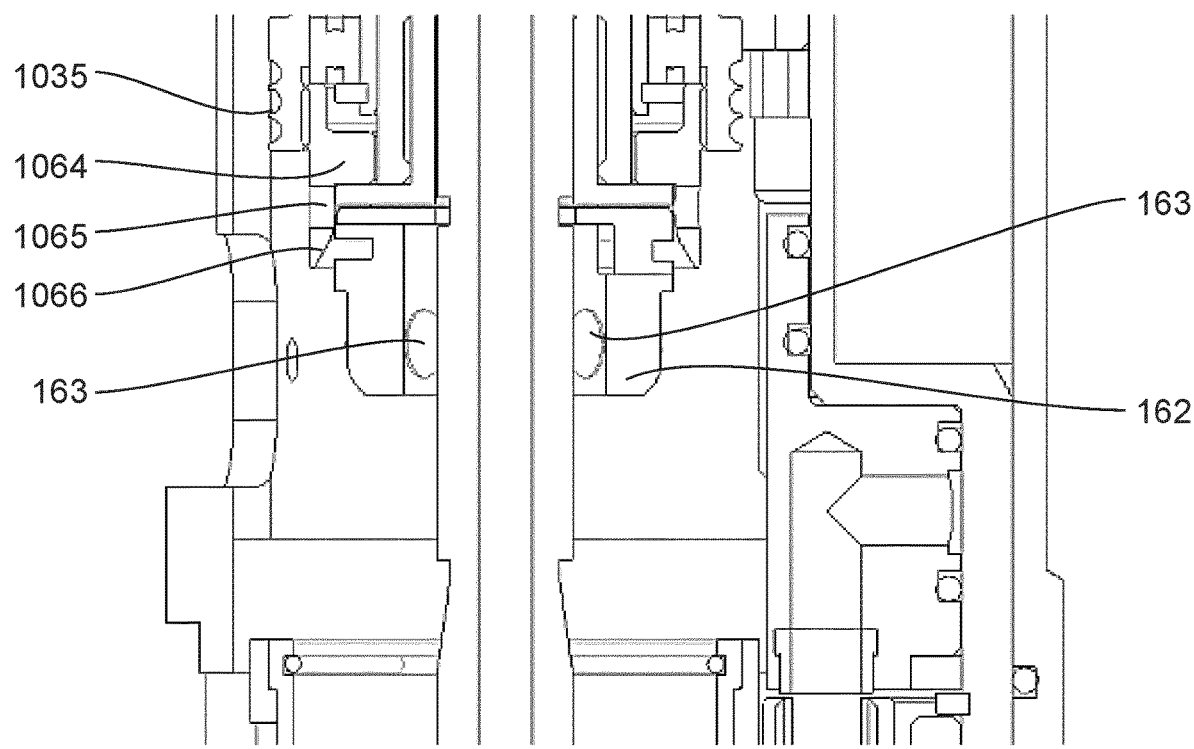
FIG. 48 illustrates a partial longitudinal sectional view of the workstation at the quick pairing means.
Figure 49:
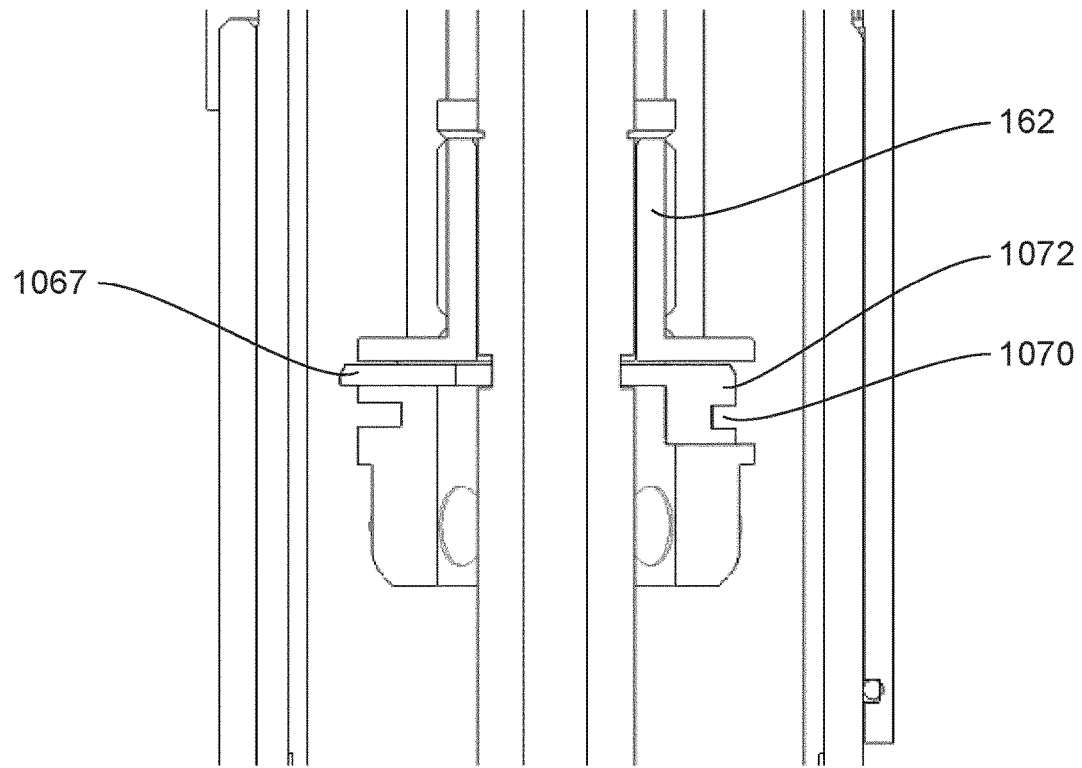
FIG. 49 illustrates a partial longitudinal cross-sectional view of the translational connection means of the main and secondary spindles.
Figure 50:
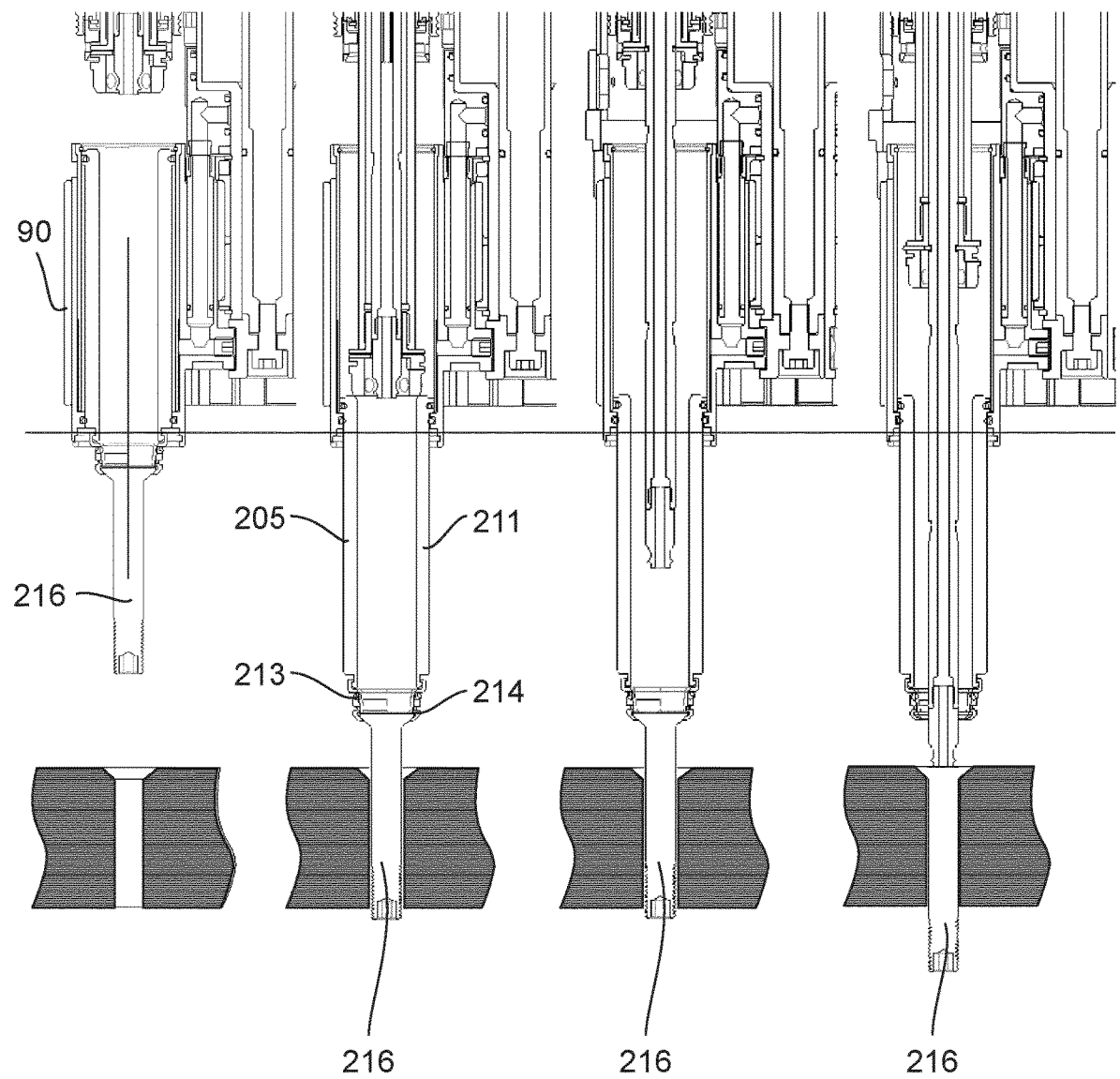
FIG. 50 illustrates views showing telescoping.

FIGS. 39 to 41 illustrate an alternative coating station.

According to this alternative, the nozzle 3000 is fixed with respect to the frame and comprises:
- a block 3001 provided with a bore 3002 defining a chamber and with a plurality of dispense channels 3003 for coating material, these channels 3003 being in fluid communication with the chamber 3002 and opening out through dispense ports 3004 provided along an axis essentially parallel to the axis of the body of the fastener to be coated;
- a spool 3005 movably mounted in translation inside the chamber 3002, this spool 3005 having a blind longitudinal groove 3006 on either side provided along said axis over a length allowing the groove 3006 to be placed in fluid communication with all the channels 3003, the groove 3006 being connected to coating material supply means comprising, for example, a sealant pump, the outlet of which is connected by a pipe to the groove 3006.

A connection 3011 allows sealant to be injected into one of the channels 3003, itself in communication with the groove 3006.

According to this alternative, the feeler 3007, which comprises an end 3008 designed to come into contact with the end (foot) of a fastener element, is translationally connected with the spool 3005 at its opposite end.

The feeler 3007 is further translationally connected to the piston 3009 of a jack 3010 whose axis extends essentially parallel to the axis of the main spindle 51.

In this way, when the feeler is in contact with the end of a fastener element, the channel(s) 3003 opening beyond this opposite end do (does) not communicate with the groove 3006.

The channel 3003 opposite to that located on the end side of a fastener element to be coated extends to the zone of connection between the body and head of the fastener.

The nozzle thus allows dispense of sealant in parallel beads on the body of a fastener element between its end and the zone of connection between its body and its head.

Workstation

The workstation P5 is located as an extension of the main spindle 51.

This station allows different operations to be carried out depending on the functional module brought to its level, namely:
- drilling and/or countersinking;
- Rivet setting;
- setting of temporary fasteners.

This station comprises, furthermore to the main spindle 51, a secondary spindle 170 movably mounted in translation inside the main spindle 51 which is hollow.

This secondary spindle 170 is integral with the piston 172 movably mounted in translation along the axis of the main spindle 51 in the chamber 171 of a jack 17. The secondary spindle constitutes the rod of this jack.

The workstation comprises means for pairing 16 functional modules.

The pairing means comprise quick-connect type means. In this embodiment, they comprise:
- the bell 160 of some functional modules comprising radial holes 161;
- a male element 162 integral with the main drive spindle 51 and movably connected to the latter and capable of being housed in the bell 160;
- locking elements (balls or rollers) 163 integral with the male element 162 and located as an extension of the radial holes 161 when the male element 162 is housed in the bell 160: preferably, these locking elements comprise a cylindrical body designed to slide in radial holes 1620 of the male element 162 so that their end can be housed in the radial holes 161 of the bell 160, and a head in the form of a portion of a sphere with a larger diameter than the cylindrical body to prevent them from being discharged from the male element by the locking key;
- a locking key 164 movably mounted in translation inside the male element 162 and comprising a circumferential ramp 165 capable of acting against the locking elements 163 (in particular their cylindrical head) in order to move them inside the male element 162 until they cooperate with the radial holes 162 of the bell 160 and thus make the bell and the male element integral with each other in rotation and in translation.

The locking key 164 is integral with the end of the secondary spindle 170.

The locking key 164 is movable between at least two positions between which it can be moved by means of the jack 17, namely:
- a pairing position in which it is brought closer to the locking elements 163 in such a way that its circumferential ramp 165 acts on the locking elements 163 to make them slide inside the radial holes so that their ends form a projection from the male element in order to come, if necessary, to be housed in the radial holes 161 of a bell 160, and
- an un-pairing position in which the locking key 164 is remote from the locking elements 163 so that it does not act on them so that their ends do not project from the male element in order to be un-housed, if necessary, from the radial holes 161 of a bell 160.

Elastic return means may optionally be implemented to tend to return the locking members 163 into their un-pairing position when the locking key is not acting on them.

The device includes a pressurised air intake conduit 907 which opens at the workstation such that it communicates with the air conduit 906 of the sleeve of a functional module situated at the workstation.

Telescoping

The secondary spindle 170 can be used to perform telescoping function for different functional modules, especially rivet support modules.

As will be described in more detail below, this telescoping function allows the secondary spindle 170, initially housed in the main spindle in a retracted position, to be moved out of the main spindle 51 to reach a deployed position in which it extends at least partially outside the main spindle, and then to translationally connect them so that the movement of the main spindle 51 is accompanied by a movement of the secondary spindle 170: the main spindle and the secondary spindle then form a single spindle having great length.

For this, the secondary spindle 170 comprises, at its end opposite to that of the locking key 164, the piston 172 translationally movable inside the main spindle 51, which constitutes its chamber 171 of the jack 17.

The secondary spindle 170 comprises a circumferential groove 1063 downstream of the piston 172.

The device comprises means for translationally connecting said inner spindle with said outer spindle.

More precisely, the main spindle 51 carries an unlocking ring 1064.

This unlocking ring 1064 is translationally fixed with the frame. It is rotatably connected to the main spindle by means of grooves (not represented) which further allow the main spindle to translate within the locking ring 1064. The locking ring 1064 is rotatably connected to the drive pulley 1034.

This unlocking ring 1064 comprises a bore with a cylindrical portion 1065 followed by a frustoconical portion 1066 widening towards an aperture opening onto the side of the spindle 51 oriented to a functional module brought to the workstation.

The main spindle 51 carries a locking member. This locking member comprises a locking ring 1067 mounted to the male element 162.

This locking ring 1067 has a hole 1068 passing therethrough, the diameter of which allows the locking key 164 and the secondary spindle 170 to pass through.

This locking ring 1067 comprises a lateral actuation portion 1069 comprising:
  a first outer peripheral groove portion 1070, and
  an outer surface 1072 against which the unlocking ring 1064 is capable of acting.

The locking ring 1067 has two opposing cut edges 1073 and is mounted in a complementarily shaped groove 1074 provided in the male member 162.

The first groove portion 1070 forms, together with a second peripheral groove portion 1070' provided on the male member, a peripheral groove housing an elastic return element such as an O-ring or spring.

The locking ring 1067 is translationally movable in the groove 1074 of the male element 162 along an axis orthogonal to the axis of the main spindle 51 between:
  a locking position in which the actuating portion 1069 is brought closer to the axis of the male element 162 by virtue of the action of the elastic return element, the peripheral end 1075 being engaged in the groove 1063 (or housing) made in the secondary spindle, and
  an unlocking position in which the actuating portion 1069 is spaced apart from the axis of the male member 162, the peripheral end 1075 being then disengaged from the groove 1063 made in the secondary spindle.

Movement to the unlocking position is achieved by introducing the portion of the male member 162 carrying the locking ring 1067 into the conical portion 1066 and then into the cylindrical portion 1065 of the unlocking ring 1064 which thereby acts on the locking ring 1067 to move it relative to the male member 162 against the action of the compression spring.

It is then possible to translate the secondary spindle 170 within the main spindle 51 between at least:
  a retracted position in which it is housed within said outer spindle, and
  a deployed position in which it extends at least partially outside said outer spindle.

Passage to the locking position is achieved:
  after extraction of the male element 162 and the locking ring 1067 from the unlocking ring 1064, then
  when the circumferential groove 1063 of the secondary spindle 170 reaches the locking ring 1067, the latter moves into its locking position under the effect of the compression spring so that the locking end 1075 of the locking ring 1067 is housed into the groove 1063 of the secondary spindle 170 moving closer to the axis of the male member 162.

The secondary spindle 170 is then translationally connected with the main spindle 51 so that the translational movement of the main spindle 51 is accompanied by a translational movement of the secondary spindle 170 which together form a single spindle having great length.

Rotational Drive of the Main Carousel

As has been mentioned above, the carousel is rotatably mounted about its axis which extends essentially parallel to that of the spindle.

The carousel has longitudinal notches 62 along its outer periphery which extend essentially parallel to the axis of the carousel. These notches form drive teeth as will become clearer later.

The device comprises means for rotatably driving the carousel about its axis.

These rotation drive means comprise:
  a first jack 70 comprising a piston 700 translationally movable in a chamber 701;
  a second jack 71 comprising a piston 710 translationally movable inside a chamber 711.

The piston 700 of the first jack 70 carries a pawl 702 which is rotatably mounted relative to the piston 700 about an axis 703 essentially parallel to the axis of rotation of the carousel.

The pawl 702 comprises a bearing surface 704 designed to bear against a stop 705 of the piston 700 defining the end drive position.

The pawl 702 is movable between two end positions, namely:
  a deployed position in which its bearing surface 704 bears against the stop 705 of the piston 700 so that its end is spaced apart from the piston 700 and at least partially housed in a notch 62 of the carousel (cf. FIG. 12), and
  a retracted position in which its bearing surface 704 does not bear against the stop 705 of the piston 700 so that its end is closer to the piston 700 and disengaged from any notch 62 of the carousel.

Return means (not represented), such as for example a spring or the like, may possibly be used to act on the pawl to tend to return it to its extended position.

The piston 700 comprises an internal chamber 706 in which an inner piston 707 whose end 708 is bevelled is housed.

This inner piston 707 is movably mounted translation in the chamber 706 between:
  a deblocking position in which its bevelled end 708 is located away from the pawl 702 so as to leave the latter free to rotate about the axis 703, and
  a blocking position, likely to be assumed when the pawl 702 is in its deployed position, in which its bevelled end 708 bears against the pawl 702 in order to make it in rotationally stationary about the axis 703.

Figure 12:
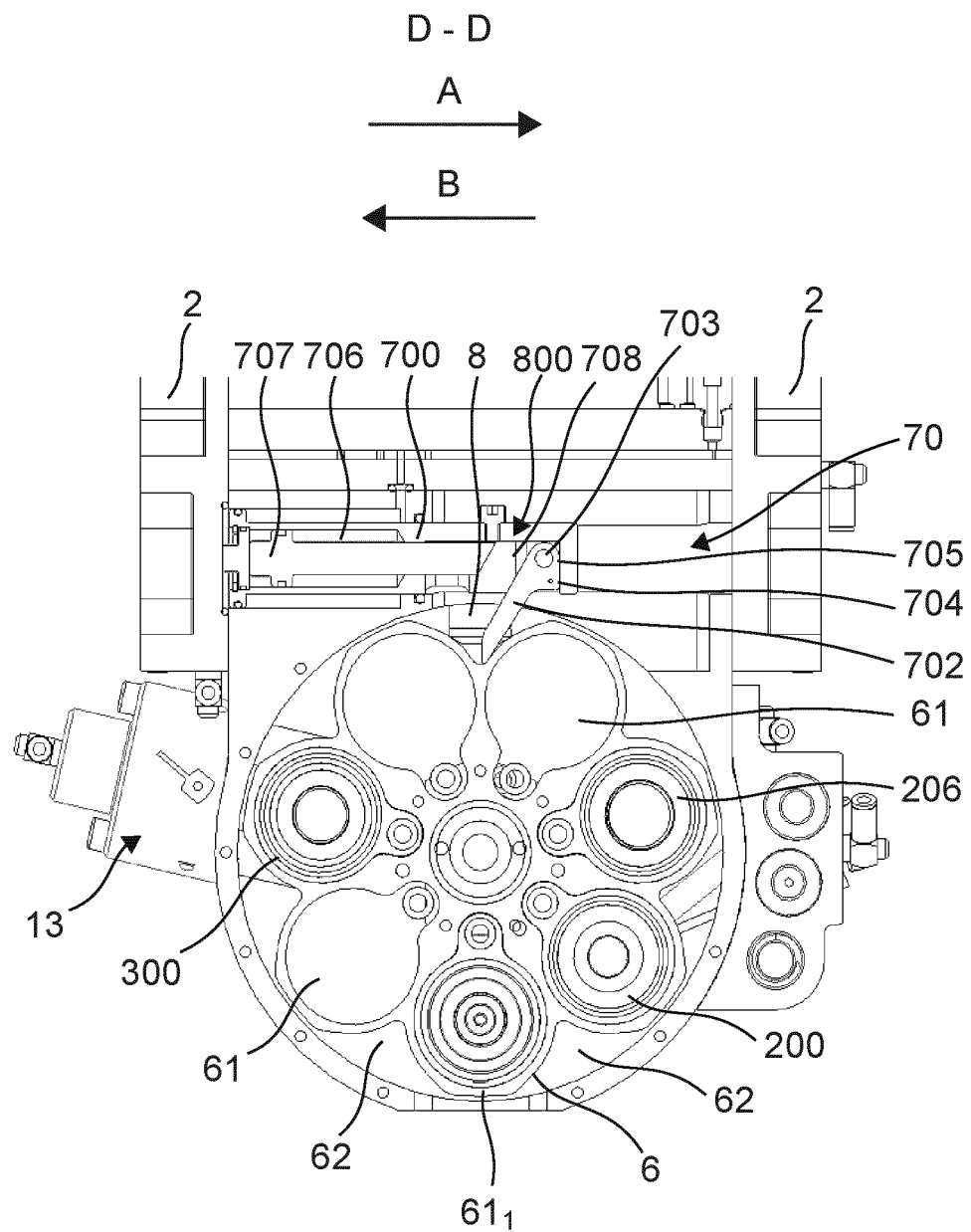
FIG. 12 illustrates a cross-sectional view along plane D-D of the device of FIG. 2.

The piston 700 is movable between two end positions, namely:
  a start position in which it is on the stop on the right-hand side in FIG. 12 (insofar as the device can take any orientation in space, the indication of the right-hand side is purely illustrative with reference to FIG. 12 for understanding reasons), and
  an end position in which it is on the stop on the left side in FIG. 12 and the pawl 702 is in a deployed position between two notches 62.

In the configuration illustrated in FIG. 12, the piston 700 is in its end position and the pawl is in its deployed position.

The device comprises a blocking pin 8 movably mounted between:
- an indexing position in which it is brought to stop against the carousel between two consecutive notches 62 to prevent rotation of the carousel about its axis, and
- a release position in which it is disengaged from the carousel to allow its rotation.

An elastic return means, such as a spring (not shown), acts on the pin 8 to return it to its blocking position. A jack 800 is used to block the blocking pin 8 in its blocking position.

The blocking pin 8 provides a means for locking and indexing the carousel in positions in which at least one cell 61 of the carousel is at a functional position. In this embodiment, when the blocking pin 8 is in the blocking position in a notch between two consecutive cells, several cells are in alignment with different functional stations, namely:
- one cell is located at the module loading/unloading station;
- one cell is located at the temporary fastener loading station;
- one cell at the rivet loading station;
- one cell is located at the rivet coating station;
- one cell is located at the workstation as an extension of the single spindle 51.

In order to rotatably drive the carousel in a counter-clockwise direction, the jack 800 is exhausted so that the blocking pin 8 is held in its blocking position by the spring effect alone.

The piston 700 is in its start position (on the stop on the right in FIG. 12).

Pawl 702 is in deployed position.

The inner piston 707 is in its locking position so that the pawl 702 is held in its deployed position without being able to rotate about its axis 703.

Pressurised air is then injected into chamber 701 so as to move piston 700 along arrow B from its start position to its end position.

During this movement, the pawl engages with the notch in which it is located so that the carousel is also rotatably driven in a counterclockwise direction. The blocking pin 8 slides against the peripheral surface of the carousel so that it moves progressively from its indexing position to its release position and then from its release position to its indexing position when the piston 700 is on the stop in its end position. The jack 800 is powered to block the blocking lug in its indexing position so that the carousel is held stationary. At least one new cell 61 of the carousel is then at a functional station.

The inner piston 707 is moved to its deblocking position so that the pawl is free to rotate about the axis 703 (within the clearance permitted by its shape and surrounding surfaces).

The jack 70 is actuated so that the piston 700 moves along arrow A to be returned to its start position.

During this movement, the pawl 702 gradually moves from its deployed position to its retracted position and then from its retracted position to its deployed position by sliding against the peripheral surface of the carousel and pivoting about axis 703 in a clockwise direction until the piston is in its start position. The pawl is then housed in another notch 62 of the carousel.

The carousel can be rotatably driven counterclockwise again by reiterating this process.

The piston 710 of the second jack 71 carries a pawl 712 which is rotatably mounted relative to the piston 710 about an axis 713 essentially parallel to the axis of rotation of the carousel.

The pawl 712 thus comprises a bearing surface 714 designed to bear against a stop 715 of the piston 710 defining the end drive position.

The pawl 712 is movable between two end positions, namely:
- a deployed position in which its bearing surface 714 bears against the stop 715 of the piston 710 so that its end is housed in a notch 62 of the carousel (see FIG. 13), and
- a retracted position in which its end is closer to the piston 710 and clear of any notch 62 (not represented) of the carousel.

Return means (not shown), such as for example a spring or the like, may possibly be implemented to act on the pawl to tend to return it to its deployed position.

The piston 710 comprises an internal chamber 716 in which an inner piston (not represented) whose end is bevelled like the inner piston 707 is housed.

This inner piston is movably mounted in translation in the chamber between:
- a deblocking position in which its end is away from the pawl so as to leave the latter free to rotate about the axis 713, and
- a locking position, likely to be assumed when the pawl is in its deployed position, in which its bevelled end bears against the pawl in order to make it rotationally stationary about axis 713.

Figure 13:
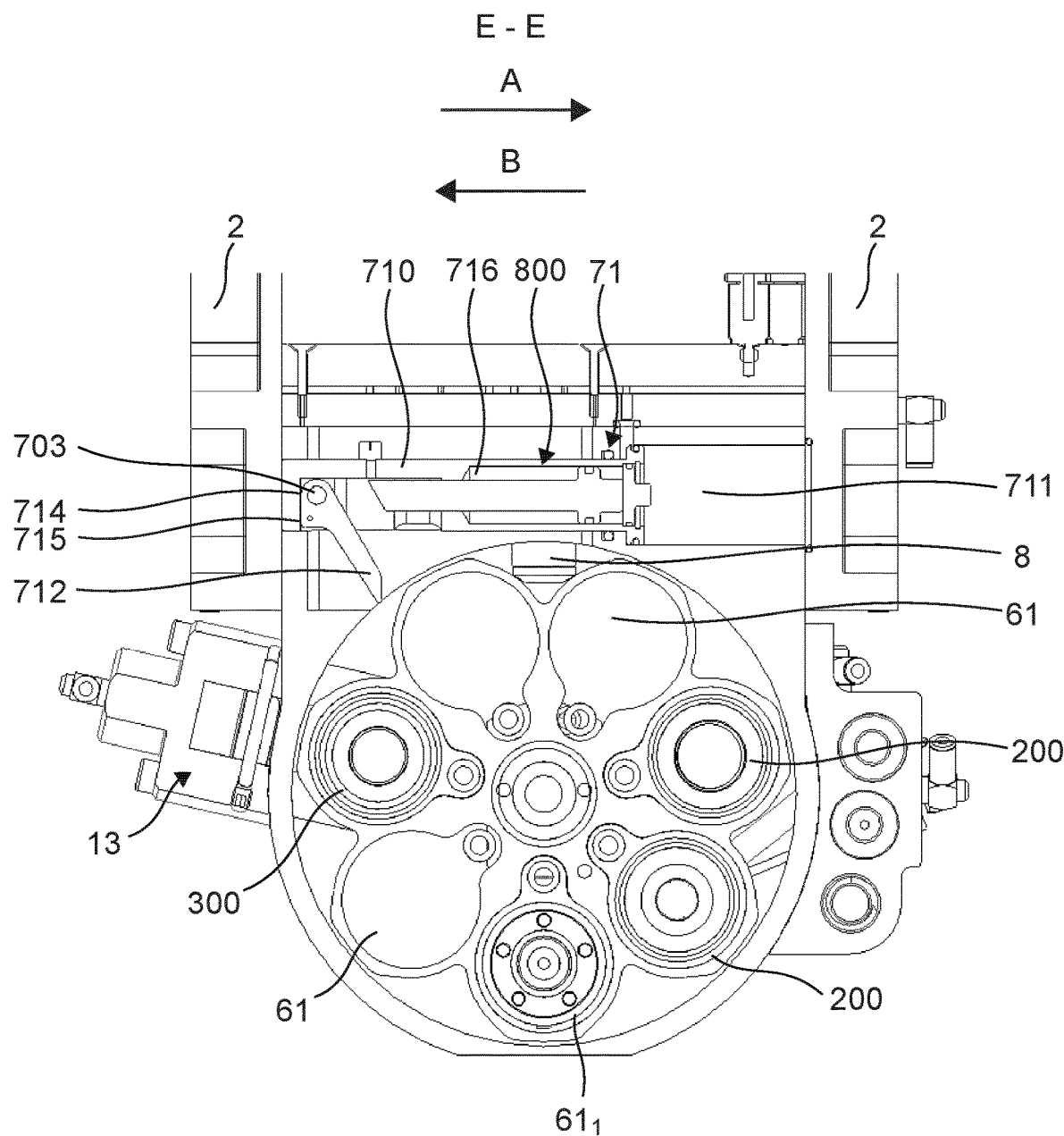
FIG. 13 illustrates a cross-sectional view along plane E-E of the device of FIG. 2.

The piston 710 is movable between two end positions, namely:
- a start position in which it is on the stop on the left-hand side in FIG. 13 (as the device can take any orientation in space, the indication of the right-hand side is purely illustrative with reference to FIG. 12 for understanding reasons), and
- an end position in which it is on the stop on the right side in FIG. 13 and the pawl is in deployed position between two notches 62.

In the configuration illustrated in FIG. 12, the piston 710 is in its start position and the pawl 712 is in its deployed position.

In order to rotatably drive the carousel clockwise, the jack 800 is exhausted so that the blocking pin 8 is held in its blocking position by spring effect alone.

The piston 710 is in its start position (on the stop on the left in FIG. 12).

The pawl 712 is in its deployed position.

The inner piston is in its locking position so that the pawl is held in its deployed position without being able to rotate about its axis 713.

Pressurised air is then injected into the chamber 711 so as to move the piston 710 along arrow A from its start position to its end position.

During this movement, the pawl meshes with the notch in which it is located so that the carousel is rotatably driven clockwise. The blocking pin 8 slides against the peripheral surface of the carousel so that it gradually moves from its indexing position to its release position and then from its release position to its indexing position when the piston 710 is in on the stop in its end position. The jack 800 is powered to block the blocking lug in its indexing position so that the carousel is held stationary. At least one new cell 61 of the carousel is then at a functional station.

The inner piston is moved to its release position so that the pawl is free to rotate about the axis 713 (within the clearance permitted by its shape and surrounding surfaces).

The jack 71 is actuated so that the piston 710 moves along arrow B to be returned to its start position.

During this movement, the pawl 712 gradually moves from its deployed position to its retracted position and then from its retracted position to its deployed position by sliding against the peripheral surface of the carousel and pivoting about axis 713 in a counter-clockwise direction until the piston is in its start position. The pawl is then housed in another notch 62 of the carousel.

The carousel can be rotatably driven clockwise again by reiterating this process.

The carousel and the pawls form ratchet wheel systems.

The first 70 and second 71 jacks and the corresponding pawls have antagonistic movements in that they rotatably drive the carousel in opposite directions.

The implementation of the first 70 and second 71 jacks makes it possible to place a module at the desired functional station as quickly as possible by choosing the direction of rotation of the carousel that will ensure the shortest route. However, only one jack could be implemented. This will simplify the system but will lead to longer alignment times.

The means for rotatably driving the main carousel may be of the type used for the secondary carousel. In this case, rather than implementing double jacks to drive the pawls, i.e. outer jacks containing an inner pawl locking jack, single jacks could be implemented.

Indexing the secondary carousel can also be achieved by means of a blocking lug not controlled by a jack as for the secondary carousel.

The carousel 6 is movably in rotation about a fixed shaft 8 on which it is rotatably guided by means of a bearing 87 with needles, balls or other.

The shaft 8 is hollow and comprises at one of its ends an enlarged portion defining a chamber 81 in which a piston 82 of a jack 80 slides.

The shaft 8 comprises at the other of its ends a circumferential groove 83 and a lateral port 84 communicating with the hollow interior of the shaft passes therethrough. The shaft further comprises at this end a flat 85 which opens into the groove 83.

A guide element 14 is secured to the end of the rod 820 of the piston 82.

This guide element 14 comprises a projecting portion 140 which extends into the port 84 of the shaft 8. A groove 141 is provided at the end of the projecting portion 140. This groove 141 extends as an extension of the shaft groove 83 with which it forms a circular groove.

The sleeve 90 of each functional module is intended to be slidably mounted within the cells 61 of the carousel 6.

The end of the side finger 900 of each of the sleeve 90 of each functional module is designed to be housed, depending on the angular position of the carousel 6, alternately in the groove 83 of the shaft 8 and in the groove 141 of the guide element 14, so that the sleeve is held integral with the shaft 8 or the piston 82 along the axis of rotation of the carousel 6, and is thus translationally held stationary along the axis of the cavity in which it is located.

The projecting portion 140 and the grooves 141 and 84 extend to an angular position corresponding to the finger 900 of a sleeve 90 of a functional module 9 located at the workstation as an extension of the spindle 51.

The groove 901 of each sleeve 90 is able to house the lug 10 placed at the end of the piston 11 which is translationally movable in the chamber 12 of the jack 13.

The jack 13 is located at a loading/unloading station of the carousel 6. This station is located such that when one cell 61 of the carousel is at the working station as an extension of the spindle 51, another cell is at the loading/unloading station (i.e. the staple loading station in this embodiment), another cell is at the rivet loading station and another cell is at the coating station.

The flat 85 and the lug 10 extend along axes parallel and perpendicular to the axis of rotation of the carousel 6.

Loading and Unloading of Functional Modules

Loading the carousel 6 with functional modules 9 is achieved the following way.

Pressurised air is injected into the chamber 12 of the jack 13 so as to move the piston 11 along the arrow C in order to disengage the lug 10 from the interior of the cell 61 located at the loading/unloading station.

The jack 1005 is actuated to place the fork 1003 to its release position.

A module is introduced into the cell 61 at the loading/unloading station from the side of the carousel 6 located on the side the end of the shaft 8 where the groove 84 is located.

The finger 900 of the sleeve 90 is introduced into the groove 83 through the flat 85 which forms an introduction passage.

Air is then introduced into the chamber 12 of the jack 13 so as to move the piston 11 along the arrow D to introduce the lug 10 into the groove 901 of the sleeve 90. The sleeve 90, and thus the corresponding functional module 9, is thus held in the cell 61 along the axis of which it is translationally blocked.

The shape of this groove 901 allows the sleeve to arrive at and depart from the loading/unloading station while the lug 10 protrudes into the groove 901.

The carousel 6 can then be rotatably driven to place the next cell at the loading/unloading station and the process is reiterated to load a new functional module 9.

it is possible to load, all seven, or more generally all, of the cells in the main carousel. However, only some cells can be loaded as required. In other embodiments, it is also possible for the main carousel to comprise more or less than seven cells.

Unloading a functional module 9 is achieved, after placing the corresponding cell at the loading/unloading station, by actuating the jack 13 to disengage the lug 10 from the groove 901 and thus let the functional module 9 slide out of the corresponding cell 61.

Presser Element

The device comprises a tubular presser element 15 movably mounted in translation with respect to the frame 2 along the axis of movement of the spindle 51 and as an extension thereof. Such a presser element 15 can, for example, be used during a drilling operation to exert a compressive force on the structure to be drilled, especially to ensure contact between the plates of a stack and to avoid formation of burrs between these plates during drilling.

Installation of the Multi-Task Device

The robot arm to which the device is secured is actuated to place the multi-task device so that the workstation is positioned at the location on the structure to be worked on where an operation is desired to be performed.

The robot applies the device against the structure to be worked on until the suction cups 41 bear against the surface thereof. A vacuum is then created in the suction cups to ensure an effective connection between the multi-task device and the structure to be worked on.

Alternatively, a clamping C 42 can be used as an alternative to the suction cups.

Drilling and/or Countersinking Operation

In order to carry out a drilling and/or countersinking operation, the main carousel is rotatably driven until the desired drilling module is at the work station.

As a reminder, the elastic return means tend to return the piston 903 of the jack to a position in which its end 905 is housed in the housing 950 or protrudes into the sleeve to prevent the functional assembly of the drilling module from sliding into the sleeve, the end 905 of the piston 903 contacting the end 951 of the bushing 95.

The drilling and/or countersinking module 9 has then to be paired to the drive spindle 51 so that the spindle can movably drive the output shaft 91, which is a movable member of the module.

For this, the spindle 51 is translationally moved along its axis in the direction of the functional module at the workstation until the male element 162 is housed in the bell 160.

Pressurised air is injected into the chamber 171 of the jack 17 in order to move the inner spindle 170 along the arrow E. The ramp 165 of the locking key 164 then acts on the locking elements 163 to place them in their pairing position in which they cooperate with the radial holes 161 of the bell 160. The spindle 51 and the output shaft 9 are then connected in rotation and translation.

The angular position of the male element 162 relative to the bell 160 is random and as a result the locking elements may not be perfectly in line with the radial holes of the bell. Spherical heads of the locking elements allow a slight rotation of the bell relative to the male element causing the holes in the bell and the male element to be co-axial and thus allowing the locking elements to penetrate the holes in the bell.

An excess of holes in the bell compared to those in the male element facilitates this re-indexing.

If, however, the locking elements were to remain balanced between two holes without penetrating them, the resisting torque resulting from the first drilling operation would then induce a relative rotational movement of the male element and the bell to bring the locking elements into line with the radial holes and complete pairing.

The jack 904 is actuated to extract the end 905 of its piston 903 from the housing 950 of the bushing 95 or for the end 905 not to protrude into the sleeve any longer.

Pressurised air is then injected into the chamber 81 of the jack 80 in order to move the piston 82 along the arrow E. Insofar as the movable equipment on the stop position the sleeve against the stop ring on the bell side, the actuation of the jack 80 has no effect. The main spindle 51 is then translationally driven along the arrow E. This results in:

- translating the movable equipment and the sleeve along the arrow E
- the drive element 14 following the same movement so that the functional drilling module 9, whose finger 900 cooperates with the groove 141 of the drive element 14, is translationally driven along the axis of the spindle 51 along the arrow E,
- until the sleeve 90 bears against the presser element 15.

The presser element then follows the same movement, causing it to come to rest against the structure to be worked on and exert a pressure force on the structure to be worked on.

The force for pressing the presser element 15 against the surface to be worked on is held by the jack 80, while the translational movement of the spindle 51 along the arrow E is accompanied by a movement of the movable equipment inside the sleeve, which is then translationally stationary along the arrow E.

The spindle 51 can then be rotatably and translationally driven and transmit its movements to the output shaft 91 of the functional module 9, which is paired to carry out the desired drilling operation.

Pairing the main spindle and the output shaft constitutes a rotational and translational connection.

By securing a screwing sleeve to the module instead of a cutting tool, it is possible to make a screwing/unscrewing operation.

Rivet Loading

Prior to a rivet setting operation, whether or not preceded by a sealant coating operation, a rivet support module 200 has to be loaded with a rivet 216.

For this, the main carousel 6 is rotatably driven so as to bring to the rivet loading station P3 the rivet support module 200 corresponding to the size of the rivet 216 desired to be set and if necessary to coat.

Once the rivet support module 200 has been brought to the rivet loading station P3, a rivet loading operation is implemented.

Prior to this, the cell 1009 of the secondary carousel 1008 corresponding to the size of this rivet 216 is supplied with a rivet by the rivet supply means of the carousel 1008. The rivets are brought through a flexible tube pushed into this tube by a pressurised gas.

The secondary carousel 1008 is then rotatably driven so as to place the rivet containing cell 1009 at the rivet loading station P3.

Pressurised air is injected into the air conduit 906 of the rivet support module 200 so as to hold its piston 205 in its first end position on the stop against the circlip 218 on the side opposite to the split ring.

The jack 1006 is then implemented to push the rivet 216 contained in the cell 1009 into the rivet support module 200 until the head 219 of the rivet 216 is located in the split ring 213. During this movement, the head 219 of the rivet 216 acts on the split ring 213 to expand it so that it becomes housed in the groove 214 and in the conical bore 215 of the split ring 213. The ring 213 is then constricted around the head 219 of the rivet 216 by the effect of the O-rings used for this purpose, so that the rivet 216 can no longer leave the ring 213 by following the opposite path. The rivet 216 is then held in the rivet support module 100 and its body 220 projects from of the module 200 beyond the split ring 213.

Rivet Coating Operation

To carry out a rivet coating operation, the rivet support module 200 previously loaded with the rivet 216 desired to be coated with sealant is brought to the coating station P4 by rotating the main carousel 6.

During this movement, the piston 205 of the rivet support module remains on the stop against the circlip 218 under the effect of friction of the O-rings ensuring sealing of the chamber.

it is possible to perform a helical type coating, or a ring type coating, or a parallel annular bead coating.

Helical Coating

A helical type coating consists in depositing at least one annular bead of sealant at the end 221 of the rivet, at least one annular bead of sealant under the head 219 of the rivet and a helical bead along the body 220 of the rivet between the end and the head of the rivet.

This is achieved as follows.

Prior to the arrival at the coating station of a rivet support module:

- the jack 1053 is actuated to hold the end of the nozzle 1050 in its end position in which it is furthest from the body 220 of the rivet 216;

the jack 1047 is actuated to hold the shoe 1046 in its un-meshing position;

the jack 1060 is actuated so that the feeler 1058 is in its end position on the side of the end 221 of the rivet 216;

the jack 1057 is operated so that the block 1054 carrying the shoe 1046 and the nozzle 1050 is in its end position on the side of the end 221 of the rivet 216.

The support 1062 of the nozzle 1050 is then on the stop against the feeler 1058.

The chamber of the jack 1057 carrying the block 1054 is exhausted.

The jack 1036 is actuated so as to engage the half dog 1038 which it carries with the half dog 211 of the piston of the rivet support module 100 placed at the coating station. The piston is a movable member and cooperating both half dogs constitutes an indirect coupling of the main spindle with this movable member. Pairing is herein a rotational connection.

The half dog 1038, carried by the jack 1036, then moves the piston 205 of the rivet support module 100 towards the feeler 1058. When the jack 1036 reaches the end of its stroke, the piston 205 of the module is placed so that the zone of connection between the head 219 and the body 220 of the rivet carried by the module is at a given position. It should be noted that each rivet support module is designed to support a rivet of a given size. The length along the axis of the spindle 51 of the piston 205 of each rivet support module is determined as a function of the size of the rivet that it is intended to support so that, when the jack 1036 carrying the half dog 1038 reaches the end of its stroke, the zone of connection between the head 219 and the body 220 of the rivet carried by a module is always at the same given position along the axis of the spindle 51.

The jack 1060 is actuated to move the feeler 1058 towards the rivet head 219 until the conical tip 1061 bears against the rivet end 221, thus stopping the stroke of the jack 1060.

The feeler 1058, against which the nozzle 1050 is on the stop, thus moves the nozzle at the end of the rivet 221 (at a predetermined distance from the rivet end).

The jack 1053 moves the nozzle 1050 towards the rivet body 220 until its end contacts the rivet body.

The main spindle 51 is rotatably driven so as to rotatably drive via the pulleys and belts both the piston 205 of the module and thus the rivet it carries but also the lead screw 1043 at time t0.

At the same time, the sealant pump is implemented so that the nozzle 1050 delivers sealant to the end 221 of the rivet.

After a period of time corresponding to one revolution of the lead screw 1043, the shoe 1046 is moved to its position of meshing with the lead screw 1043 by means of the jack 1049.

Contact between the shoe 1046 and the surface 1045 of the thread 1044 of the lead screw 1043 is completed after a fraction X of one revolution of the lead screw 1043. This fraction of one revolution is necessary because when the shoe comes into contact with the screw, it is in a random relative position such that a gap remains between the shoe and the thread flank. Thus the translational drive of the shoe by the lead screw is only effective after this gap has been closed by a random fraction of one revolution X.

At this stage, a bead of sealant of 1+X revolutions has been deposited to the end 221 of the rivet.

When the shoe 1046 is in its meshing position, i.e. after contact between the shoe and the lead screw has been completed, the nozzle 1050 begins to move towards the rivet head 219 and the nozzle 1050 begins to deposit a spiral bead of sealant along the rivet body 220.

When the piston 1055 of the jack 1057 carrying the block 1054 comes to a stop by being moved from the end 221 towards the rivet head 219, the nozzle 1050 arrives at the connection height between the rivet body 220 and the rivet head 219.

Rotation of the single spindle 51 is stopped after a time elapsed from t0 allowing a number of revolutions of the lead screw of 3+Y, Y being the number of revolutions of the spiral between the bead on the end and the bead under the head of the rivet. Knowing the rivet length allows us to know the distance Z between the end and head beads, Y=Z/lead screw pitch (assuming here that the rivet to be coated and the lead screw rotate at the same frequency).

Since the length of bead deposited on the end can be 2 revolutions at most, this justifies the total number of revolutions of 3+Y to have at least a 1 revolution deposit under head.

At the same time as the main spindle 51 is stopped rotating, the sealant deposition is deactivated by de-pressurising the sealant pump.

When the single spindle 51 is stopped, a bead of sealant of 2−X revolutions has been deposited under the rivet head (3 revolutions minus (1+X)).

The shoe 1046 is moved into its un-meshing position by virtue of the jack 1049.

The nozzle 1050 is moved away from the rivet body 220 by virtue of jack 1053.

The nozzle 1050 and the feeler 1058 are brought to the end position on the side of the rivet end 221 by virtue of the extension of the jacks 1057 and 1060 respectively.

The main carousel 6 is rotatably driven to bring the sealant-coated rivet to the rivet setting station where a rivet setting device is located.

Annular Coating

Annular type coating consists in depositing at least one annular bead of sealant under the rivet head 219.

For this, the following is carried out.

Prior to the arrival of a rivet support module 100 to the coating station:

the jack 1053 is actuated to hold the end of the nozzle 1050 in its end position in which it is furthest from the rivet body 220;

the jack 1049 is actuated so as to hold the shoe 1046 in its un-meshing position;

the jack 1060 is actuated so that the feeler 1058 is in its end position on the side of the rivet end 221.

The jack 1036 is actuated so as to engage the half dog 1038 which it carries with the half dog 211 of the rivet support module 100 placed at the coating station.

The half dog 1038 then moves the piston 205 of the rivet support module 100 towards the feeler 1058. When the jack 1036 reaches the end of its stroke, the piston 205 of the module is placed so that the zone of connection between the head 219 and the body 220 of the rivet carried by the module 200 is in a given position. It should be noted that each rivet support module is able to support a rivet of a given size. The length along the axis of the piston spindle of each rivet support module is determined according to the size of the rivet it is designed to support so that, when the jack carrying the half dog reaches the end of its stroke, the zone of connection between the head and body of the rivet carried by a module is always at the same given position.

The jack 1060 is actuated to move the feeler 1058 in the direction of the rivet head 219 until the conical tip 1061 comes to bear against the rivet end 221, thus stopping the stroke of the jack 1060.

The jack 1057 is actuated to stop at its end on the side of rivet head 219, thus stopping the nozzle 1050 at the level of the connection between body 220 and rivet head 219.

The jack 1053 moves the nozzle 1050 towards the rivet body 220 until its end contacts the rivet body 220.

The main spindle 51 is rotatably driven so as to rotatably drive the piston 205 of the module and thus the rivet it carries via the pulleys and belts.

At the same time, the sealant pump is operated so that the nozzle 1050 delivers sealant at the zone of connection between the head 219 and the body 220 of the rivet.

The rotation of the main spindle 51 is stopped after the rivet has been rotated at least one revolution, at which point a bead of at least one revolution is deposited under the rivet head 219.

At the same time, depositing sealant id de-activated by depressurising the sealant pump.

The nozzle 1050 is moved away from the rivet body 220 by virtue of the retraction of the jack 1053.

The nozzle 1050 and the feeler 1058 are brought to the end position on the rivet end 221 side by virtue of the extension of the jacks 1057 and 1060 respectively.

The main carousel 6 is rotated to bring the sealant-coated rivet to the workstation to set the rivet.

Coating with Parallel Annular Beads

A coating of a rivet with parallel annular beads of sealant between its end and the zone of connection its body with its head is achieved as follows.

The jack 3010 is actuated to move the feeler 3008 along the arrow E to its end position.

A rivet support module carrying a rivet to be coated is then brought to the coating station.

The half dog 1038 is moved to its stop by the corresponding jack so as to engage the half dog 211 of the module and move the piston of the module into a position in which the connection zone of the rivet it carries is in alignment with the channel 3003 of the nozzle opposite to that on the rivet end side.

The jack 3010 is actuated along arrow F so that the end 3008 of the feeler contacts the rivet end.

The spool 3005 then slides inside the chamber 3002 so as to seal the channels extending beyond the rivet end.

The rivet is then rotatably driven through a revolution as the sealant pump is implemented to dispense sealant. This allows a plurality of annular beads of sealant to be deposited on the rivet body simultaneously and in parallel between the end and the rivet connection zone.

Once the beads have been deposited, the rotation of the rivet is stopped, the pump is stopped, the jack is actuated along arrow E to move the feeler away from the rivet and then the main carousel is actuated to move the module carrying the coated rivet to the workstation to set the rivet.

Rivet Setting Operation

The device can be implemented to set rivets, either pre-coated or uncoated with sealant, depending on the case. It therefore comprises a rivet setting device.

After a rivet support module 200 carrying a rivet has arrived at the workstation P5, the rivet is set in a hole previously made in the structure to be worked on, in the following manner.

The main spindle 51 is translationally driven along its axis by the feed motor.

The main spindle 51 then bears against the piston 205 of the rivet support module 200 so that the latter translationally moves inside the chamber from a retracted position in which it extends inside the sleeve to a deployed position in which it extends at least partially outside the sleeve until it stops at the bottom of the latter and the sleeve translates into the cell of the carousel over a sufficient distance to engage the end 221 of the rivet in the corresponding hole (in the case of a rivet with a threaded end), the insertion of the threaded portion may suffice).

The piston of the module is a movable member and pairing here is simply contacting the main spindle with the movable member so as to translationally drive it in one direction.

The feed motor is then controlled to move the main spindle 51 in the opposite direction.

During this movement of the main spindle, the piston 205 of the rivet support module remains stationary inside its chamber due to friction.

The main spindle 51 is translated until it reaches its end position in which the portion of the male element 162 carrying the locking ring 1067 is housed in the cylindrical portion 1065 of the unlocking ring 1064 which acts on the unlocking ring 1067 to move it into its unlocking position.

The secondary spindle 170 is then translated inside the main spindle 51 by supplying the chamber of its jack 17 (until it comes into contact with the rivet head).

When the secondary spindle comes out this way, the circumferential groove 1063 passes through the unlocking ring 1064.

Then the main spindle 51 is advanced, the portion of the male element 162 comes out of the cylindrical portion 1065, so that the unlocking ring is again bearing against the secondary spindle and when this ring arrives again at the level of the circumferential groove 1063, it comes to be housed in the groove 1063 under the action of the elastic return element.

The secondary spindle 170 is then translationally connected with the main spindle 51 so that the translational movement of the main spindle 51 is accompanied by a translational movement of the secondary spindle 170 which together form a long spindle.

The locking key 164 then pushes the rivet head 219 out of the clamp and fully into the hole.

The rivet is thus discharged from the module by discharge means which allow it to be inserted into a hole and which in this embodiment comprise especially the main and secondary spindles.

By reading the currents of the motors driving the main spindle, in this case the feed motor, it is possible to determine the thrust effect on the rivet and to stop the progress of the main spindle when the thrust effect becomes greater than a predetermined threshold corresponding to total insertion of the rivet into its hole.

This approach ensures that a rivet can be installed efficiently with greater forces than if installation were carried out with the central jack implemented to control the presser element 15 and with greater accuracy given that the thrust forces recorded at the main spindle are taken into account.

Once the rivet has been correctly inserted into the hole, the main spindle 51 is moved to its end position in which the portion of the male element 162 carrying the locking ring 1067 is housed in the cylindrical portion 1065 of the unlocking ring 1064 which thereby acts on the outer surface of the actuation side portion 1069 to move the locking ring 1067 relative to the male element 162 against the effect of the compression spring into its unlocking position.

The secondary spindle 170 is then retracted into the main spindle 51 by actuating its jack 17.

Finally, the piston 205 of the rivet support module is retracted into the sleeve by supplying its chamber with compressed air until it stops against the circlip 218 and the sleeve 90 is retracted into its cell by virtue of the jack 80.

Temporary Fastener Loading

A device according to the invention may be implemented to perform setting of temporary fasteners.

A temporary fastener 2000 conventionally comprises a body 2001, a deformable (expandable and retractable) spear point end 2002 having a longitudinal slot and containing a spacer element fixed with respect to the body, and a rotary element 2003 which when rotated with respect to the body causes the spear to expand and then retract into the body. Thus, when the rotary member is rotated and tightened relative to the body after being introduced into a hole through two metal sheets, the spear spreads out from the other side of the sheets relative to the body and then retracts into the body and causes the sheets to be pressed together. An illustrative and non-limiting example of a temporary fastener is described in U.S. Pat. No. 4,548,533.

Temporary fasteners according to the invention comprise a body and a rotary element of cylindrical cross-section and of the same diameter and having smooth and uniform outer surfaces. The body and the rotary element are separated by a space (housing) to allow them to be locked in position as will be additionally described in more detail.

Prior to performing a temporary fastener setting operation, a temporary fastener support module 300 has to be loaded with a temporary fastener.

For this, the main carousel 6 is rotatably driven so as to bring the temporary fastener support module to the loading station P2.

Once the temporary fastener support module has been brought to the temporary fastener loading station, a temporary fastener loading operation is implemented.

The jack 1005 is actuated to move the fork 1003 into its holding position.

The cartridge belt 1000 is implemented to place a temporary fastener 2000 in the axis of the temporary fastener support module.

The chamber of the temporary fastener support module is supplied with compressed air so as to hold the piston 306 in a release position in which its shoulder 307 is close to the flange 314 of the drive tube 313. In this position, the surface of the conical bore 331 of the piston 306 acts on the locking element 321 to hold it in its rest position in which the end of the locking lug 327 is away from the longitudinal axis of the drive tube.

The loading jack 1002 is activated such that the end of its rod comes out from its chamber to push the head of the rotary element 2003 of the temporary fastener so as to introduce the temporary fastener into the temporary fastener support module until the female portion 2001 stops against the fork 1003.

The rotary element 2003 of the temporary fastener then engages with the first freewheel 318 while the body 2001 engages with the second freewheel 33'.

The chamber of the temporary fastener support module is vented so that the piston 306 is moved away from the flange 314 by the spring 315 until it reaches a locking position. During this movement, the locking element 321 returns to its locking position under the effect of the spring housed in the housing 328: the end of the locking lug 327 is then housed in the space E between the head of the rotary element 2003 and the body of the temporary fastener so that the latter is translationally blocked inside the module along its longitudinal axis.

The loading jack 1002 is then retracted to its start position and the jack 1005 is then actuated so as to return the fork 1003 to its release position.

Temporary Fastener Setting Operation

The device allows for setting of temporary fasteners and thus comprises a temporary fastener setting device.

In order to perform the temporary fastener setting, a temporary fastener support module into which a temporary fastener has been introduced is brought with the main carousel to the workstation.

The temporary fastener support module has then to be paired to the main spindle.

For this, the spindle 51 is translationally moved along its axis in the direction of the function module at the workstation until the male element 162 is housed in the bell 160.

A slight air pressure can be introduced into the module chamber so that the piston 306 exerts a counter force along the longitudinal axis of the module against the pairing force.

Pressurised air is injected into the chamber 171 of the jack 17 in order to move the inner spindle 170 along the arrow E. The ramp 165 of the locking key 164 then acts on the locking elements 163 to place them in their pairing position in which they cooperate with the radial holes 161 of the bell 160. The spindle 51 and the drive tube are then rotationally and translationally connected. The drive tube is a movable member and the pairing thereof with the main spindle is a rotational and translational connection.

In order to insert the temporary fastener into the hole of the structure to be worked on:
- the feed motor is implemented to translate the main spindle 51 so as to slide the drive tube 313 and thereby the piston 306 inside the module,
- the jack 80 and the compressed gas supply to the temporary fastener support module via the conduit 906 are exhausted until the descent of the spindle 51 has allowed insertion of the temporary fastener into its housing of the part to be worked on;
- the feed motor is implemented to translate the main spindle 51 so as to continue to slide the drive tube 313 and thereby the piston 306 within the module until the thrust recorded at the main spindle 51 by the sensor for the current consumed by the feed motor reaches a predetermined threshold value corresponding to the temporary fastener being stopped against the structure to be worked on.
- The main spindle 51 is rotatably driven by the rotation motor so that the drive tube rotatably driven the head of the male part of the temporary fastener. Due to the antagonistic operation of the freewheels, the male part of the temporary fastener rotates while the female part is held rotationally stationary. As a result, the male part is screwed in, causing the deformable end to expand in the hole and thus securing the temporary fastener in the hole of the structure to be worked on.
- When the torque determined by the current sensor of the rotation motor reaches a predetermined threshold value corresponding to the completion of clamping the temporary fastener, the rotation motor is stopped.
- The rotation motor is rotatably driven in the other direction so as to rotatably drive the main spindle 51 to some degree to disengage the freewheels from the module.
- Air is introduced into conduit 906 to move the piston to its release position and place the locking lug in its rest position.
- The feed motor is implemented to move the spindle 51 to its initial position.

The main spindle is stopped when the drive tube is in its home position.

The jack 820 is activated to return the sleeve to its home position.

The jack 17 is actuated to release the locking elements 163 from the radial holes 161 of the bell 160 and thus uncouple the main spindle 51 from the drive tube 313 of the module.

The feed motor is again implemented to return the main spindle to its initial start position.

The temporary fastener support module can then be led back to the temporary fastener loading station to receive a new temporary fastener to install.

Alternatives

In the case of drilling modules, pairing between the spindle and the movable member, i.e. the output shaft or the drive tube, is direct. Indeed, the spindle and the output shaft or drive tube are directly interconnected via the pairing means 16 without any intermediate transmission. However, an intermediate transmission could be interposed between the movable member and the bell 160. Such an intermediate transmission may or may not serve as a reduction gear. It could not induce a transformation of movement or, on the contrary, it could induce a transformation of movement (for example, transformation of a translational movement of the spindle into a rotational movement of at least one movable member of a functional module).

In the case of the rivet support module, pairing between the movable member (the piston of the module) and the spindle is made indirectly at the coating station via pulleys, belts and half dogs. It is done directly by simple contact at the workstation.

Examples of functional modules described here include only one movable member, i.e. the output shaft, piston, drive tube. However, it could comprise several output members.

Upon carrying out an operation, the sensors of the control and measurement assembly may be able to read out parameters specific to the operation of the paired module.

For example, during a drilling operation, the following parameters can be measured:
axial thrust on the drill bit: deduced for example from a force sensor on the spindle or in the transmission or from the intensity of the current supplied to the feed motor;
torque on the drill bit: deduced for example from a torque sensor on the spindle or in the transmission or from the intensity of the current supplied to the rotation motor;
drill stroke: deduced for example from the angle sensor of the feed motor.

During a screwing operation, the following parameters can be measured, for example:
screw stroke: deduced for example from the angle sensor of the rotation motor;
torque: deduced for example from the torque sensor in the transmission or from the intensity of the rotation motor.

During a rivet setting operation, there can for example be measured:
the axial thrust on the rivet: deduced for example from a force sensor on the spindle or in the transmission or from the intensity of the current supplied to the feed motor.
the axial stroke of the rivet: deduced for example from the angle sensor of the feed motor.

During a temporary fastener setting operation, the following parameters can be measured, for example:
axial thrust on the temporary fastener: deduced for example from a force sensor on the spindle or in the transmission or from the intensity of the current supplied to the feed motor;
torque: for example from the torque sensor in the transmission or from the intensity of the current of the rotation motor.

The axial thrust measurement could also be used to detect cooperating the male element 162 and the bell 160 upon pairing a functional module.

This of course does not represent an exhaustive list of possible parameter measurements.

All sensors and other measuring means are integrated in the control and measuring assembly 5. The functional modules therefore preferably do not comprise any sensors, or at least a very small number of sensors, which makes their structure particularly simple, robust and economical.

The device also includes a set of pneumatic connectors 18 for connecting the pneumatic actuators to pressurised means supply fluid and/or to vacuumising means.

Several operations can be implemented simultaneously at different stations, for example:
a drilling or rivet setting operation or a temporary fastener setting operation may be implemented at the workstation;
a rivet loading operation at the rivet loading station;
a temporary fastener loading operation at the temporary fastener loading station.

The device according to the invention allows a plurality of functions to be performed, for example fastener element setting, fastener element coating, drilling, etc. In this sense, it constitutes a multitask device. It thus comprises devices for providing each of these functions, especially coating device, temporary fastener setting device, fastener setting device, drilling device, fastener element transfer device, etc. Each of these devices can be dissociated to form an independent device performing its own function. Any combination of several (especially at least 2) of these devices can be made.

An exemplary embodiment of the present disclosure provides an effective solution to at least some of the different problems of the prior art.

In particular, an exemplary embodiment provides a temporary fastener setting device which can allow, in at least one embodiment, optimized setting of temporary fasteners.

An exemplary embodiment provides such a device that is flexible and/or improves reliability.

An exemplary embodiment provides a device which is compact and/or lightweight, and which consequently enables setting of temporary fasteners in cramped places.

An exemplary embodiment provides such a device which is of simple design.

An exemplary embodiment provides such a device which is simple to maintain.

An exemplary embodiment provides such a device which is relatively cheap.

Although the present disclosure has been described with reference to one or more examples, workers skilled in the art will recognize that changes may be made in form and detail without departing from the scope of the disclosure and/or the appended claims.

The invention claimed is:

1. A device for setting a temporary fastener on a structure to be worked, said temporary fastener comprising a body with an expandable/retractable end and a rotary element capable of being rotatably driven to cause said expandable/retractable end to expand/retract, said device comprising:

a support module able to house the temporary fastener, said support module comprising means for holding said temporary fastener inside said support module, said means for holding being movable between at least:
  a locking position in which said means for holding are deployed inside said support module to cooperate with the temporary fastener placed in said support module to prevent the temporary fastener from moving in translation inside said support module, and
  a rest position in which said means for holding are retracted to allow the temporary fastener to pass through said support module;
a loading station for loading the temporary fastener into said support module; and
a workstation for setting the temporary fastener on the structure to be worked;
said loading station comprising introduction means for introducing said temporary fastener into said support module,
said workstation comprising a temporary fastener setting device;
said introduction means being arranged at a first side of said support module from which said temporary fastener is to be inserted through said support module, said first side being opposite from a second side of said support module from which said temporary fastener is removed from said support module after attachment to said structure to be worked by said temporary fastener setting device.

2. The device according to claim 1, wherein said means for holding comprise a locking element provided with a locking lug movably mounted in translation along an axis orthogonal to an axis of the support module between said rest and locking positions.

3. The device according to claim 2, wherein said locking lug is designed to be housed in the locking position in a space, designed to house said locking lug, provided in the temporary fastener housed in said support module.

4. The device according to claim 2, comprising actuating means for actuating said locking element, said actuating means comprising a piston movably mounted in translation inside said support module along a longitudinal axis thereof between:
  a locking position, and
  a release position,
  said piston comprising a portion tilted with respect to said axis, said tilted portion acting on said locking element when said piston moves into the release position to move said locking element into the rest position.

5. The device according to claim 4 wherein said support module comprises a chamber housing said piston, said chamber and said piston defining a jack.

6. The device according to claim 5, wherein said support module comprises a pressurised gas intake conduit in said chamber.

7. The device according to claim 4, comprising first return means tending to return said piston to the locking position of the piston.

8. The device according to claim 7, comprising an elastic return means tending to return said locking element to the locking position.

9. The device according to claim 4, comprising a rotational drive tube housed in said piston, said rotational drive tube being rotatably mounted in said piston and through which a bore passes allowing the temporary fastener to pass therethrough, said drive tube housing a first freewheel able to cooperate with the rotary element of the temporary fastener housed in said support module to rotatably connect said drive tube and said rotary element.

10. The device according to claim 9, wherein said piston houses a second freewheel able to cooperate with the body of the temporary fastener housed in said support module, said first and second freewheels having antagonistic operations.

11. The device according to claim 9, comprising first return means tending to return said piston to the locking position of the piston, wherein said first elastic return means are interposed between said piston and said drive tube.

12. The device according to claim 9, comprising means for rotatably driving said drive tube, said driving means comprising a rotatably movable spindle having a longitudinally grooved portion cooperating with a complementarily shaped grooved ring capable of being rotatably driven by means of a rotation motor.

13. The device according to claim 9, wherein said drive tube and said piston are movable and translationally connected in said support module between at least:
  a retracted position in which said drive tube and said piston extend inside said support module, and
  a deployed position in which said drive tube and said piston extend at least partially outside said support module.

14. The device according to claim 13, comprising:
  means for rotatably driving said drive tube, said driving means comprising a rotatably movable spindle having a longitudinally grooved portion cooperating with a complementarily shaped grooved ring capable of being rotatably driven by means of a rotation motor; and
  means for translationally driving said drive tube, said translation drive means comprising said spindle which has a threaded portion cooperating with a threaded ring capable of being rotatably driven by a translation motor.

15. The device according to claim 1, comprising:
  means for moving said support module between said loading station and said workstation.

16. The device according to claim 15, comprising control means configured to successively:
  bring said support module containing the temporary fastener to the workstation;
  move said temporary fastener inside said support module so as to introduce said temporary fastener into a hole provided in the structure to be worked to which said temporary fastener is to be secured;
  rotatably drive the rotary element of said temporary fastener and cause expandable/retractable end of said means for holding to expand/retract and to be secured to said structure to be worked;
  place said means for holding in said rest position of said means for holding.

17. The device according to claim 1, wherein the introduction means comprises a loading jack.

18. The device according to claim 1, wherein said means for holding comprise a locking element provided with a locking lug movably mounted in translation along an axis orthogonal to an axis of the support module between said rest and locking positions, said locking lug being designed to be housed in the locking position in a space provided for this purpose in the temporary fastener, and wherein said loading station comprises a holding fork movably mounted between at least:
  a holding position in which the holding fork extends as an extension of the support module placed at the loading station on the side of the support module opposite to the introduction means, said fork being shaped to form in this position a stop for holding the temporary fastener located inside said support module and to place said locking lug facing said space provided for this purpose in the temporary fastener housed in said support module, and a release position in which the holding fork does not lie as an extension of said support module to allow the temporary fastener placed therein to be extracted therefrom.

19. The device according to claim 18, comprising control means configured to successively:
bring said module to the loading station;
place said fork in said holding position of said fork and place said means for holding in said rest position of said means for holding;
introduce a temporary fastener into said module until said temporary fastener stops against said fork;
place said means for holding in said locking position of said means for holding;
place said fork in said release position of said fork;
bring said module to said workstation.

20. A device for performing at least one task on a structure to be worked, said device comprising:
means for securing said device to motor-driven handling means able to move said device at least partially in space relative to a structure to be worked;
means for securing said device to said structure to be worked; and
at least one device for setting a temporary fastener on a structure to be worked, said temporary fastener comprising a body with an expandable/retractable end and a rotary element capable of being rotatably driven to cause said expandable/retractable end to expand/retract, each device for setting a temporary fastening comprising:
a support module able to house the temporary fastener, said support module comprising means for holding said temporary fastener inside said support module, said means for holding being movable between at least:
a locking position in which said means for holding are deployed inside said support module to cooperate with the temporary fastener placed in said support module to prevent the temporary fastener from moving in translation inside said support module, and
a rest position in which said means for holding are retracted to allow the temporary fastener to pass through said support module;
a loading station for loading the temporary fastener into said support module; and
a workstation for setting the temporary fastener on the structure to be worked;
said loading station comprising introduction means for introducing said temporary fastener into said support module;
said workstation comprising a temporary fastener setting device;
said introduction means being arranged at a first side of said support module from which said temporary fastener is to be inserted through said support module, said first side being opposite from a second side of said support module from which said temporary fastener is removed from said support module after attachment to said structure to be worked by said temporary fastener setting device.

21. A method for installing a temporary fastener with a device for setting the temporary fastener on a structure to be worked, said temporary fastener comprising a body with an expandable/retractable end and a rotary element capable of being rotatably driven to cause said expandable/retractable end to expand/retract, said device for setting the temporary fastener comprising:
a support module able to house the temporary fastener, said support module comprising means for holding said temporary fastener inside said support module, said means for holding being movable between at least:
a locking position in which said means for holding are deployed inside said support module to cooperate with the temporary fastener placed in said support module to prevent the temporary fastener from moving in translation inside said support module, and
a rest position in which said means for holding are retracted to allow the temporary fastener to pass through said support module;
a loading station for loading the temporary fastener into said support module; and
a workstation for setting the temporary fastener on a structure to be worked;
said loading station comprising introduction means for introducing said temporary fastener into said support module,
said workstation comprising a temporary fastener setting device;
said introduction means being arranged at a first side of said support module from which said temporary fastener is to be inserted through said support module, said first side being opposite from a second side of said support module from which said temporary fastener is removed from said support module after attachment to said structure to be worked by said temporary fastener setting device;
the method comprising:
introducing the temporary fastener through said support module from the first side of said support module opposite the second side of said support module from which said temporary fastener is removed from said support module after attachment to said structure to be worked;
placing said means for holding in the locking position;
bringing said support module containing the temporary fastener to the workstation;
moving said temporary fastener within said support module so as to introduce the temporary fastener into a hole in the structure to be worked to which said temporary fastener is to be secured;
rotatably driving the rotary element of said temporary fastener and causing the expandable/retractable end to expand/retract and to be secured to said structure to be worked;
placing said means for holding in the rest position; and
displacing said support module away from said structure to be worked so as to extract said temporary fastener from said support module from the second side of said support module that opposite from the first side of said support module through which said temporary fastener is introduced in said support module.

22. The method according to claim 21 wherein:
said means for holding comprise a locking element provided with a locking lug movably mounted in translation along an axis orthogonal to an axis of the support module between said rest and locking positions, said locking lug being designed to be housed in the locking position in a space provided for this purpose in the temporary fastener, and wherein said loading station comprises a holding fork movably mounted between at least:
- a holding position in which the holding fork extends as an extension of the support module placed at the loading station on the side of the support module opposite to the introduction means, said fork being shaped to form in this position a stop for holding the temporary fastener located inside said support module and to place said locking lug facing said space provided for this purpose in the temporary fastener housed in said support module, and
- a release position in which the holding fork does not lie as an extension of said support module to allow the temporary fastener placed therein to be extracted therefrom; and the method comprises the following preliminary steps:
bringing said support module to the loading station;
placing said fork in the holding position and placing said means for holding in the rest position;
introducing the temporary fastener into said support module until the temporary fastener stops against said fork;
placing said means for holding in the locking position.

* * * * *